June 14, 1955   R. A. FONTAINE ET AL   2,710,696
BRICK HANDLING MACHINE
Filed May 2, 1951   28 Sheets-Sheet 5
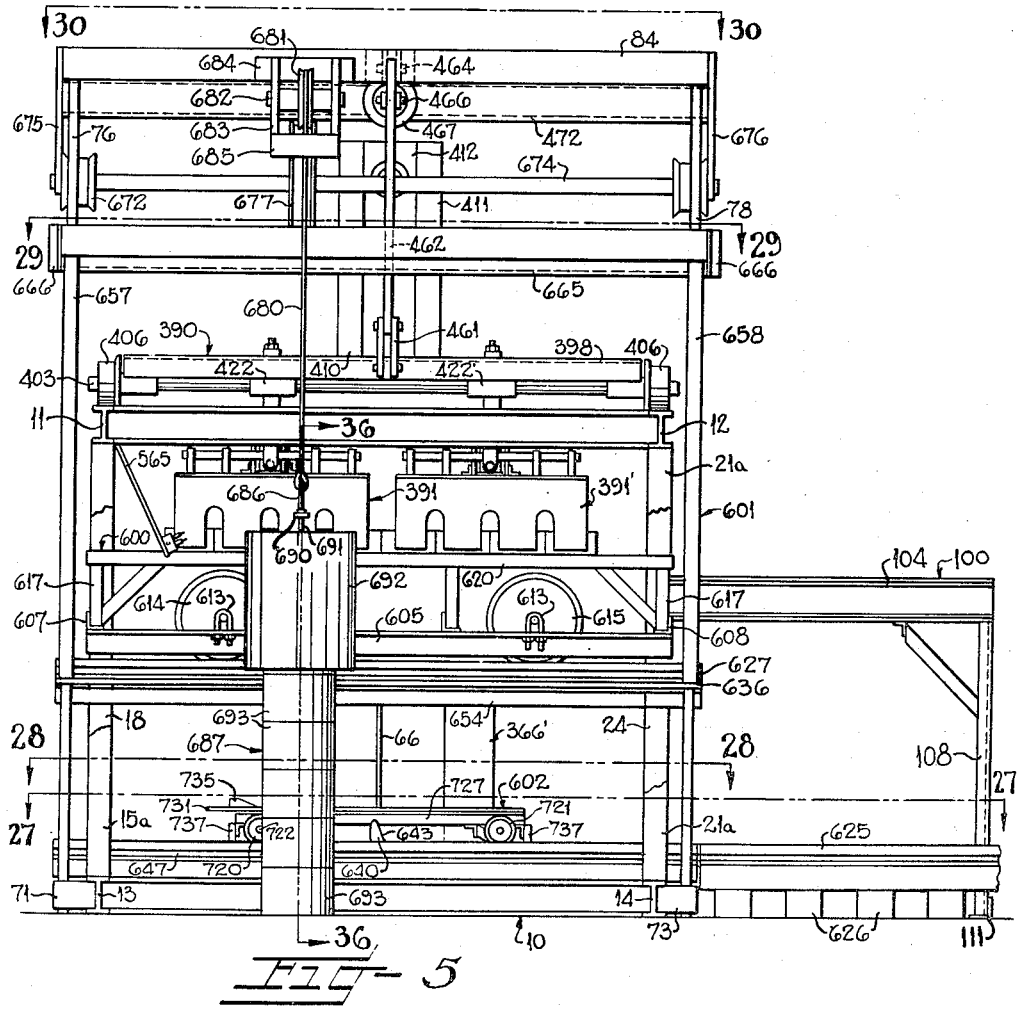
ROBERT A. FONTAINE,
FRANCIS MONTGOMERY STEELE
& CLARENCE N. STEELE,
INVENTORS.
BY   Eaton + Bell
ATTORNEYS.

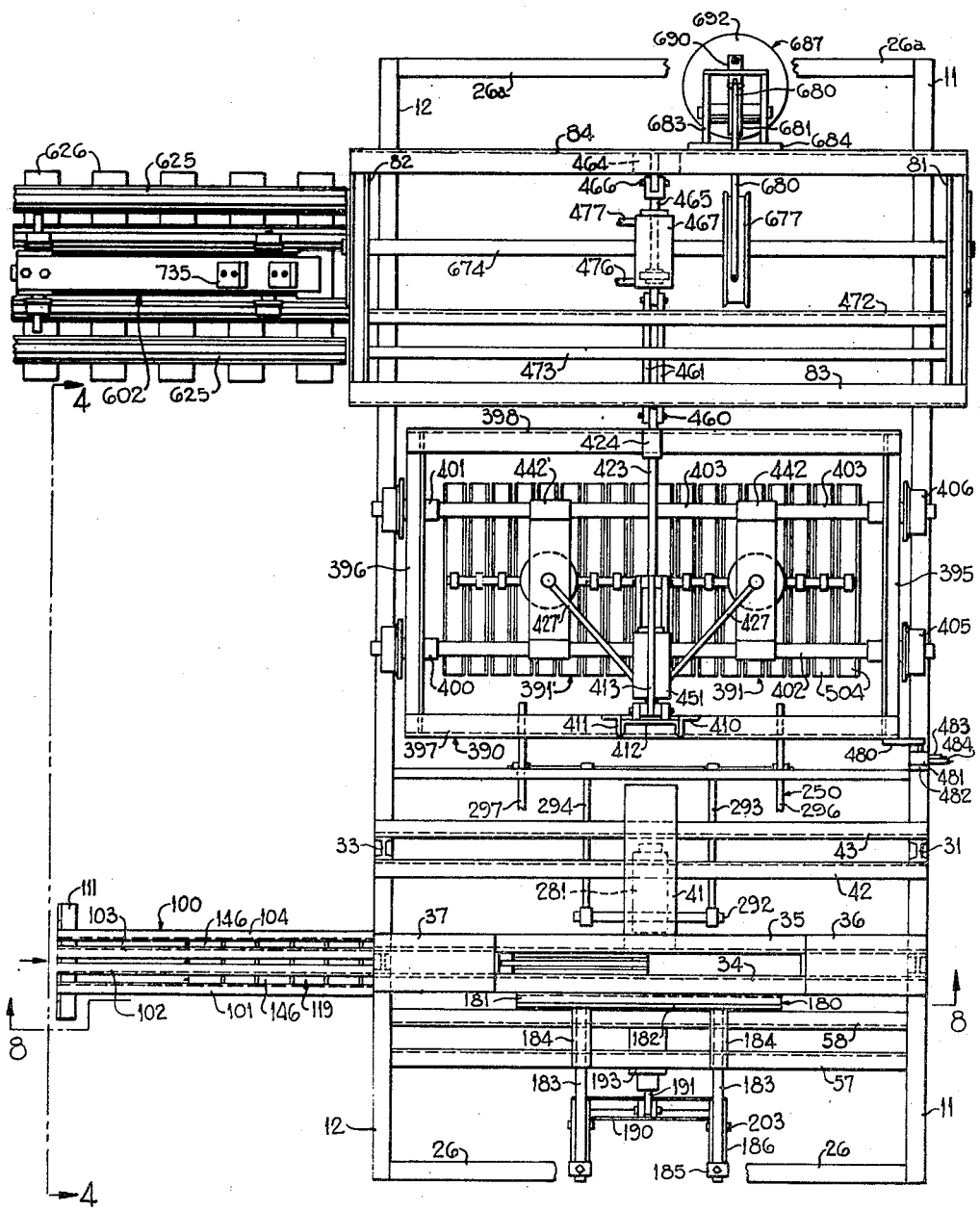

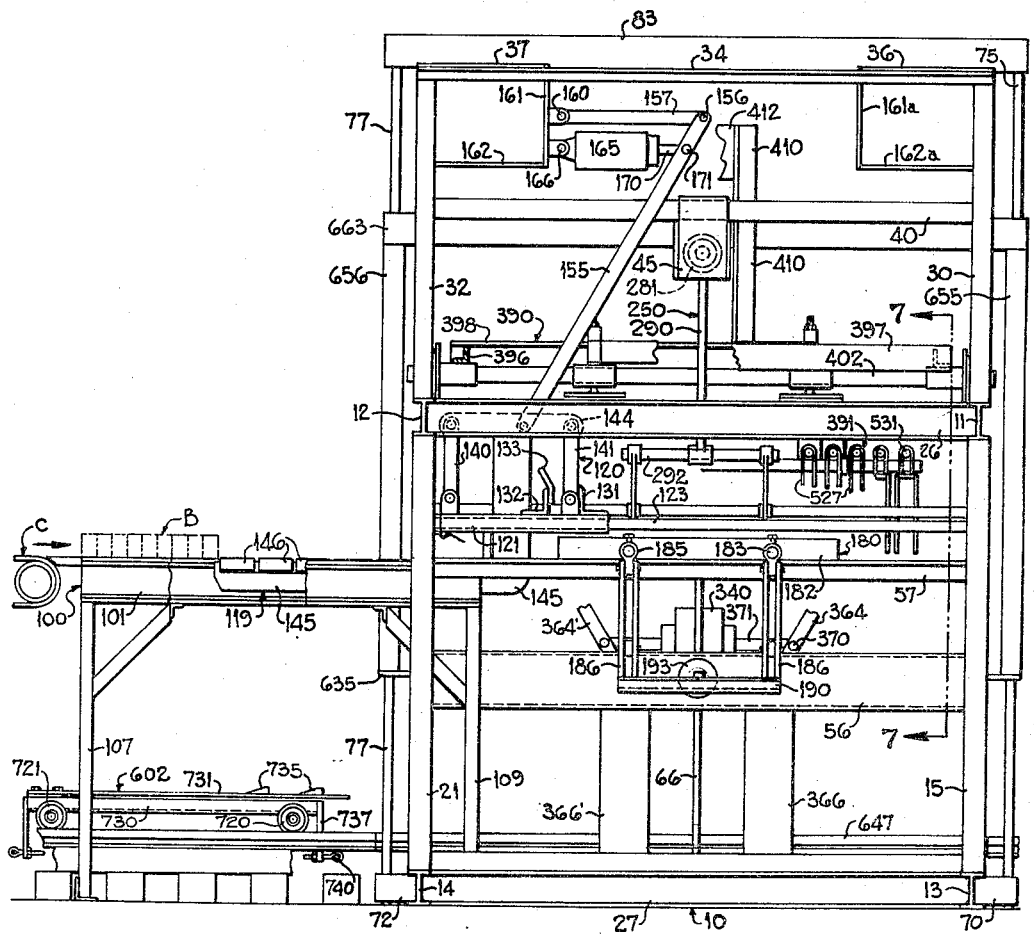

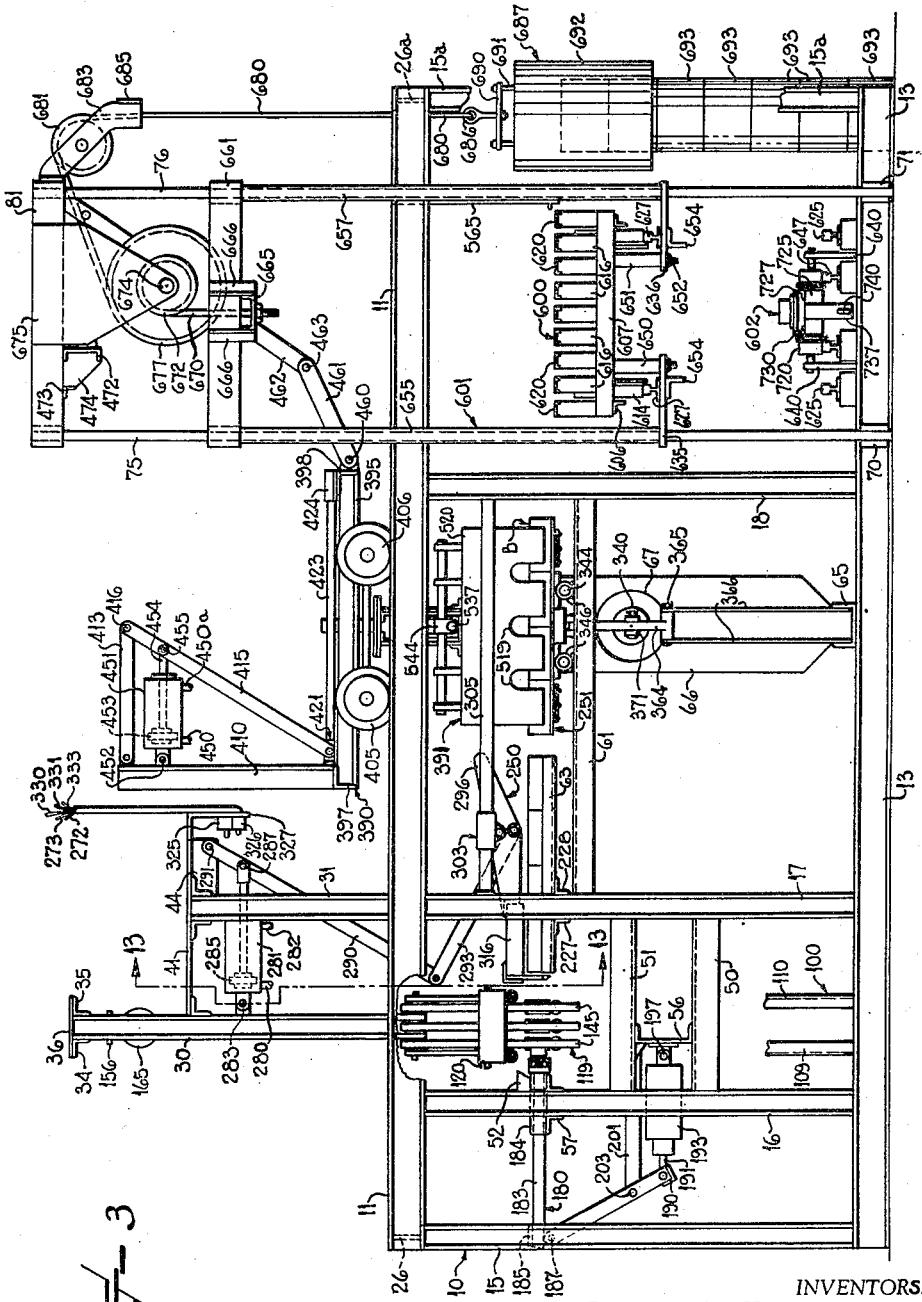

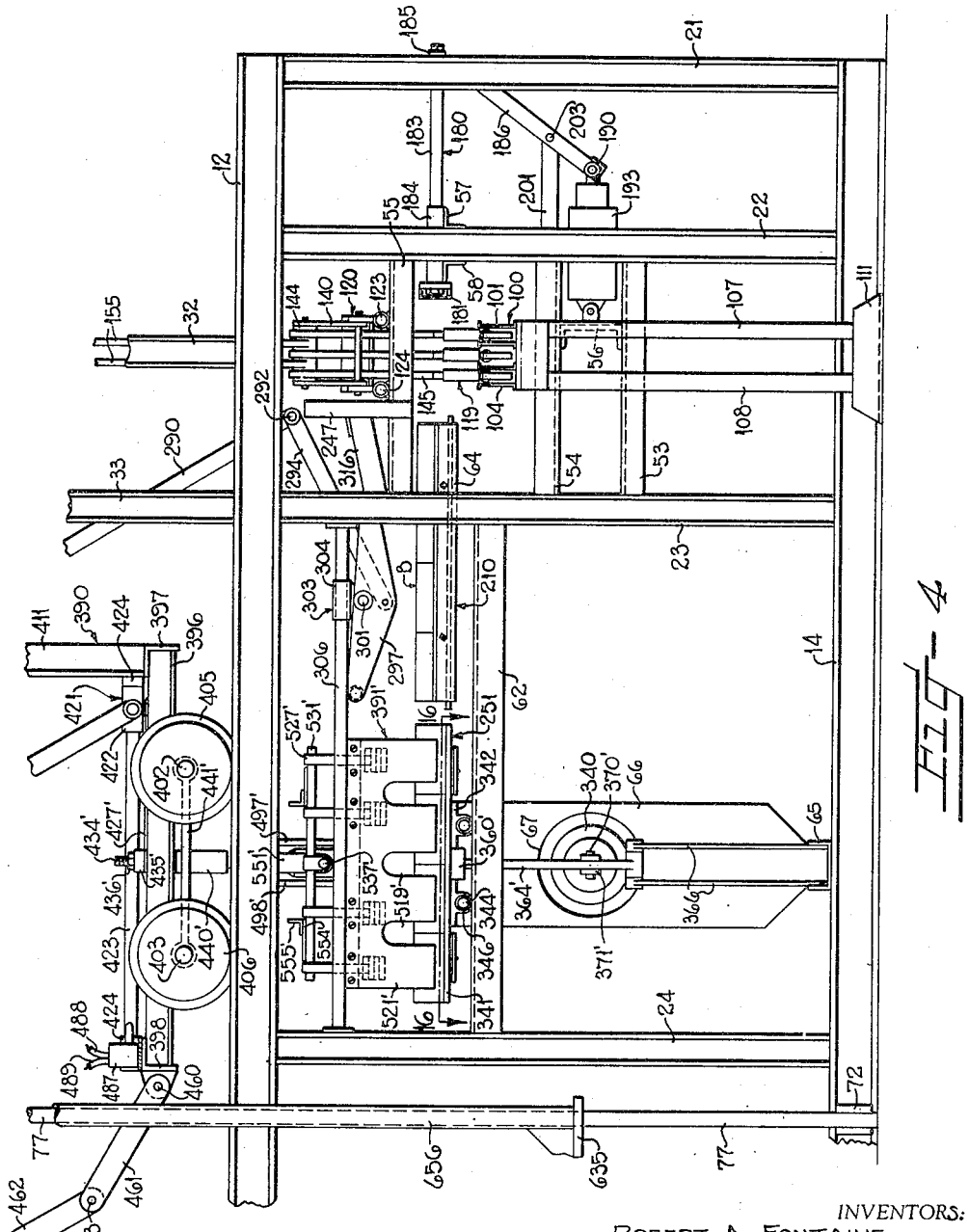

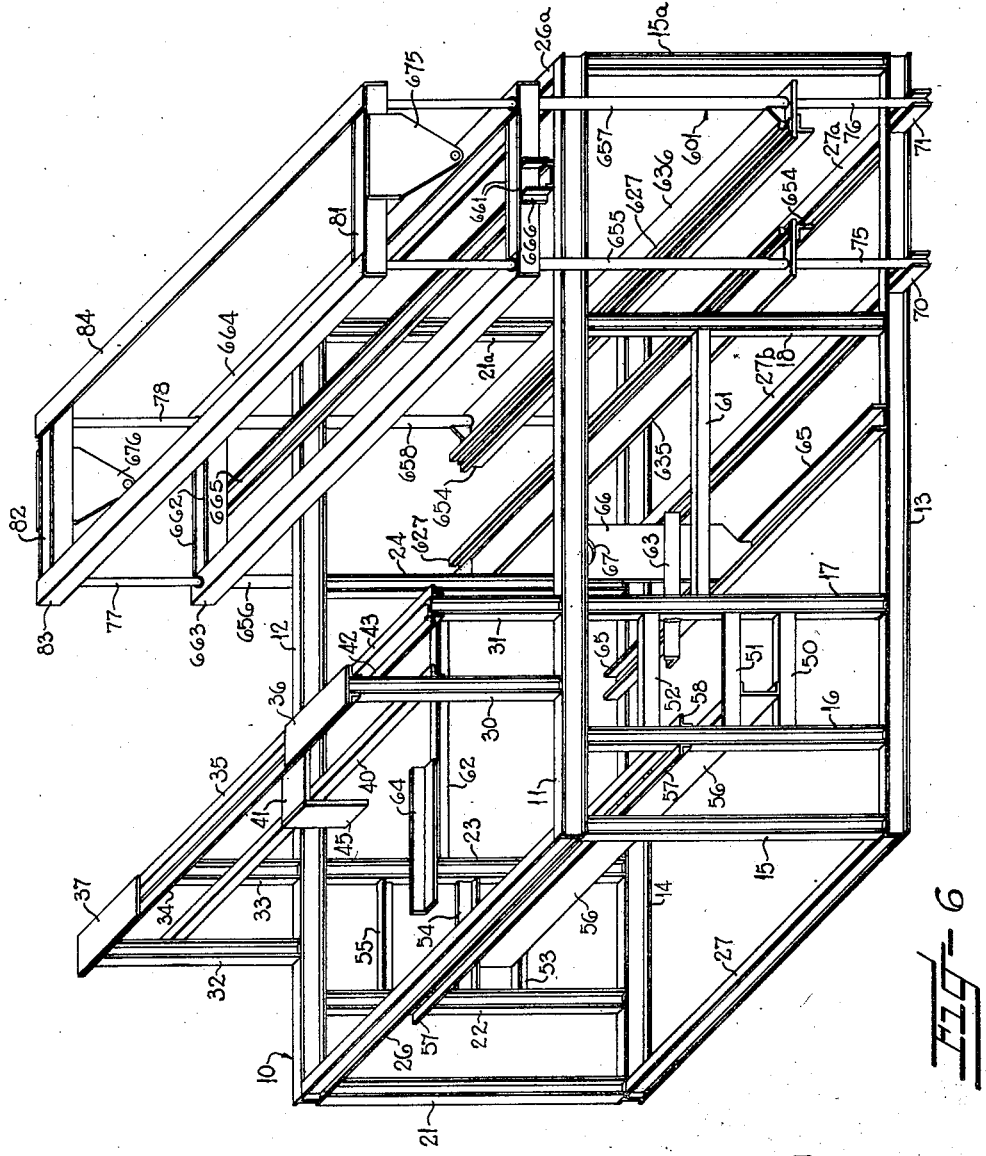

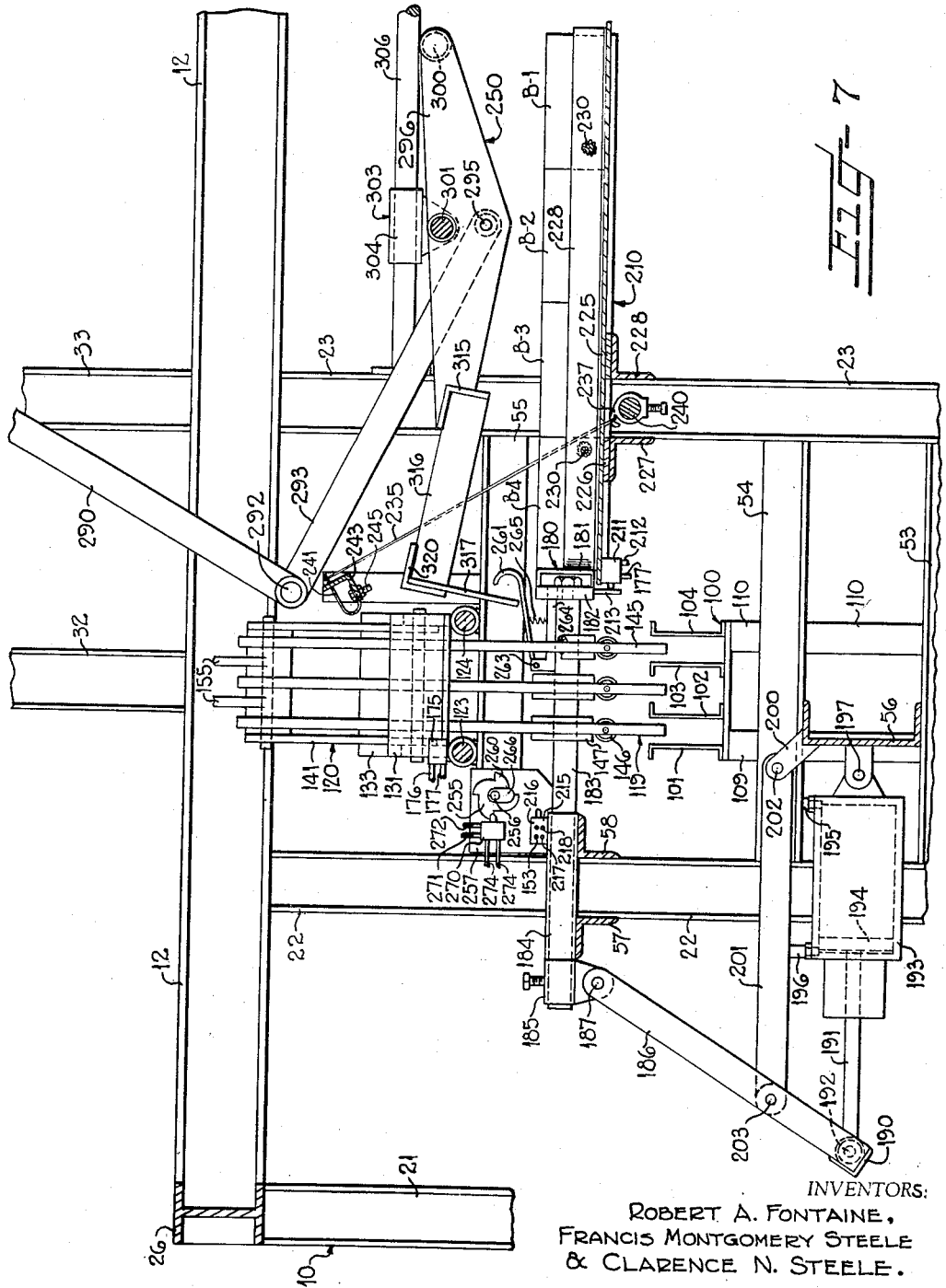

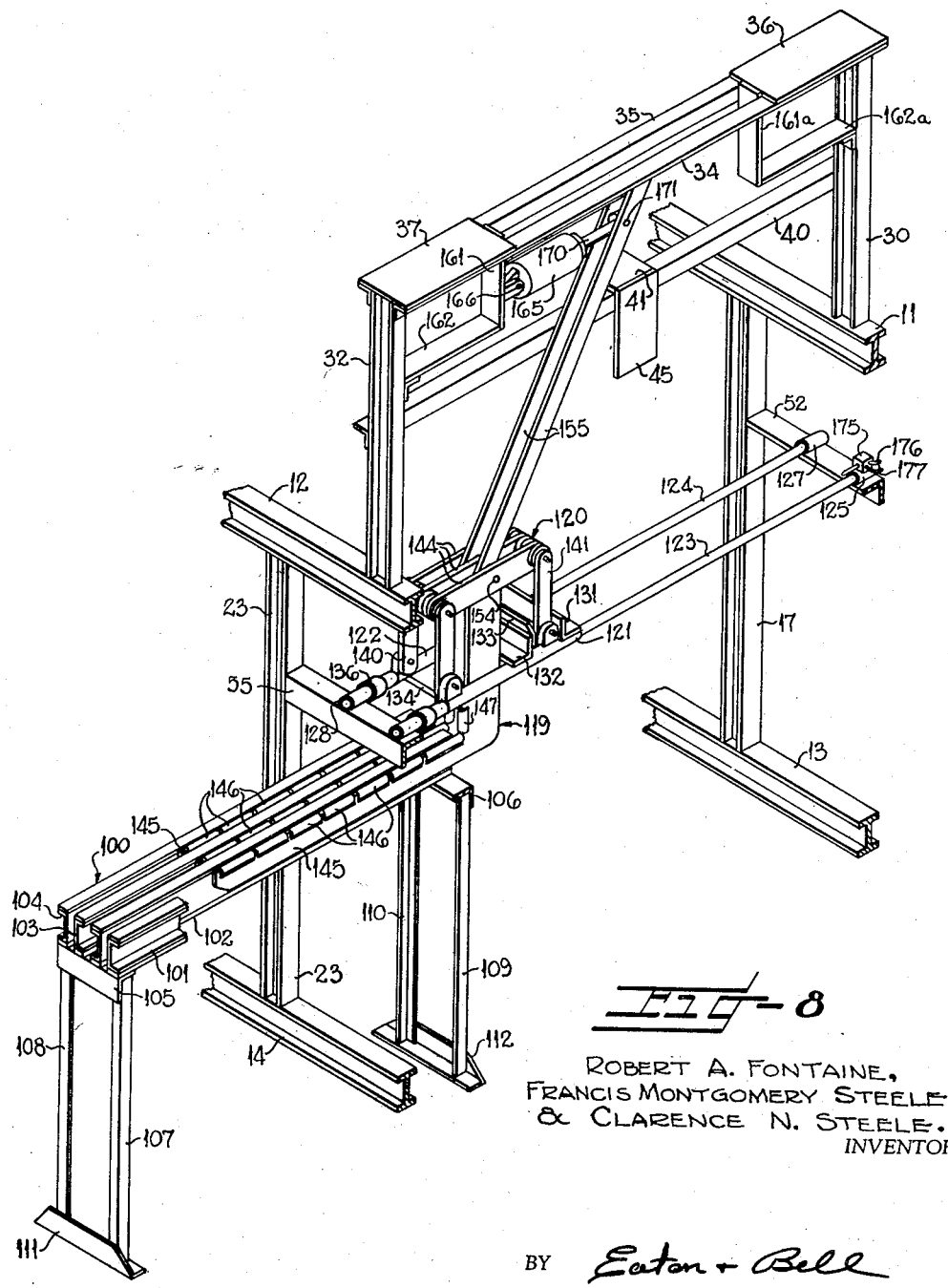

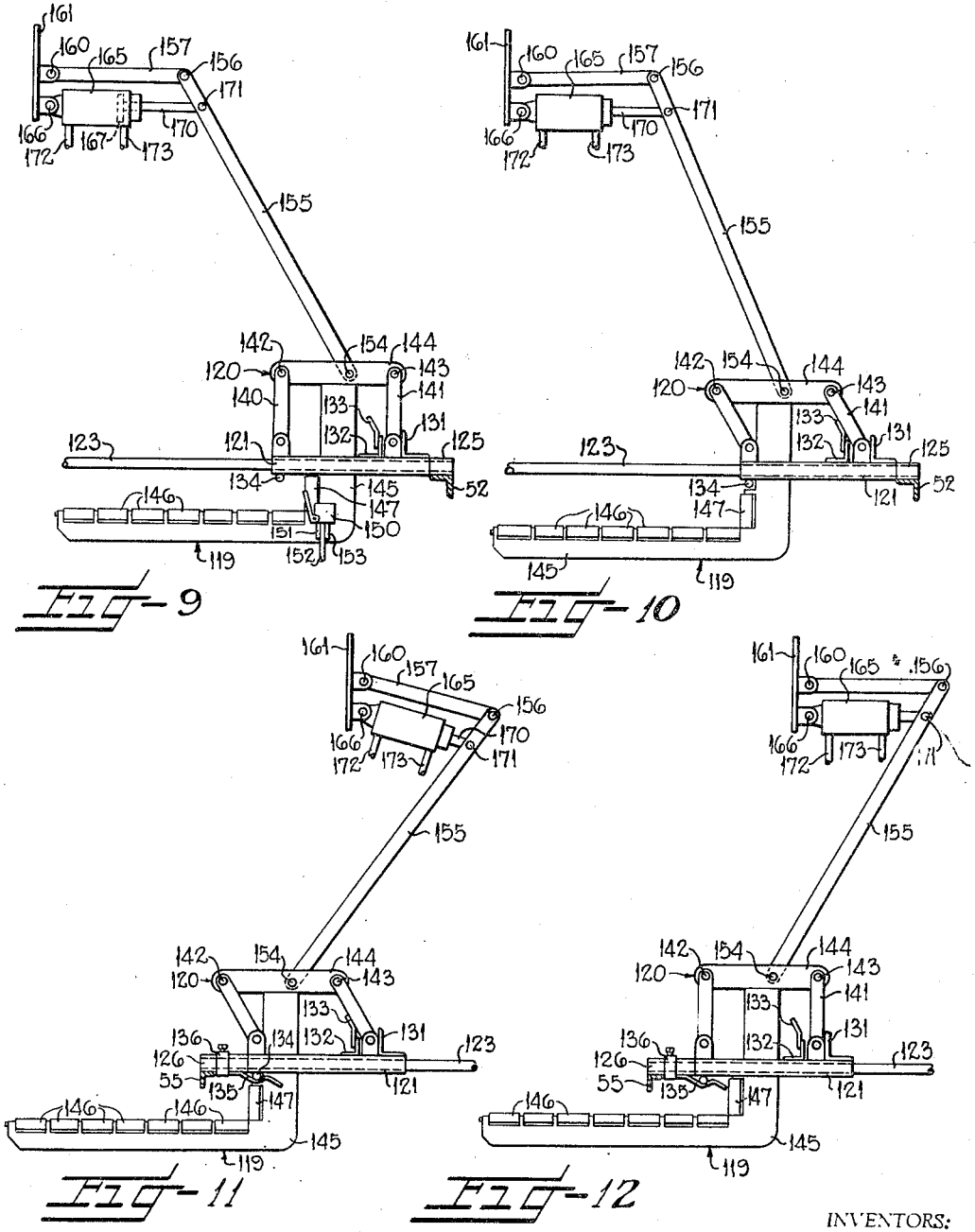

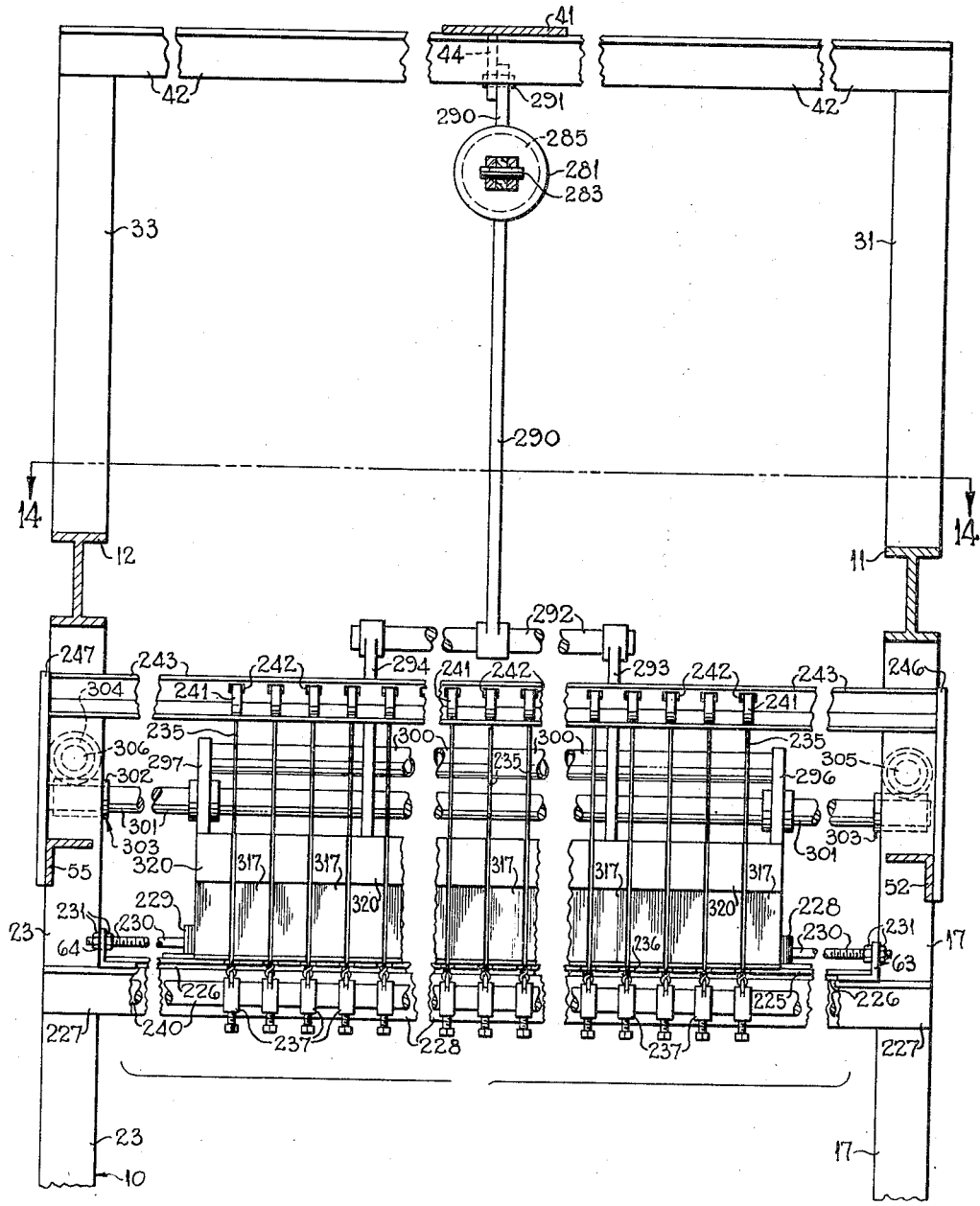

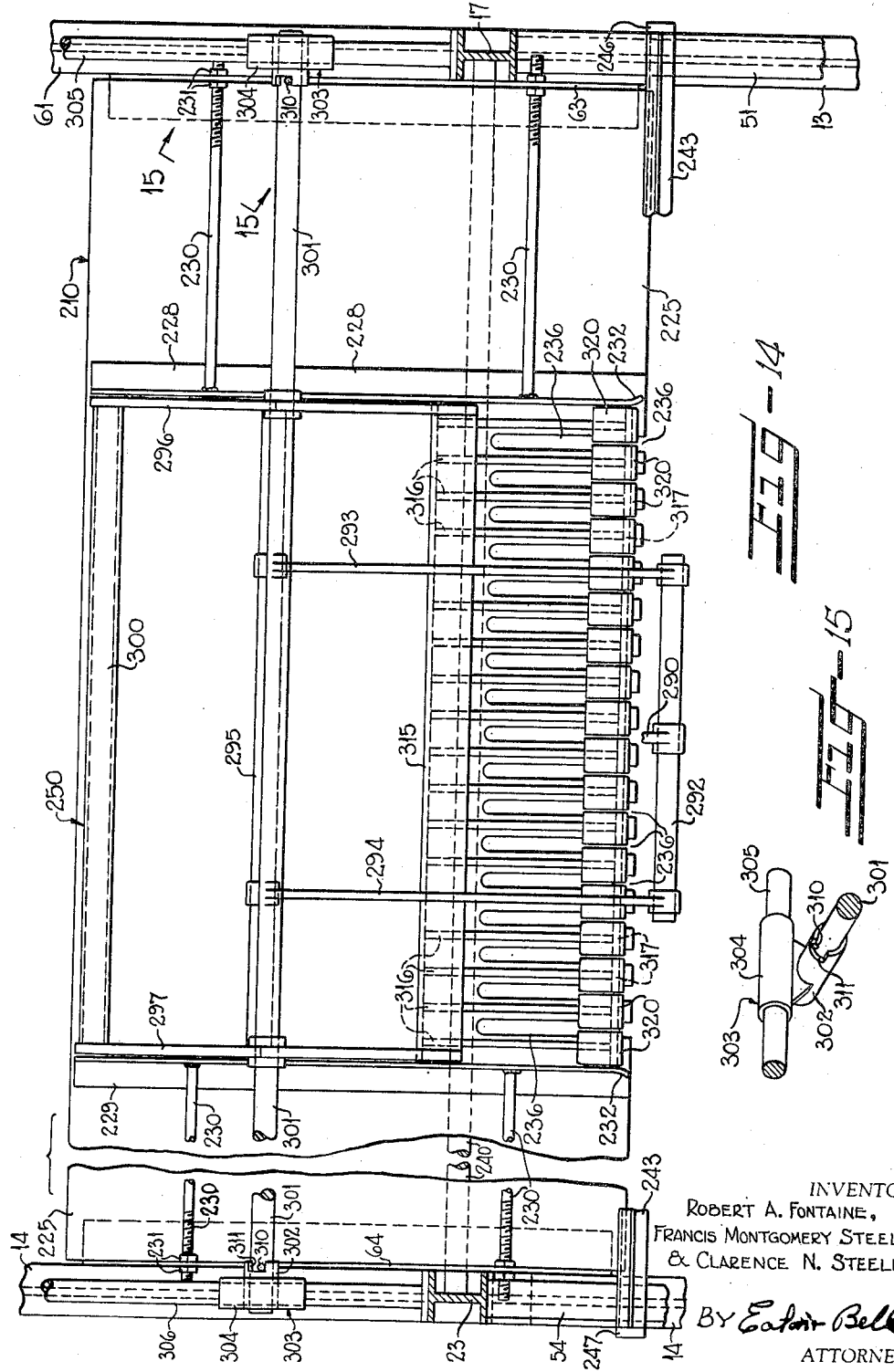

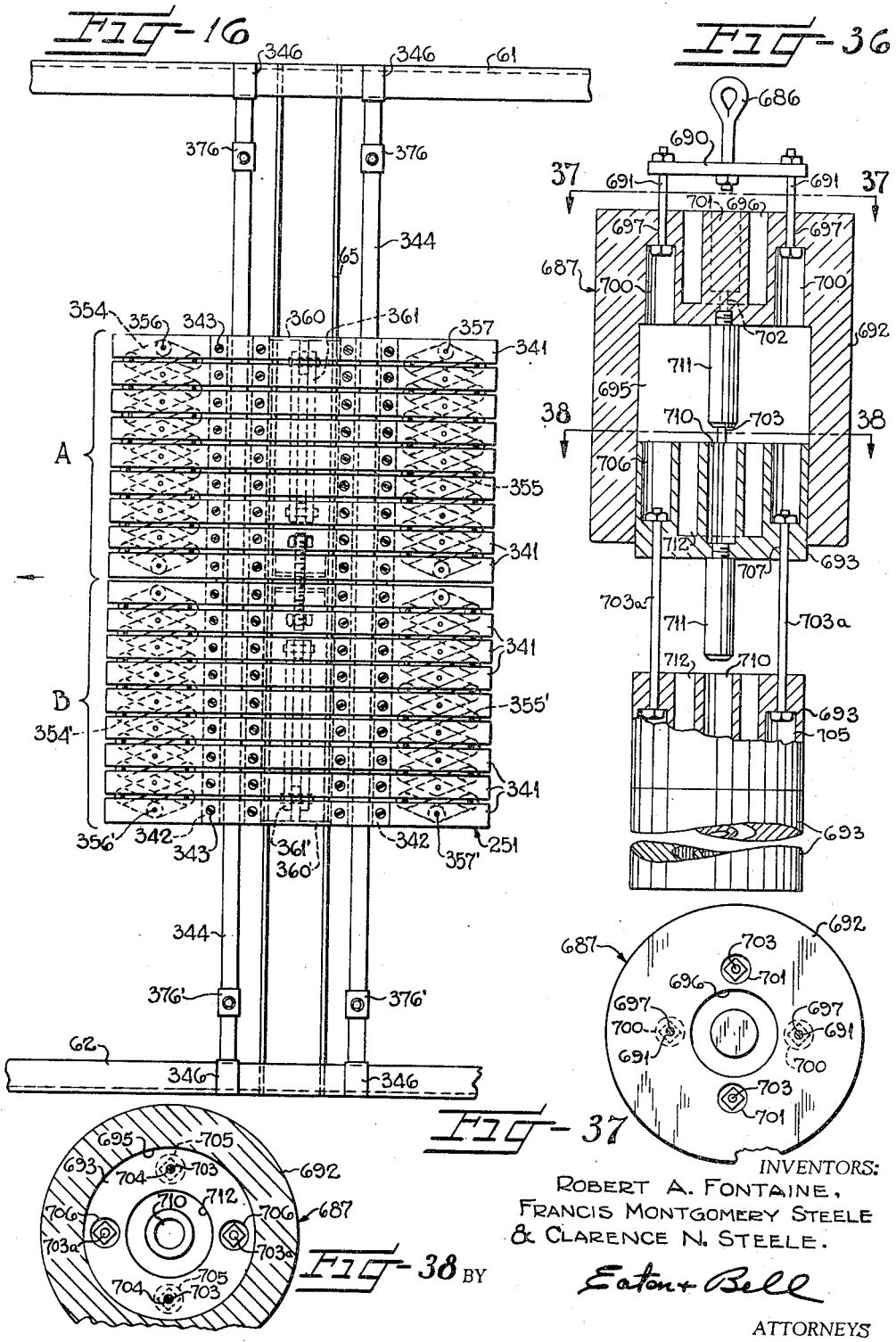

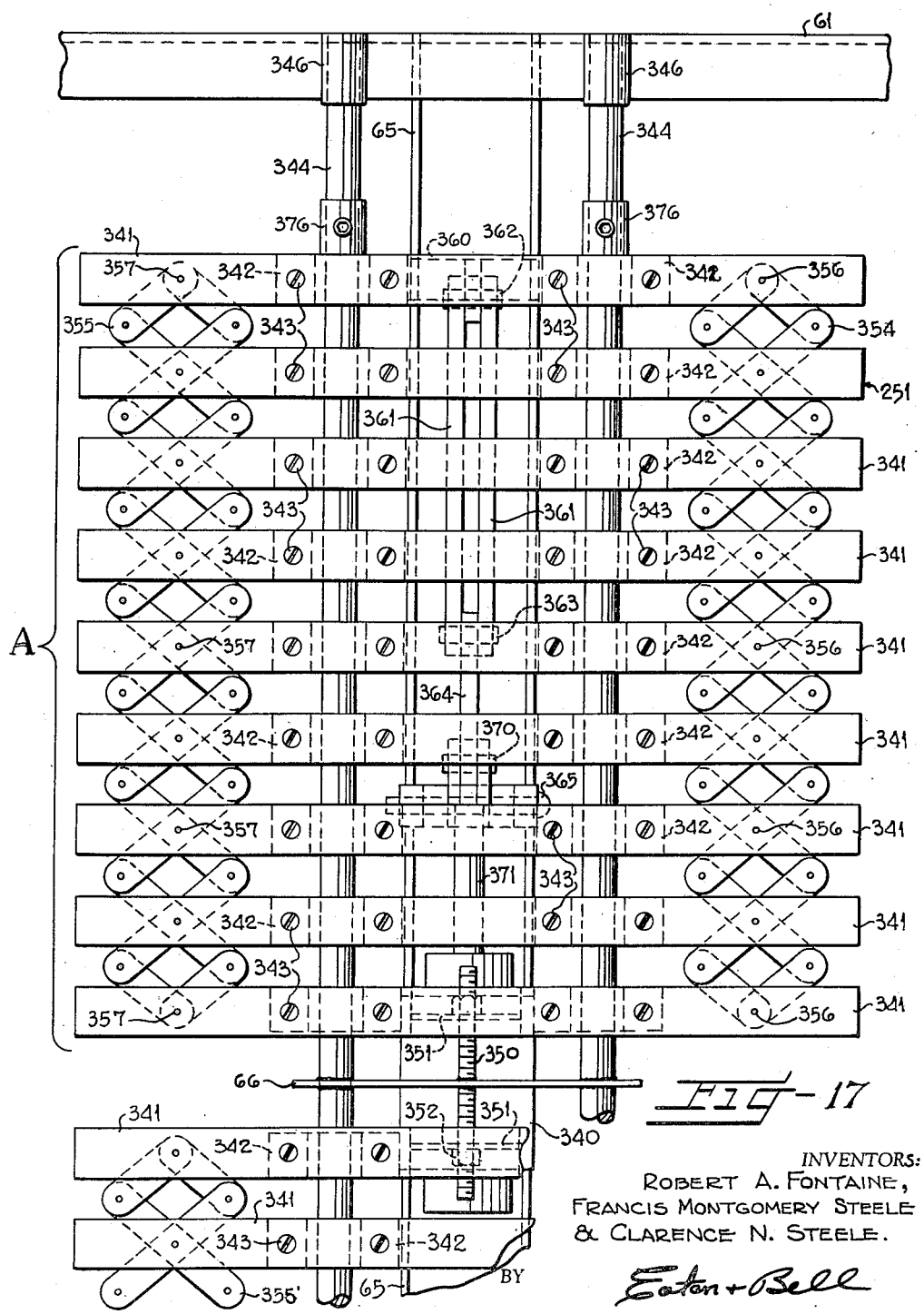

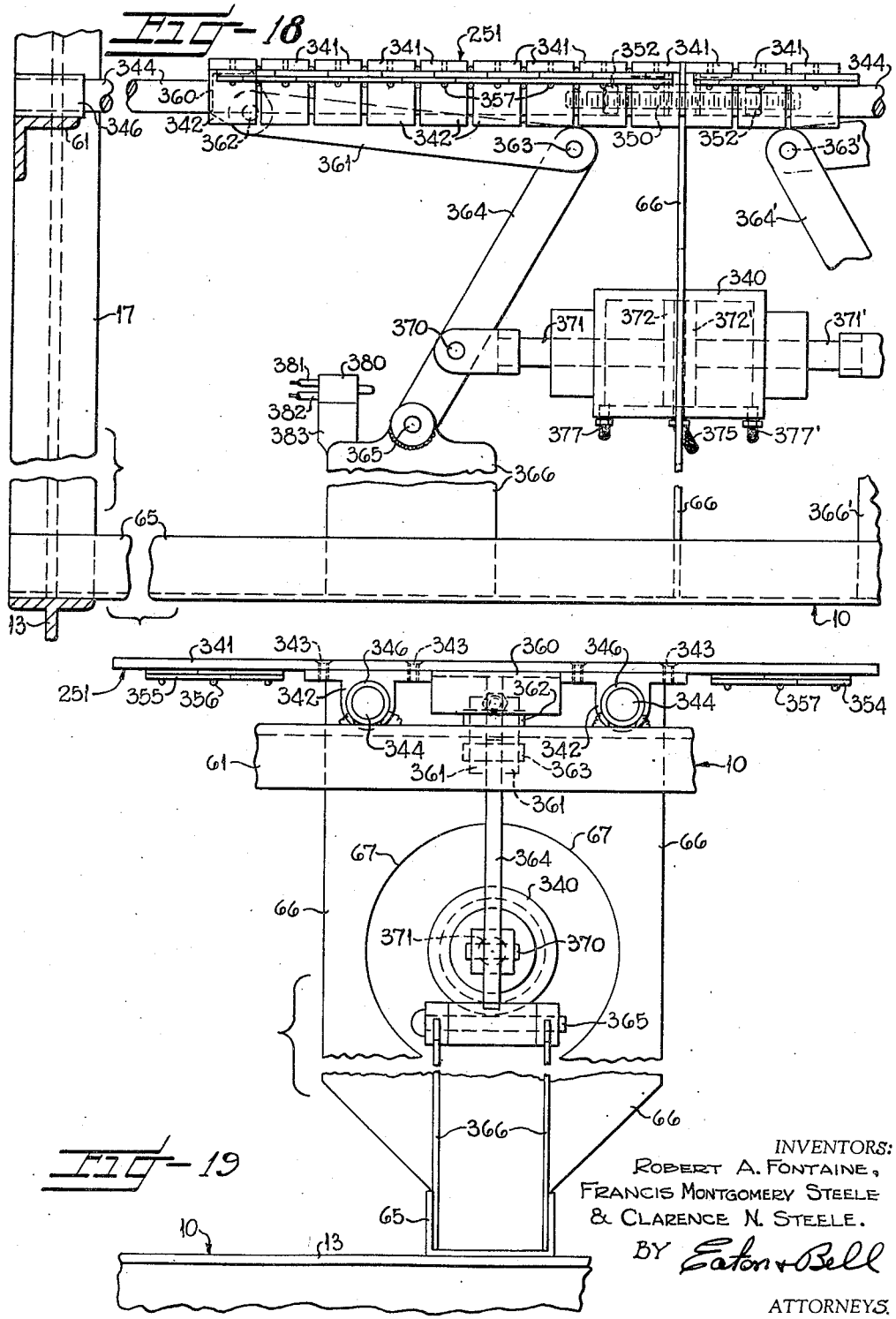

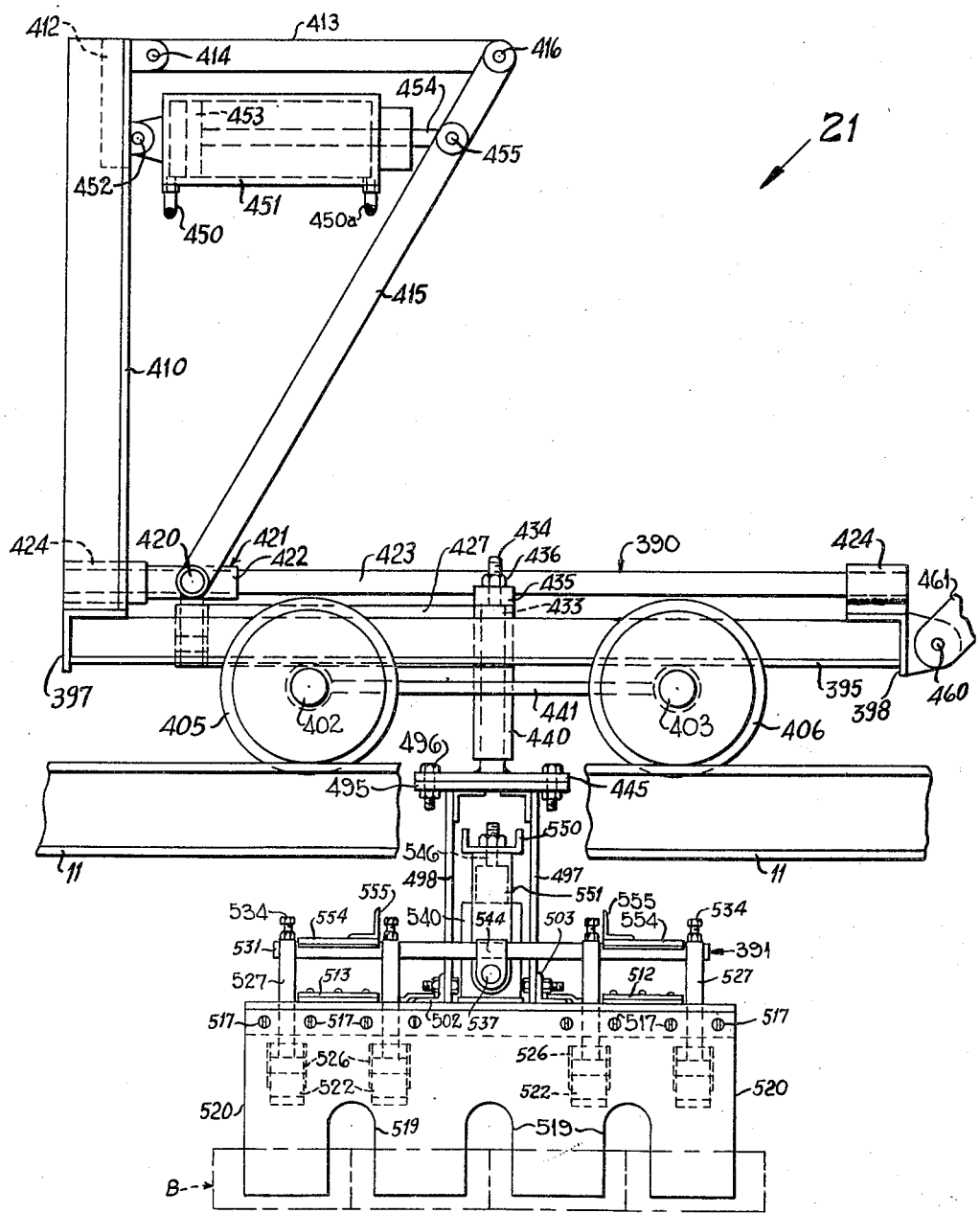

June 14, 1955  R. A. FONTAINE ET AL  2,710,696
BRICK HANDLING MACHINE
Filed May 2, 1951  28 Sheets-Sheet 16
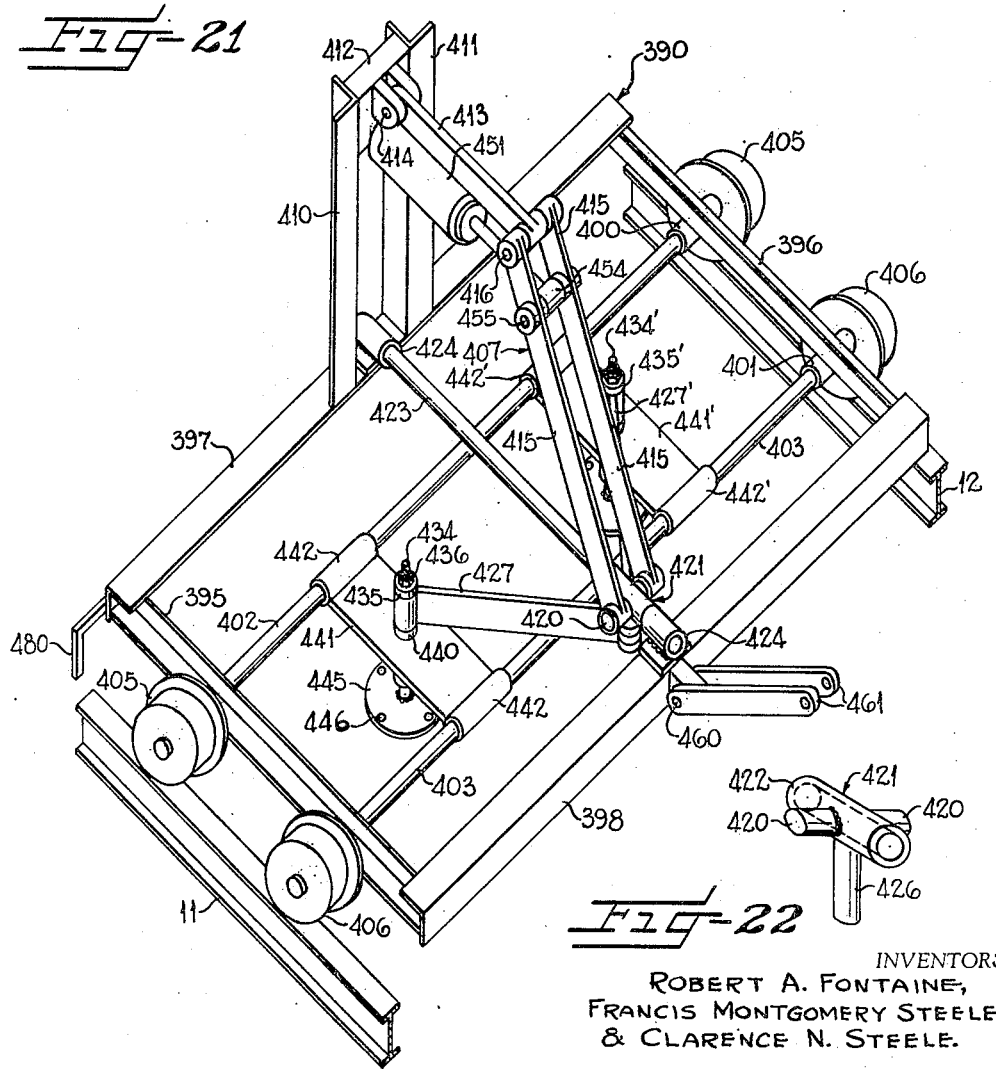
INVENTORS:
ROBERT A. FONTAINE,
FRANCIS MONTGOMERY STEELE
& CLARENCE N. STEELE.
BY  Eaton & Bell
ATTORNEYS.

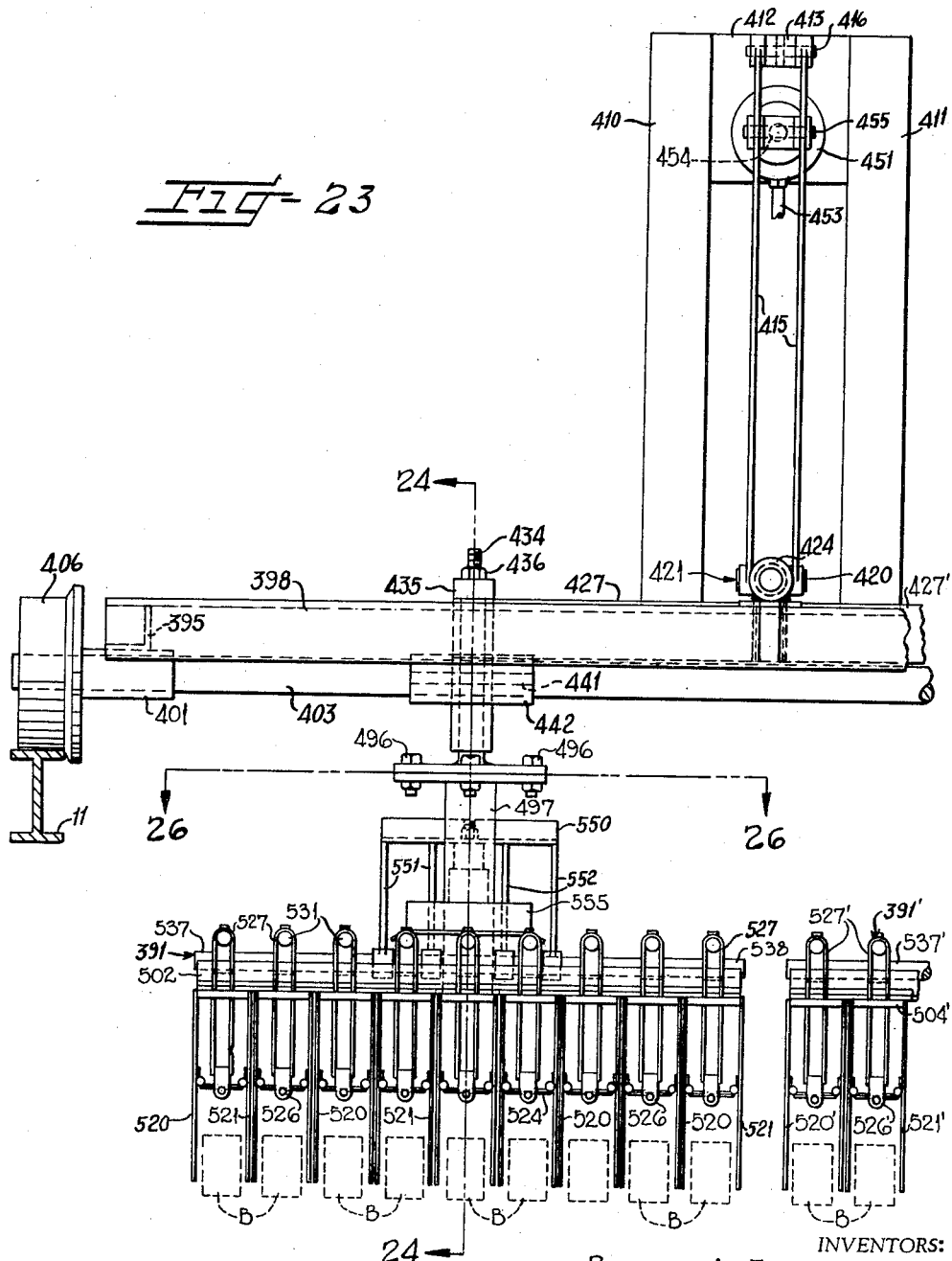

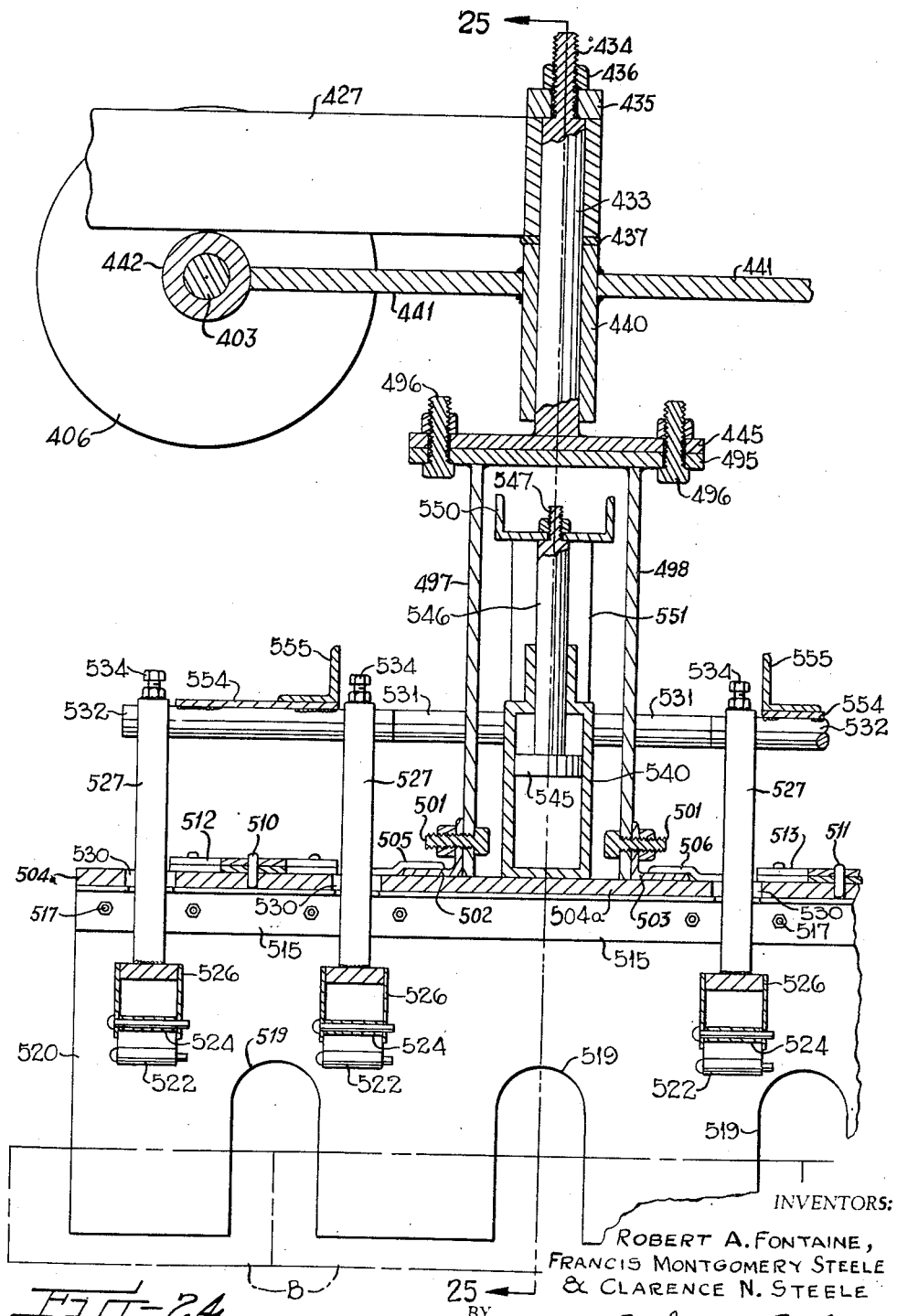

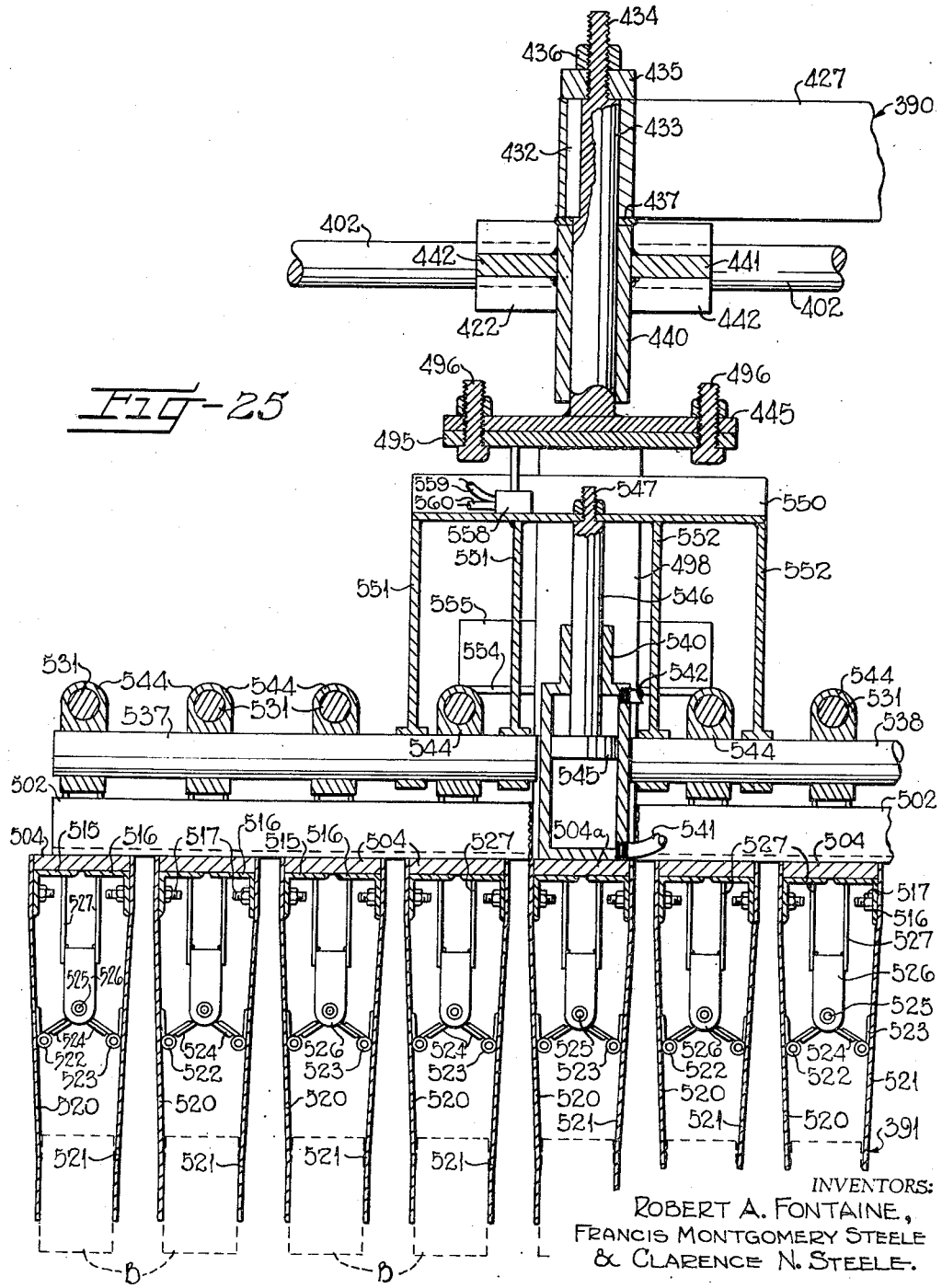

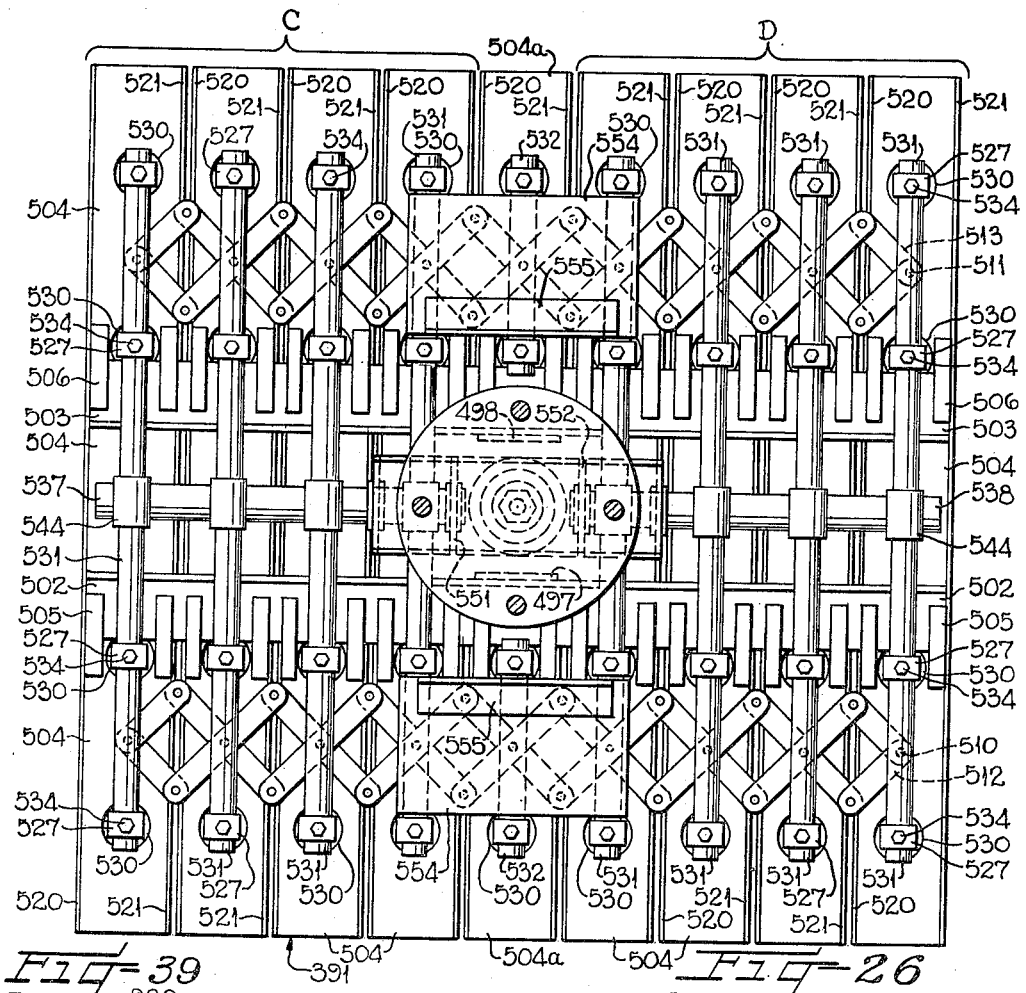
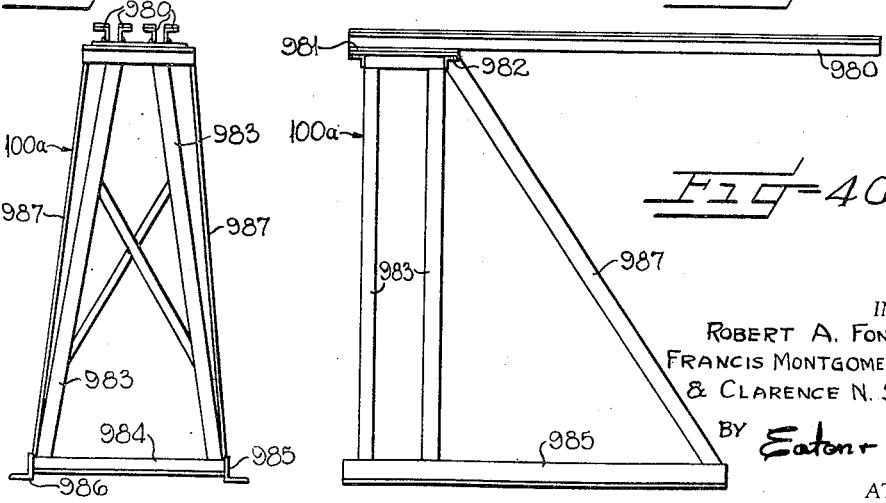

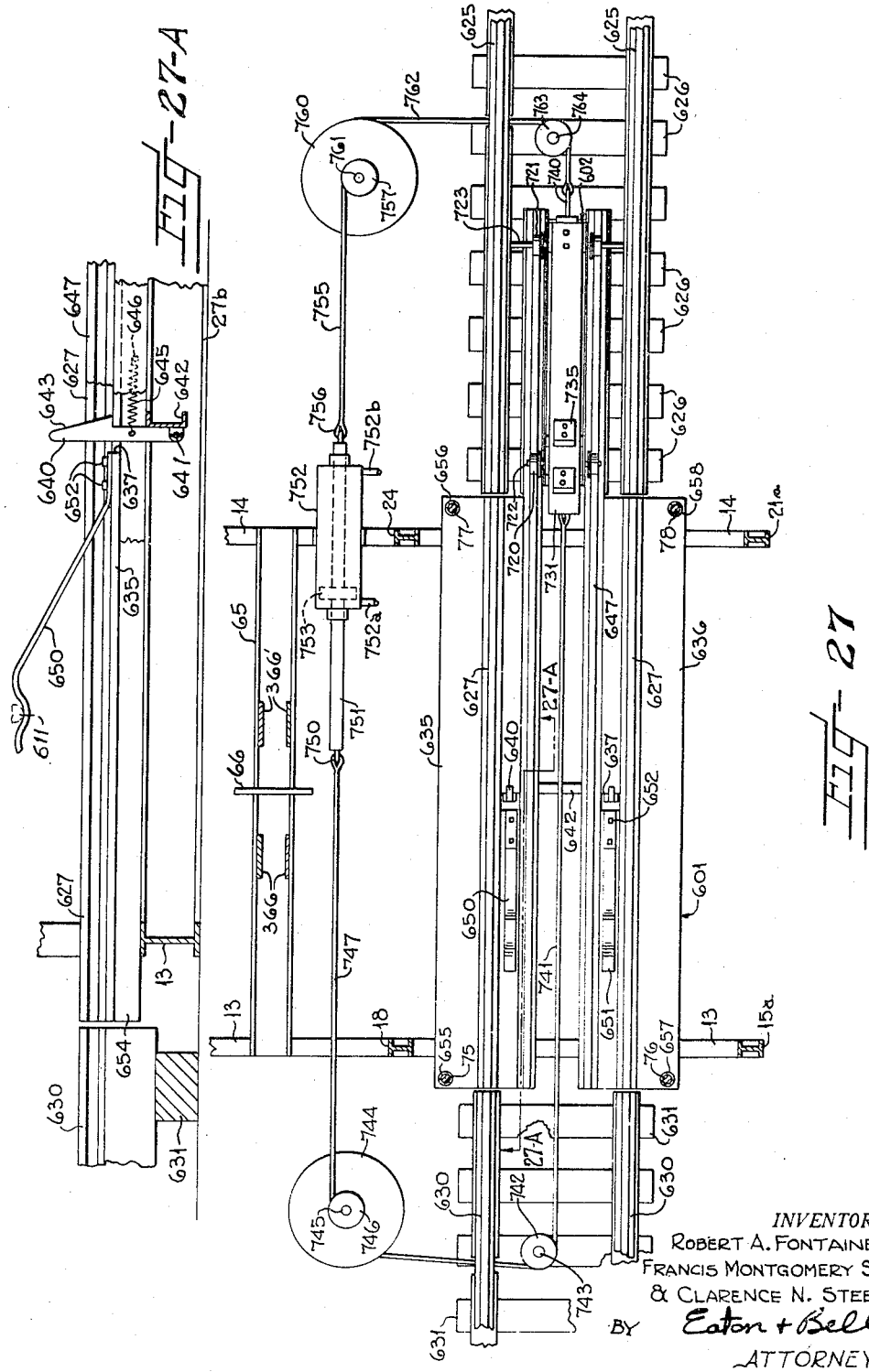

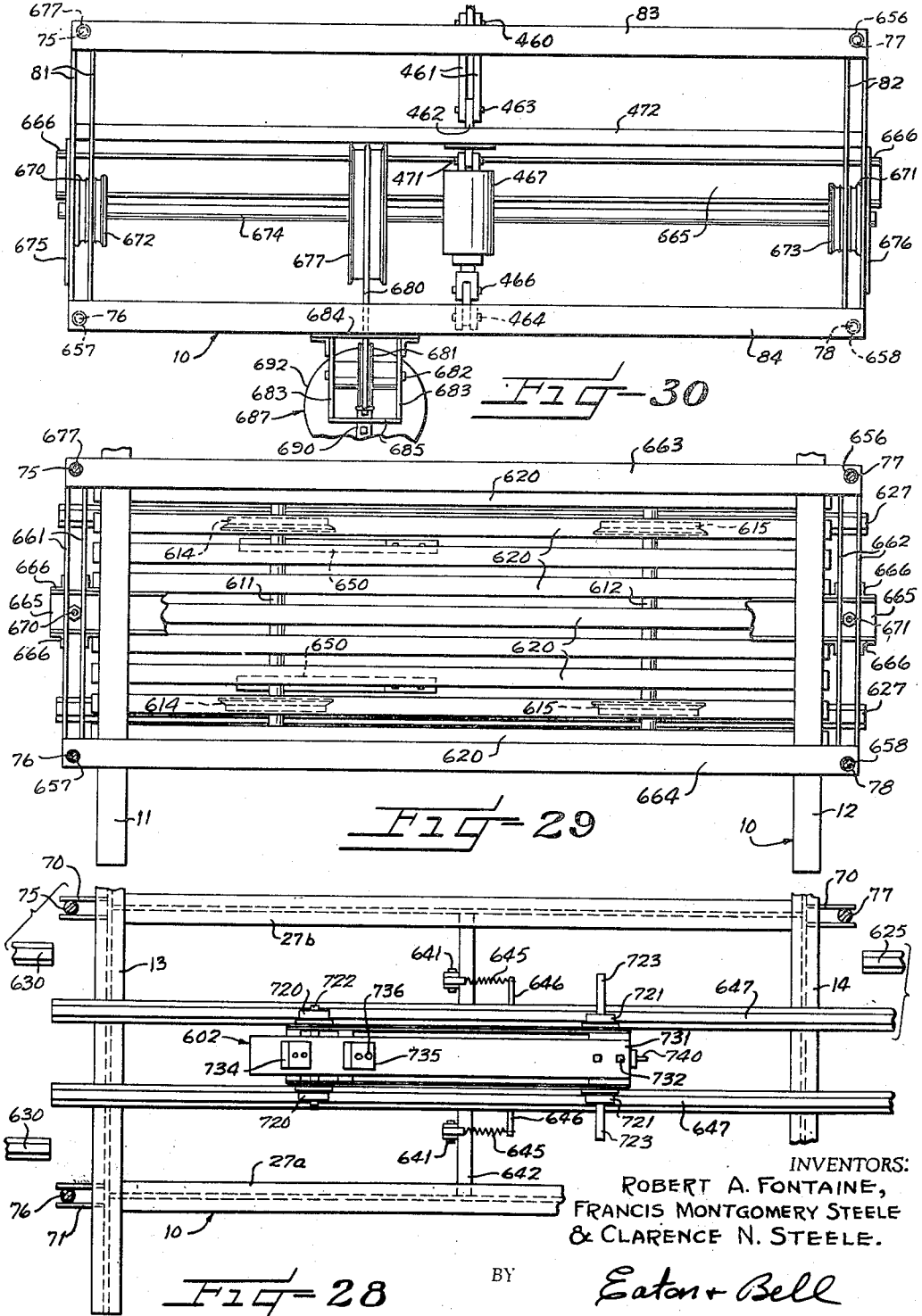

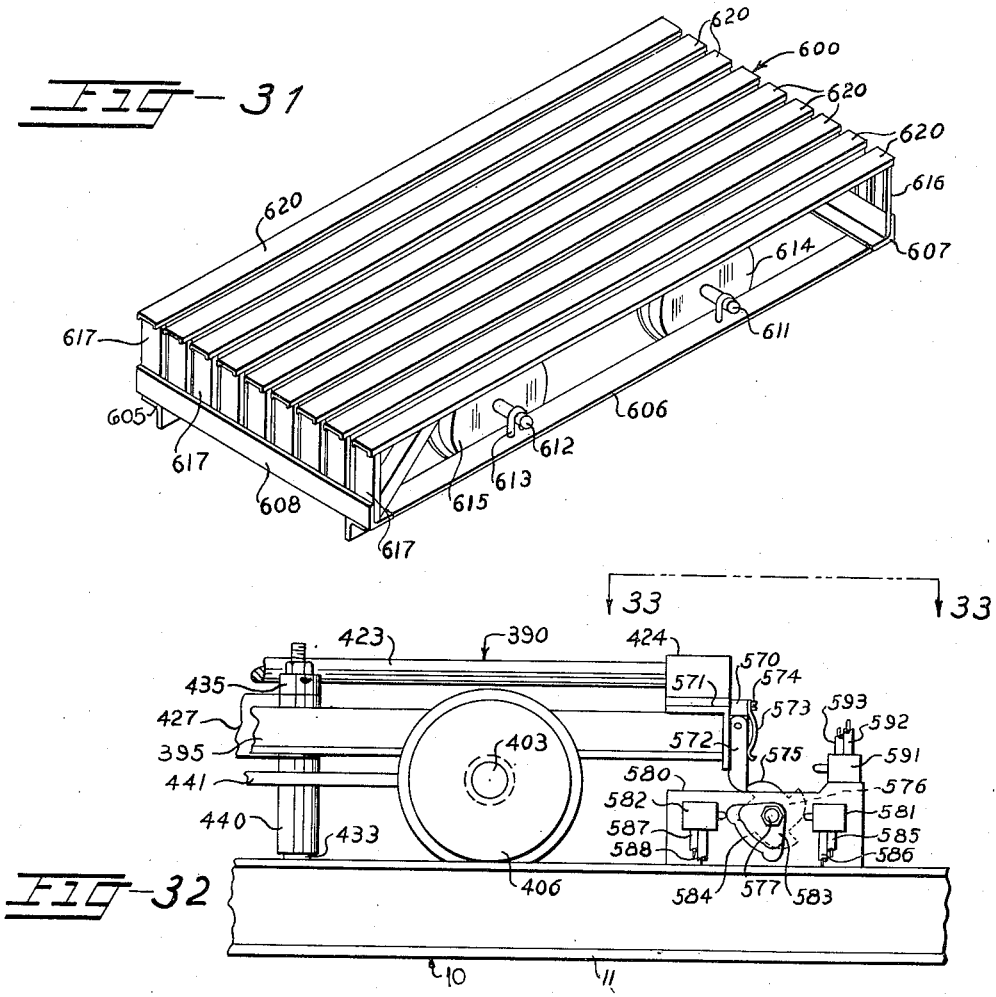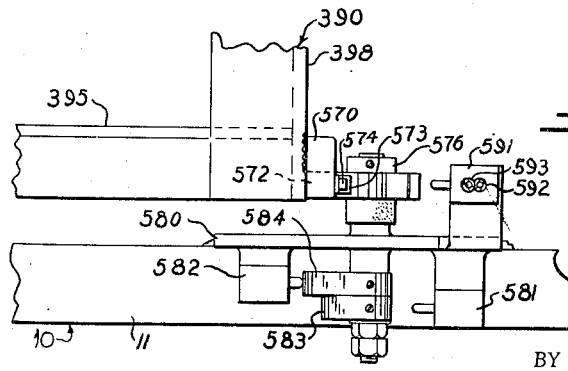

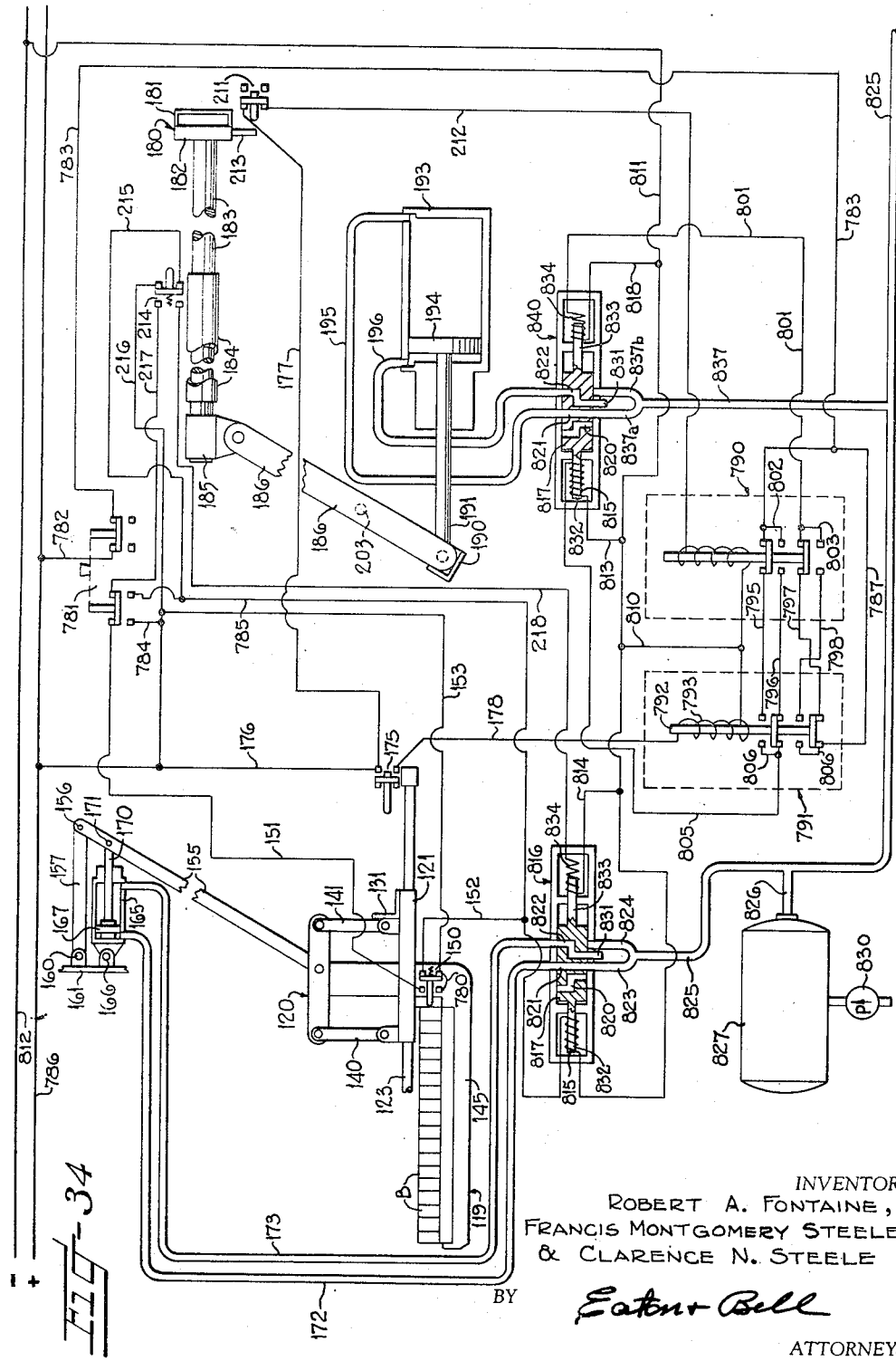

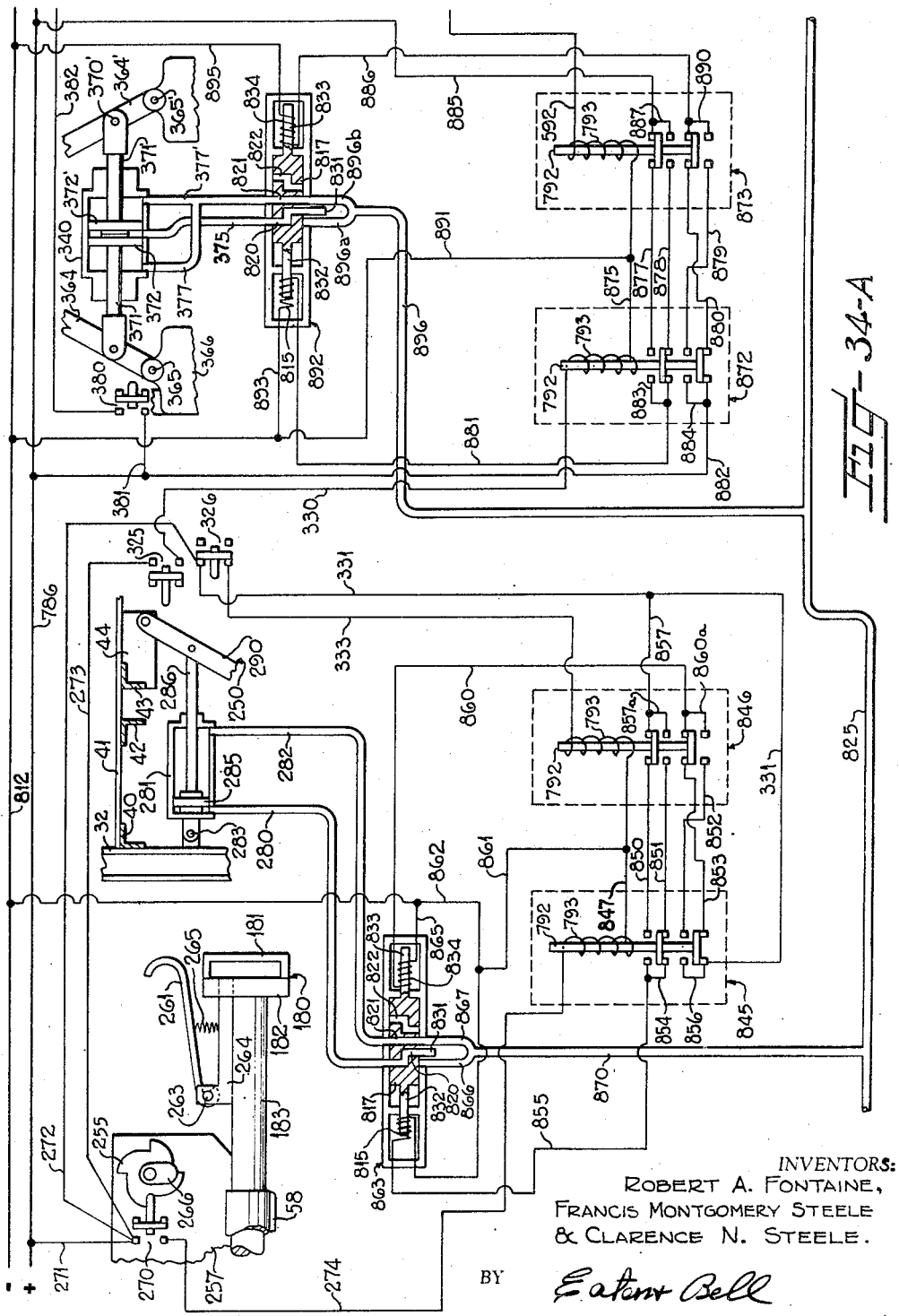

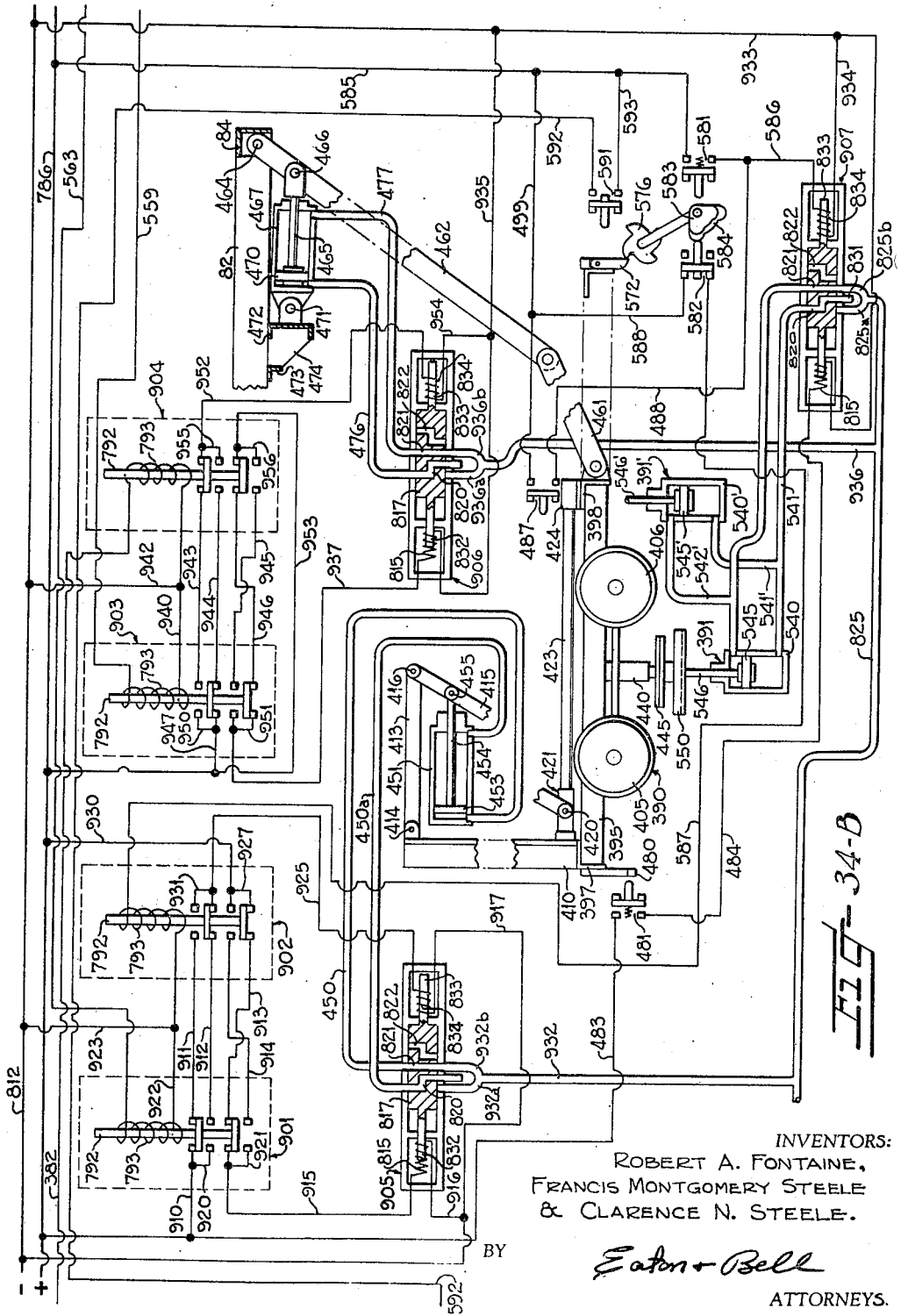

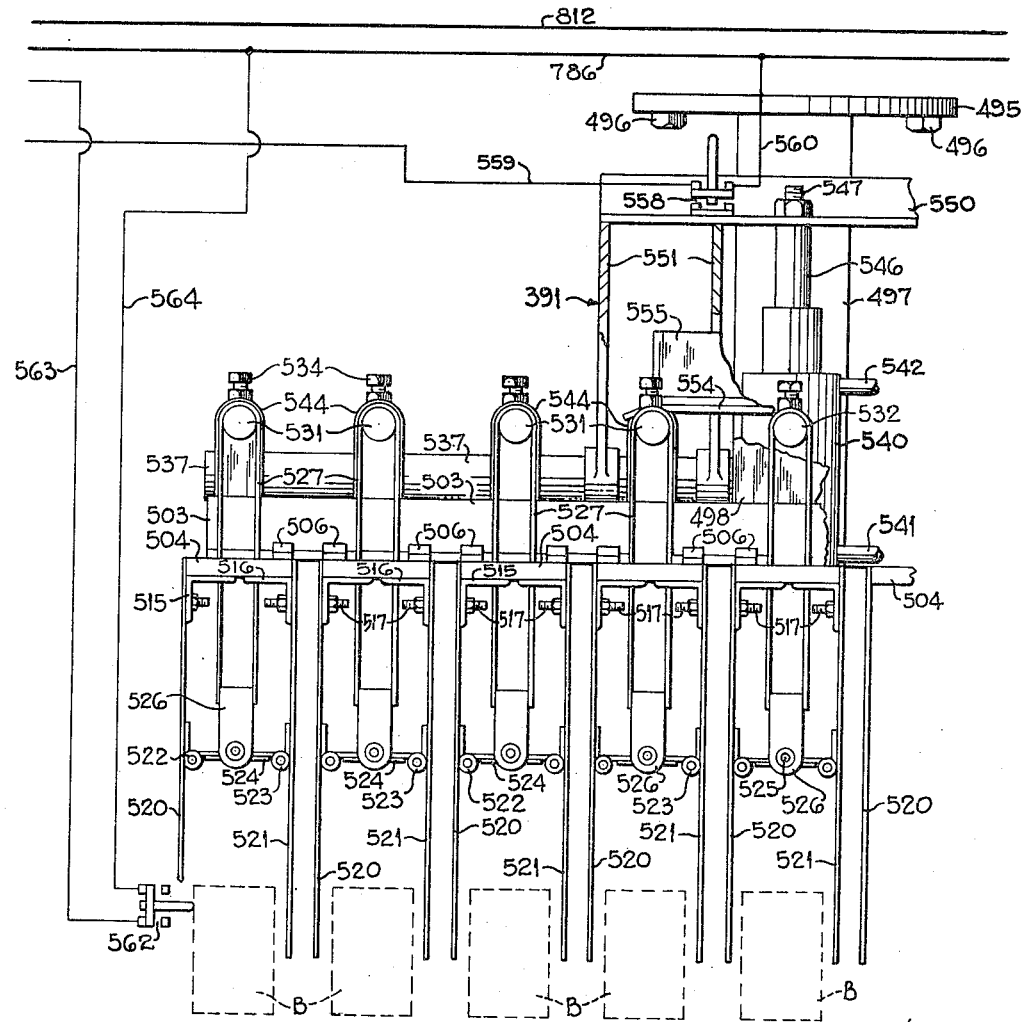
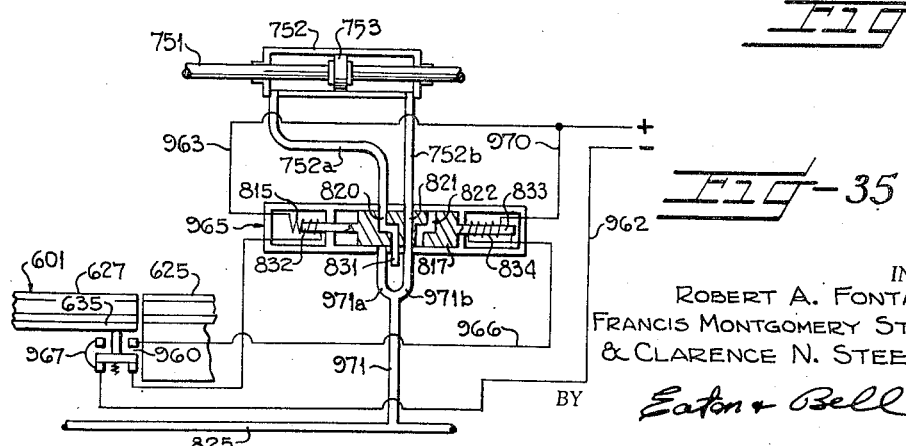

June 14, 1955 R. A. FONTAINE ET AL 2,710,696
BRICK HANDLING MACHINE
Filed May 2, 1951 28 Sheets-Sheet 28
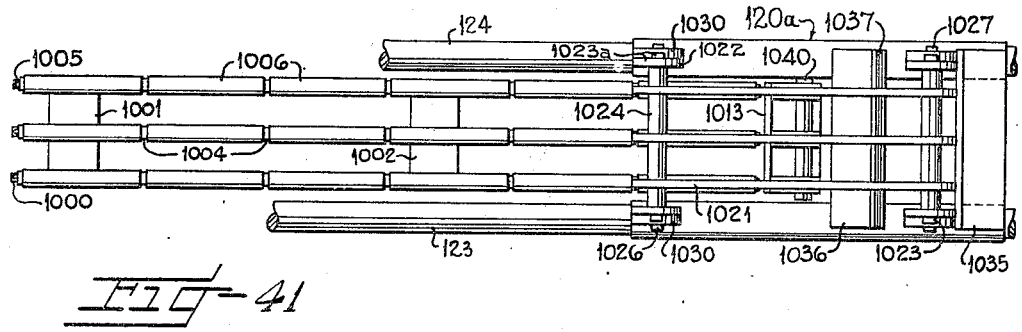
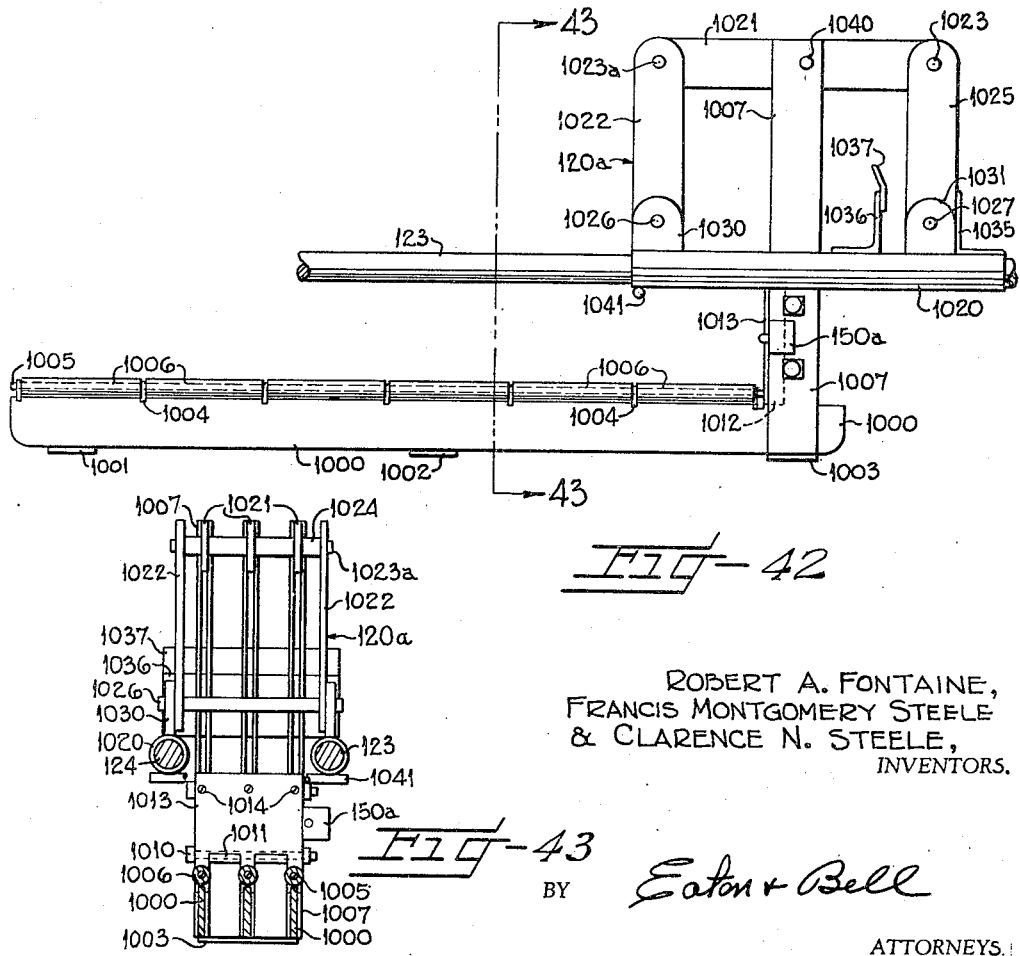
ROBERT A. FONTAINE,
FRANCIS MONTGOMERY STEELE
& CLARENCE N. STEELE,
INVENTORS.
BY Eaton + Bell
ATTORNEYS.

2,710,696

BRICK HANDLING MACHINE

Robert A. Fontaine, Martinsville, Va., and Francis Montgomery Steele and Clarence N. Steele, Statesville, N. C.; said Francis Montgomery Steele and said Clarence N. Steele assignors to said Fontaine; The First National Bank of Martinsville, Va., administrator c. t. a. of said Fontaine, deceased Application May 2, 1951, Serial No. 224,114

45 Claims. (Cl. 214—6)

This invention relates to material handling devices and more especially to a machine for handling cubically-shaped articles, such as bricks and the like after they have been shaped and for arranging bricks in tiers wherein the bricks in each tier are spaced apart from each other and alternate or spaced tiers of bricks are arranged transversely of the tiers therebetween. Such arrangement of the bricks is conducive to uniform drying or firing of the bricks as they are subsequently admitted to the dryer or kiln. This manner of arranging the bricks for drying and firing purposes is commonly known to the art as a hacking operation.

Heretofore, in a hacking operation, upon the bricks being shaped, it has been necessary for an operator, commonly known as a hacker, to pick up each brick individually and to carefully arrange the bricks in tiers in substantially the manner heretofore described. Now, as is well known to those familiar with the art, ceramic articles, such as bricks, terra cotta, tile and the like are molded or shaped from wet clay or other pliable substances and are quite wet during the hacking operation. Thus, when these articles are handled manually, they are very easily broken or otherwise damaged resulting in a considerable waste as well as substantially reducing the productive capacity of the particular means which may be employed in shaping the articles. It is evident that it is also a time consuming operation to perform the hacking operation manually and it is likely that a considerable number of operators would be necessary in performing a hacking operation when production machinery is employed in shaping the bricks and the like.

It is therefore an object of this invention to provide an automatic brick hacker having means for receiving bricks from the shaping machine and arranging the bricks in tiers wherein a plurality of bricks in each tier are arranged in rows in which the bricks are disposed in end-to-end relation and the rows being spaced apart from each other and the bricks in the alternate or spaced tiers being disposed transversely of the bricks therebetween.

It is another object of this invention to provide a table onto which the bricks may be directed by suitable conveyor means or on which the bricks may be placed in side-by-side relation with automatically operable means for lifting the bricks off of the table upon a predetermined number of bricks being directed thereto and to carry the bricks into the machine where they will be removed from the carrying means and automatically transferred to an intermediate or accumulator table. Upon a predetermined number of rows of bricks being admitted to the table, there is provided subsequent to the table a separator table to which the predetermined number of rows of bricks are automatically directed. The separator table is controlled automatically so that, upon the said rows of bricks being admitted to the separator table, the bricks having been received by the separator table in juxtaposed relation to each other, the separator table causes the bricks to be moved apart from each other in accurately spaced relation with respect to the side surfaces thereof. A grab carriage having a plurality of flexible grasping vanes depending therefrom, which are disposed in spaced side by side relation to each other, then moves into position above the separator table and the vanes thereof straddle each of the rows of end-to-end bricks which are formed by the separator table. The grab carriage has means automatically operable upon being positioned above the separator means for moving adjacent pairs of vanes towards each other for grasping opposed sides of the corresponding rows of end-to-end bricks whereupon the grab carriage automatically moves away from the vertical plane of the separator means to slide the bricks therefrom onto a suitable tier-carrying car, following which the bricks are automatically released from the vanes.

The car is supported on a resiliently mounted elevator which will move downwardly a predetermined distance upon each tier of bricks being admitted thereto to cause the upper surface of each tier of bricks to be disposed in substantially the same horizontal plane as the upper surface of the separator table.

The above operations are repeated until the desired number of tiers of bricks have been deposited on the tier-carrying car at which point there is provided latch means for locking the elevator in a lowered position, in which position the car may be moved off of the elevator onto a suitable trackway provided therefor for directing the car to the kiln.

It is another object of this invention to provide means associated with the grab carriage for rotating the grasping vanes a quarter revolution, as a unit, after they have grasped the corresponding rows of bricks so that alternate or spaced tiers of bricks may be disposed transversely of the tiers therebetween as they are deposited on the tier-carrying car.

It is still another object of this invention to provide means for automatically propelling an empty car onto the elevator upon the elevator being moved to a lowered position by virtue of the weight of the loaded car thereon, the propelling means having means for engaging the loaded car to move the same off of the elevator as the empty car is positioned thereon. There is also provided means for automatically releasing the elevator from the latch means as the empty car is properly positioned thereon, whereupon the elevator will be elevated to where the upper surface of the empty car will be disposed in substantially the same horizontal plane as that of the upper surface of the separator table heretofore described or at a slightly lower elevation.

Throughout the specification and claims; wherever the term "bricks" is used, this is to indicate any type of article which may be handled by this machine, particularly cubically-shaped articles. Also, it is to be understood that the structure shown, the types of electrical and pneumatic devices described, the location of the various switches and the actuating medium therefor, may be materially varied from that shown in the drawings without departing from the spirit of the invention. It is well known that a hydraulic system may also be employed in lieu of the pneumatic system herein described.

Some of the objects of the invention have been stated, other objects will appear as the description proceeds, when taken in connection with the accompanying drawings, in which—

Figure 1 is a top plan view of the brick handling machine with some of the parts being omitted and other parts being broken away for purposes of clarity;

Figure 2 is a front elevation of the machine with some of the parts omitted and other parts being broken away and looking at the lower end of Figure 1;

Figure 3 is a right-hand side elevation of the machine with parts broken away and looking at the right-hand side of Figure 1;

Figure 4 is an enlarged fragmentary elevation of the machine looking substantially along the line 4—4 in Figure 1 with the upper portion thereof broken away;

Figure 5 is an elevation looking at the rear or discharge end of the machine;

Figure 6 is an isometric view looking at the front and right-hand sides of the framework of the machine, the various movable parts being omitted for purposes of clarity;

Figure 7 is an enlarged elevation with parts in section taken substantially along the line 7—7 in Figure 2 and showing the carrier forks in withdrawn position and the transfer means in operative position or in the position assumed upon transferring the molded bricks from the carrier forks to the accumulator table and also showing the means for sliding the bricks off of the accumulator table in an inoperative position;

Figure 8 is an enlarged isometric view with parts in section looking substantially along the line 8—8 in Figure 1 and showing the carrier forks in extended or operative position;

Figures 9, 10, 11 and 12 are schematic views showing the various positions through which the carrier forks and the carriage therefor pass in a cycle of their operation;

Figure 13 is an enlarged elevation with parts in section looking substantially along the line 13—13 in Figure 3 and showing the rake for transferring the bricks from the intermediate table to the separator table and also showing the slitting or dividing wires associated therewith and past which the bricks move as they are transferred from the carrier fork mechanism to the intermediate table to prevent adjacent bricks from adhering to each other;

Figure 14 is a top plan view of the accumulator table with parts broken away and omitting the slitting wires and being taken substantially along the line 14—14 in Figure 13;

Figure 15 is a fragmentary isometric view looking substantially along the line 15—15 in Figure 14 and showing the manner in which the support shaft for the raking means is mounted at one end thereof;

Figure 16 is an enlarged top plan view of the separator table looking substantially along the line 16—16 in Figure 4 and showing the separator table in closed or inoperative position;

Figure 17 is an enlarged top plan view similar to Figure 16 but showing only the upper portion thereof and showing the separator table in open or operative position;

Figure 18 is a fragmentary elevation with parts broken away looking substantially at the left-hand side of Figure 17 but showing the separator table in closed or inoperative position and looking at the rear end of the table;

Figure 19 is a fragmentary elevation with parts broken away looking substantially at the left-hand side of Figure 18;

Figure 20 is an enlarged elevation of the upper central portion of Figure 3 with parts broken away and showing the grab carriage and the associated flexible vanes in position for grasping the corresponding rows of bricks;

Figure 21 is a schematic isometric view looking substantially in the direction of the arrow 21 in Figure 20 but omitting the vanes and the vane carriages which depend from the grab carriage in Figure 20 and also showing some of the parts in a different position;

Figure 22 is an enlarged isometric view of the universal connecting member shown in the lower central portion of Figure 21;

Figure 23 is a view looking at substantially the right-hand end of Figure 20 but showing only substantially half of the grab carriage and the associated bank of flexible grab vanes;

Figure 24 is an enlarged fragmentary vertical sectional view taken substantially along the line 24—24 in Figure 23 but showing the parts in a different position;

Figure 25 is a vertical sectional view taken substantially along the line 25—25 in Figure 24;

Figure 26 is an enlarged top plan view with parts in section looking substantially along the line 26—26 in Figure 23 and showing one of the banks or groups of grab vanes;

Figure 27 is a partially schematic top plan view with parts in section taken substantially along the line 27—27 in Figure 5 but showing the elevator as though in a lowered position and with the motive car occupying a position adjacent one end of the elevator;

Figure 27-A is an enlarged fragmentary elevation, with parts in section, taken substantially along the line 27-A—27-A in Figure 27;

Figure 28 is an enlarged top plan view taken substantially along the line 28—28 in Figure 5 and showing the motive car in operative position in advance of the point it releases the latch means which holds the elevator in a lowered position;

Figure 29 is a top plan view of one of the tier carrying cars supported on the elevator and looking substantially along the line 29—29 in Figure 5;

Figure 30 is an enlarged top plan view looking substantially along the line 30—30 in Figure 5 and showing the structure at the upper end of the elevator shaft;

Figure 31 is an isometric view of one of the tier-carrying cars disassociated from the machine;

Figure 32 is an enlarged fragmentary elevation with parts broken away and showing the rear portion of the grab carriage 390 in Figure 3 and also showing an accumulator switch mechanism which is actuated by the grab carriage as it reaches the limit of its rearward stroke;

Figure 33 is an enlarged fragmentary top plan view with parts broken away, looking substantially along the line 33—33 in Figure 32;

Figure 34 is a diagram showing the piping and the wiring for the pneumatic and electrical circuits which are effective in actuating the various instrumentalities employed in admitting the rows of bricks received by the feed table to the accumulator table and showing many of the parts schematically;

Figure 34-A is an extension to the right-hand end of Figure 34 showing one arrangement of the piping and wiring for effecting operation of the raking means and the separator means;

Figure 34-B is an extension to the right-hand end of Figure 34-A and showing one arrangement of the wiring and piping for the electrical and pneumatic circuits which are instrumental in effecting the operation of the cross-hacker and the grab carriage;

Figure 34-C is an extension to the right-hand end of Figure 34-B and shows an arrangement of the electrical parts for effecting operation of the grab springs or vanes on the cross-hackers;

Figure 35 is a diagram showing the arrangement of the piping and wiring circuits associated with the motive car for effecting operation thereof, as each tier-carrying car is loaded, with many of the parts being shown schematically;

Figure 36 (Sheet 12) is an enlarged vertical sectional view through a cumulative elevator counter-balancing unit taken substantially along the line 36—36 in Figure 5, with parts broken away;

Figure 37 (Sheet 12) is an enlarged sectional plan view taken along the line 37—37 in Figure 36;

Figure 38 (Sheet 12) is an enlarged sectional plan view taken along the line 38—38 in Figure 36;

Figure 39 (Sheet 20) is a view of a modified form of feed table which may be used in lieu of the table shown in the left-hand portion of Figure 8 and looking at the feed end thereof;

Figure 40 (Sheet 20) is another view of the modified form of feed table looking at the right-hand side of Figure 39;

Figure 41 is an enlarged top plan view showing a modified form of carrier fork which may be employed in lieu of the carrier fork shown in Figure 8 and which is particularly designed for use with the type of feed table shown in Figures 39 and 40;

Figure 42 is an elevation looking at the lower side of Figure 41;

Figure 43 is an elevation, with parts in section, along the line 43—43 in Figure 42.

A description will first be given of the frame of the machine and, for purposes of clarity and brevity, the feed end of the machine shall be hereinafter referred to as the front of the machine and the discharge end of the machine shall be hereinafter referred to as the rear or back of the machine. It is to be understood that all parts herein referred to as being connected to one another, with respect to the frame of the machine, may be connected in any desired manner such as by welding or bolting the various parts together. The frame of the machine is most clearly shown in Figures 1 to 6, inclusive.

The frame is broadly designated at 10 and comprises horizontally spaced longitudinally extending upper frame members 11 and 12 and coinciding lower frame members 13 and 14 spaced therebelow. Vertically disposed longitudinally spaced frame members 15, 16, 17, 18 and 15a are connected at their upper and lower ends to the corresponding longitudinally extending frame members 11 and 13 at the right-hand side of the machine. At the left-hand side of the machine vertically disposed longitudinally spaced frame members 21, 22, 23, 24 and 21a are connected at their upper and lower ends to the respective longitudinally extending frame members 12 and 14.

The upper front ends of the upper longitudinally extending frame members 13 and 14 are bridged by a transverse frame member 27. The rear portions of the lower frame members 12 and 14 are bridged by spaced transverse frame members 27a and 27b. The lower ends of a pair of longitudinally spaced vertically disposed frame members 30 and 31 are welded to the upper surface of the upper longitudinally extending frame member 11 and a similar pair of vertically disposed frame members 32 and 33 are welded to the upper surface of the upper longitudinally extending frame member 12. The upper ends of the vertically disposed frame members 30 and 32 are bridged by a pair of angle bars 34 and 35 to the upper surfaces of which a pair of end plates 36 and 37 are suitably secured, as by welding.

All of the frame members heretofore described are shown in the form of I-beams with the exception of the angle bars 34 and 35. However, it is to be understood that any desired type of structural members may be employed in lieu of the I-beams heretofore described. The vertically disposed frame members 30 and 32 are also spanned by an angle bar 40 which is welded at opposed ends thereof intermediate the ends of the vertically disposed members 30 and 32 and to the medial portion of which the front end of a horizontally disposed plate 41 is suitably secured as by welding.

This plate 41 extends rearwardly and is welded intermediate its ends to the upper surfaces of a pair of transversely disposed frame members 42 and 43, which are shown in the form of angle bars and opposed ends of which are welded to the upper ends of the respective vertically disposed frame members 31 and 33. The rear portion of the plate 41 has a vertically disposed plate 44 depending therefrom, the purpose of which will be later described (Figure 3). Also, welded to the front surface of the transverse frame member 40 (Figure 6) is a vertically disposed plate 45, the purpose of which will also be later described.

Bridging the vertically disposed frame members 16 and 17 intermediate the ends thereof are three vertically spaced horizontally disposed frame members 50, 51 and 52, which are shown in the form of angle bars, and they are welded between the vertically disposed frame members 22 and 23, at the left-hand side of the machine, similar frame members 53, 54 and 55. The frame members 50, 51, 53 and 54 are provided to support opposed ends of a transversely disposed channel bar 56. Welded to the front and rear surfaces of the vertically disposed frame members 16 and 22, intermediate the ends thereof, are angle bars 57 and 58 which extend transversely of the frame 10.

The frame members 17 and 18 and 23 and 24 are spanned intermediate their ends by respective horizontally disposed longitudinally extending frame members 61 and 62 which are shown in the form of angle bars. A pair of relatively short angle bars 63 and 64 are welded intermediate their ends to the proximate surfaces of the vertically disposed frame members 17 and 23, respectively, and are disposed intermediate the upper and lower ends thereof.

A transversely disposed channel bar 65 having upwardly facing flanges is welded at opposed ends thereof intermediate the ends of the longitudinally extending lower frame members 13 and 14 and this channel bar 65 has the lower end of a vertically disposed separator anchor plate 66 welded thereto which has an opening 67 therethrough. The purpose of this plate 66 will be later described. The longitudinally extending upper and lower frame members 11, 12, 13 and 14 extend rearwardly substantially beyond the vertically disposed frame members 18 and 24 and there is welded to the remote surfaces of the lower frame members 13 and 14 respective pairs of longitudinally spaced elevator guide rod support members 70 and 71 and 72 and 73 to which the lower ends of respective vertically disposed elevator guide posts 75 to 78, inclusive, are suitably secured as by welding. The rear ends of the upper frame members 11 and 12 are bridged by a transverse frame member 26a.

These guide posts 75 to 78, inclusive, define an elevator shaft and have an elevator mounted for vertical sliding movement thereon which will be later described in detail. The upper ends of the elevator guide posts 75 to 78, inclusive, extend substantially above the rear portions of the longitudinally extending frame members 11 and 12 and are suitably secured, as by welding, at their upper ends to opposed ends of longitudinally extending frame members 81 and 82 as well as transverse frame members 83 and 84.

It is to be understood that suitable bracing frame members may be employed to lend rigidity to the elevator shaft if so desired.

Bricks are usually manufactured by passing a pliable substance, such as clay, through a de-airing and extruding machine from which the clay is extruded in the form of an elongated element which is rectangular in cross-section. This extruded clay element is fed onto a conveyor from the de-airing and extruding machine and this conveyor is a part of a conventional brick and tile cutter having means thereon for cutting the extruding element into pieces of molded clay in the usual size of bricks which then rest on their edges on the conveyor and extend transversely of the conveyor to thus be discharged from the end of the conveyor.

Now, there is shown in Figures 1, 2, 5, 7 and 8 a feed table broadly designated at 100, which may be disposed at either side of the machine and is shown at the left-hand side of the machine in the drawings. This table 100 is adapted to be of such height as to be disposed in the same horizontal plane as the upper surface of a brick and tile cutter conveyor, a portion of which is shown in Figure 2 indicated at C, and whereby the preformed or shaped bricks are slid from the conveyor onto the table 100. This table 100 comprises laterally spaced horizontally disposed channel bars 101 to 104, inclusive, the outer ends of which extend substantially beyond the frame 10 and the inner ends of which also extend inwardly of the frame 10.

Opposed ends of the channel bars 101 to 104, inclusive, are supported on the upper ends of respective angle bars 105 and 106 which are, in turn, supported on the upper ends of respective legs 107, 108, 109 and 110. The lower ends of the legs 107, 108, 109 and 110 are suitably secured, as by welding, to respective frame members 111 and 112 which may be suitably secured to the floor on which the machine rests.

Carrier fork

The particular brick handling machine shown in the drawings is designed to form tiers of bricks on brick transport or tier-carrying cars wherein each tier of bricks includes eighteen spaced rows of bricks including four bricks laid end-to-end in each row. It is to be understood, however, that the size of the various parts of the machine may be varied to accommodate any desired number of bricks. Therefore, the feed table 100 should be of a substantially greater length than a group of bricks laid side-by-side thereon and the capacity of the carrier fork to be presently described, should be such as to accommodate slightly more than eighteen bricks, primarily because this happened to be the capacity of the machine, of which the conveyor C is a part, in each operation thereof. The carrier fork assembly is generally designated at 119 (Figures 8 to 12, inclusive), and comprises a carrier fork carriage broadly designated at 120 which includes a pair of horizontally spaced tubular members 121 and 122 which are mounted for horizontally sliding movement transversely of the frame 10 on respective horizontally disposed guide bars 123 and 124 (Figure 8).

Opposed ends of the guide bars 123 and 124 are fixedly mounted in respective tubular blocks 125, 126 and 127 and 128 suitably secured, as by welding, to the upper surfaces of the respective frame members 52 and 55. An angle bar 131 is welded at opposed ends thereof to the upper surfaces of the tubular members 121 and 122 at their right-hand ends in Figures 8 to 12, inclusive, a similar angle bar 132 being spaced inwardly of the angle bar 131 and also being welded to the upper surfaces of the tubular members 121 and 122. This angle bar 132 has a stop bar 133 welded thereto and extending longitudinally thereof, this stop bar 133 being angled upwardly and to the left in Figures 8 to 12, inclusive, for purposes to be presently described.

The tubular members are also bridged at their left-hand ends by a rod 134 which is preferably circular in cross-section and which is welded to the lower surfaces of the tubular members 121 and 122 to not only hold the members 121 and 122 in proper spaced relation but to also provide means on the carriage 120 for engaging a pair of leaf spring latches 135 extending from respective collars 136 fixed on the shafts 123 and 124 at their left-hand ends in Figures 8, 11 and 12.

Each of the tubular members 121 and 122 has the lower ends of a pair of spaced links 140 and 141 pivotally connected thereto which extend upwardly and support opposed ends of respective shafts 142 and 143 on which opposed ends of a horizontally disposed and horizontally spaced links 144 are pivotally mounted, there being three of these links 144 shown in the drawings. Welded or otherwise secured to the lower surface of each link 144, intermediate the ends thereof, is the upper end of the vertical leg of a substantially L-shaped fork member 145, the horizontal leg of which has a plurality of axially alined rollers 146 mounted for rotation thereon and the vertical leg of which also has a roller 147 rotatably mounted thereon, the axis of which extends in a vertical plane. The vertical leg of at least one of the fork members 145 has a suitable sensitive double pole, double throw, push button spring switch 150 suitably secured thereto which has wires 151, 152 and 153 extending therefrom which are parts of an electrical circuit to be later described (Figure 34). This switch 150 is omitted from all views of the carrier fork mechanism, other than Figures 9 and 34 so as to not obscure the various parts of the carrier fork mechanism.

The horizontally disposed links 144 at the upper ends of the fork members 145 are penetrated by a common pin 154 on which the lower ends of a pair of parallel links or lever arms 155 are pivotally mounted (Figures 2, 4, 7, 8, 9, 10, 11 and 12). The links 155 extend upwardly and are pivotally connected at their upper ends as at 156, to the free end of a link 157 pivotally connected at its other end, as at 160, to a plate 161 depending from and welded to the plate 37 heretofore described. The lower end of the plate 161 is reenforced by a plate 162 which extends outwardly and is suitably secured, as by welding, to the vertically disposed frame member 32.

Plates 161a and 162a are provided at the vertically disposed frame member 30, these plates being identical to the plates 161 and 162 and being provided to accommodate the links 157 and 155 in the event of the feed table 100 being positioned at the opposite side of the machine from that shown in the drawings.

One end of an air cylinder 165 is pivotally connected, as at 166 (Figures 8 to 12, inclusive), to the vertically disposed plate 161 below the link 157. This cylinder 165 has a piston 167 mounted for longitudinally sliding movement therein and which has a piston rod 170 extending therefrom through one end of the cylinder 167 and being pivotally connected at its outer end, as at 171, intermediate the ends of the lever arms 155. The piston 165 has pipes 172 and 173 extending from opposed ends thereof which are parts of a piping and wiring diagram to be later described (Figure 34).

Assuming the carrier fork 145 to be in retracted or discharging position, as shown in Figure 9, in operation, compressed air is directed through the pipe 173 to the right-hand end of the cylinder 165 to cause the piston 167 and piston rod 170 to move from right to left in Figure 9. Due to the friction of the tubular members 121 and 122 against the respective bars 123 and 124, the links 155 will move in a clockwise direction and will move the links 140 and 141 in a counter-clockwise direction from the position shown in Figure 9 to the position shown in Figure 10 so the horizontal legs of the members 145 will be disposed in a slightly lower horizontal plane in Figure 10 than they are in Figure 9.

The inner links 141 then engage the angularly disposed stop member 133 to impart movement to the carriage 120 to cause the same to move from right to left, from the position shown in Figure 10 to the position shown in Figure 11, at which point the transverse rod 134 will engage the leaf spring latches 135 and the upper surfaces of the rollers 146 on the horizontal legs of the fork members 145 will then be disposed in a slightly lower plane than that of the upper surfaces of the channel bars 101 to 104, inclusive, of the table 100. The bricks are then slid along the upper surface of the table 100 until the leading brick engages the vertically disposed rollers 147 on the vertical legs of the respective fork members 145, at which time the leading brick also engages the plunger on the switch 150 to thus close the switch 150.

This completes a circuit to a suitable valve, to be later described, to cause compressed air to then be admitted through the pipe 172 to the left-hand end of the cylinder 165 in Figure 11, to cause the piston rod 170 to move from right-to-left and to return the carriage 120 to retracted or discharging position. In so doing, movement from left to right of the carriage 120 is retarded momentarily by virtue of the latch springs 135 in engagement with the transverse rod 134 on the carriage 120 and, therefore, the links 140 and 141 will move from the position shown in Figure 11 to the position shown in Figure 12, that is, until the links 141 engage the vertical flange of the angle bar 131.

This causes the horizontal legs of the fork members 145 to move upwardly to where the rollers 146 will engage and lift the bricks thereabove, above the upper surface of the table 100. Thus, as the fork members 145 are moved to retracted position, the bricks previously positioned above the rollers on the fork members 145 will be carried with the fork members 145 to be positioned in alinement with a transfer mechanism to be presently described.

As the carriage 120 moves from left to right in Figure 8 to retracted position, the angle bar 131 thereon engages the plunger of a double pole, two position, push button snap switch 175 suitably secured to the upper surface of the tubular member 125 and having wires 176, 177 and 178 extending therefrom which are parts of the electrical circuit to be later described. Upon the switch 175 being closed by the carriage 120, a circuit is completed in a manner to be later described to actuate the transfer mechanism to be presently described.

For purposes of description, there are two types of push button switches employed in the present invention. The switch 150, termed as a double pole, double throw, push button spring switch, is of the type which, upon the plunger thereof being depressed and then released, will spring back to its original position. The switch 175, termed as a double pole, two position, push button snap switch, is of the type which, upon the plunger thereof being alternately depressed and then released will continue to complete a circuit between one pair of contacts until, upon the plunger being depressed between said alternate depressions thereof, the switch 175 will complete a circuit between another pair of contacts. This last-named switch is often termed as an automobile headlight dimming type switch.

Brick transfer mechanism

The brick transfer mechanism, broadly designated at 180, is most clearly shown in Figures 1, 2, 4 and 7 and comprises a transfer bar 181, in the form of a channel bar, the flanges of which are welded to a longitudinally extending plate 182. The plate 182 has the rear ends of a pair of spaced plungers 183 suitably secured thereto which extend forwardly and are mounted for horizontal sliding movement in tubular guide members 184. The tubular guide members 184 are suitably secured, as by welding, to the upper surfaces of the transverse frame members 57 and 58.

Each of the plungers 183 has a cuff member 185 fixed on the front end thereof to which the upper ends of respective pairs of spaced lever arms 186 are pivotally connected, as at 187. The lower ends of the links 186 are suitably secured, as by welding, to a common frame member 190, shown in the form of an angle bar in Figure 7, to which the front end of a piston rod 191 is pivotally connected, as at 192. The piston rod 191 extends rearwardly and slidably penetrates one end of a cylinder 193 in which a piston 194 is mounted for longitudinal sliding movement, this piston 194 being fixed on the rear end of the piston rod 191.

The cylinder 193 has conduits or pipes 195 and 196 extending therefrom which are parts of the wiring and piping diagram to be later described (Figure 34). The cylinder 193 is pivotally mounted, as at 197 (Figure 7), on the transverse channel bar 56. A pair of spaced pivot blocks 200 are suitably secured, as by welding, to the upper surface of the transverse frame member 56 and each has a link 201 pivotally connected thereto, as at 202, the other ends of the links 201 being pivotally connected, as at 203, to the respective links 186, as is clearly shown in Figures 2, 4 and 7.

Upon the snap switch 175, in Figure 8, being actuated by the fork carriage 120 engaging the plunger thereof, compressed air is directed to one end of the cylinder 193 in Figure 7 through the pipe 195 to cause the piston 194 and piston rod 191 to move from right to left to, in turn, move the transfer bar 181 to transferring or operative position as shown in Figure 7.

Now, as the transfer bar 181 of the transfer mechanism 180 moves to transfer or operative position, it moves the eighteen bricks from the rollers 146 on the carrier fork 119 onto an accumulator or intermediate table designated broadly at 210, the structure of which will be later described in detail. The accumulator table 210 has a double pole, two position, push button snap switch 211 suitably secured thereto to which the wire 177 from the switch 175 is connected in a manner to be later described and from which a wire 212 also extends.

It is evident that the switch 211 may be disposed in many different locations and, for purposes of description, the switch 211 is shown depending from the lower surface of the table 210 adjacent the front edge thereof and the plunger thereof is adapted to be engaged by a switch actuating bar 213 suitably secured to and depending from the plate 182 of the transfer mechanism 180. Upon engagement of the plunger of the switch 211 by the bar 213 on the transfer mechanism 180, compressed air is directed, in a manner to be later described, through the pipe 196 to the left-hand end of the cylinder 193 in Figure 7 to cause the piston 194 and piston rod 191 to move from left to right as the air in the cylinder 193 is discharged through the pipe 195. This will result in the transfer bar 181 moving from right to left in Figure 7 and, in so doing, the bar 182 to which the channel bar 181 is welded will engage the plunger of a double pole, double throw, push button spring switch 215 suitably secured to one of the tubular guide members 184, this switch 215 having wires 216, 217 and 218 extending therefrom as well as having the wire 153 from the switch 150 (Figures 9 and 34) extending thereinto.

Through intervening connections, the spring switch 215 will then cause compressed air to flow to the right-hand end of the cylinder 165 in Figures 8 to 12, inclusive, to again cause the fork members 145 to move outwardly into position between the channel bars 101 to 104, inclusive, on the feed table 100. This completes a cycle in the operation of the carrier fork mechanism 119 as well as completing a cycle in the operation of the brick transfer mechanism 180.

It will be observed in Figure 7 that the accumulator table 210 has four transverse rows of bricks thereon, the bricks being designated generally at B and the first, second, third and fourth rows being successively designated at B–1, B–2, B–3 and B–4 in the order in which the transverse rows of bricks are transferred from the carrier fork members 145 to the accumulator table 210. It will be noted that, upon each row of bricks being transferred to the table 210, they will engage any rows of bricks which may have been previously transferred thereon to thus slide the preceding transverse row of bricks along the table from front to rear a distance equivalent to the length of each brick so the bricks are positioned on the table 210 in end-to-end relation to each other.

Accumulator table

The accumulator table 210 comprises a horizontally disposed plate 225 which is reenforced by a pair of transversely extending slats 226, opposed side edges of the plate 225 being supported on the angle bars 63 and 64 heretofore described (Figure 6). The slats 226 are welded onto horizontally disposed transversely extending frame members 227 and 228 which are suitably secured, as by welding to the respective front and rear surfaces of the vertically disposed frame members 17 and 23. Since most of the weight of the bricks is disposed in substantially the center of the table 210 transversely of the machine, the transverse frame members 227 and 228 also serve to support the center portion of the accumulator table 210 in the event that the central portion thereof sags due to the weight of the bricks thereon.

Referring to Figures 13 and 14, it will be observed that there is a pair of spaced brick guiding bars 228 and 229 resting upon the plate 225 of the accumulator table 210. These brick guiding bars 228 and 229 are shown in the form of angle bars having their horizontal flanges extending outwardly and each has the inner ends of at least two threaded rods 230 suitably secured thereto, as by welding, and which extend outwardly and slidably penetrate the corresponding frame members 63 and 64. A pair of lock nuts 231 is threadably mounted on each of the rods 230. These nuts 231 engage opposed sides of the vertical flanges of the frame members 63 and 64 to provide means for adjusting the positions of the brick guiding bars 228 and 229 relative to each other to accommodate the number of bricks in each row which are transmitted to the accumulator table 210 from the fork carrier mechanism 119 by the transfer mechanism 180. The front edges of these bars 228 and 229 are flared outwardly as at 232, so as to guide the bricks therebetween as they are transferred to the accumulator table 210.

Since these guiding bars 228 and 229 are spaced to accommodate eighteen bricks, in this instance, the additional half brick on the outer portion of the fork carrier mechanism 119 will engage the leading end of the brick guiding bar 229 and will thus be prevented from moving onto the table 210 and will then fall, by gravity, onto the floor on which the machine rests or to a suitable conveyor mechanism for carrying these half bricks away from the machine. The conveyor mechanism is omitted from the drawings since it does not constitute a part of the present invention.

As each row of bricks B–1, B–2, B–3 and B–4 is transferred to the accumulator table 210 by the transfer mechanism 180, assuming there are eighteen bricks in each row, for example, there are provided seventeen cutting or dividing wires 235 which extend at a slight angle relative to the vertical as shown in Figure 7 and which are spaced apart from each other transversely of the frame 10 as shown in Figure 13. In Figure 14 the cutting wires 235 have been omitted for purposes of clarity but it is most clearly shown that the front edge of the plate 225 of the table 210 is provided with a plurality of slots 236 which are loosely penetrated by the wires 235. The lower end of each of the wires 235 is suitably connected to a fixed anchor 237.

The anchors 237 are adjustably secured on a common horizontally disposed shaft 240 which is suitably secured at opposed ends thereof, as by welding, to the vertically disposed frame members 17 and 23. The wires 235 extend upwardly and forwardly at an angle, from the respective collars or hook members 237, and each of the wires 235 is connected to a leaf spring member 241 which extends through a slot 242 provided therefor in the vertical flange of an angle bar 243 (Figures 7 and 13). The angle bar 243 extends transversely of the frame 10 and is welded at opposed ends thereof to vertically disposed standards 246 and 247 (Figures 4, 7 and 13) which extend downwardly and are suitably secured, as by welding, to the remote surfaces of the longitudinally extending frame members 52 and 55.

The leaf spring members 241 extend through the openings 242 and then extend forwardly and downwardly at an angle and then are curved rearwardly and are suitably secured, as by bolts 245, to the substantially horizontal flange of the angle bar 243. The wires 235 are provided for the purpose of separating the bricks in each row since they are compacted somewhat as they are slid along the feed table 100 and positioned above the rollers 146 on the fork members 145. The cutting wires 235 are resiliently mounted by means of the leaf spring members 241 so they may bow forwardly as the rows of bricks are moved past the same on the accumulator table 210.

Now, upon the completion of four cycles in the operation of the fork members 145 and the transfer mechanism 180, a second transfer or rake mechanism designated broadly at 250 is then actuated in a manner to be later described to transfer the rows of bricks B–1, B–3 and B–4 to a separator mechanism designated broadly at 251. The rake mechanism 250 and the separator mechanism 251 will be later described in detail.

Therefore, by referring to Figure 7, there is provided an accumulator wheel or ratchet wheel 255 which is frictionally mounted for rotation on a pin 256 projecting from a vertically disposed plate 257 welded to the upper surface of the transverse frame member 58 at a position to one side of the path of travel of the transfer bar 181. It will be noted that, in this instance, this wheel 255 is provided with four equally spaced projections 260 corresponding to the number of rows of bricks which are to be transferred by the transfer mechanism 181 from the fork members 145 to the accumulator table 210. The accumulator wheel 255 is caused to move a quarter revolution upon each return stroke of the transfer bar 181 from right to left in Figure 7 by means of a finger 261 which is pivotally mounted, as at 263, on the front end of a bar 264 which extends rearwardly and is suitably secured as by welding, to one end of the plate 182 welded to the transfer bar 181.

A suitable spring, such as a compression spring 265 is provided to normally urge the free end of the finger 261 upwardly to cause the same to engage the upper edge of the adjacent projection 260 on the accumulator wheel 255, with movement of the transfer bar 181 from right to left in Figure 7, and to then transmit a quarter revolution to the accumulator wheel 255 in a clockwise direction with continued movement of the transfer bar 181. The accumulator wheel 255 has integral therewith a cam member 266 which is so positioned that upon the fourth row of bricks B–4 being positioned on the accumulator table 210, the succeeding return stroke of the transfer bar 181 will move the cam member 266 into engagement with the plunger of a double pole, two position, push button snap switch 270 having wires 271 to 274 extending therefrom, certain of which are instrumental in causing compressed air to flow through a pipe 280 (Figure 3) to the left-hand end of a cylinder 281. This cylinder 281 also has a pipe 282 extending to the right hand or rear end thereof in Figure 3. This cylinder 281 is a part of the actuating means for the second transfer mechanism 250.

The cylinder 281 is pivotally connected, as at 283, to the vertically disposed plate 45 (Figures 3 and 6) heretofore described and has a piston 285 mounted for longitudinal sliding movement therein. The piston 285 also has a piston rod 286 connected thereto which extends rearwardly through the head of the cylinder 281 and is pivotally connected, as at 287 (Figure 3) intermediate the ends of a lever 290.

The upper end of the lever 290 is pivotally connected, as at 291, to the plate 44 depending from the plate 41, its lower end being fixed to a horizontally disposed shaft 292 (Figure 13), opposed ends of which have the upper ends of links 293 and 294 pivotally connected thereto. These links 293 and 294 extend downwardly and forwardly at an angle, in parallel relation to each other, and are pivotally connected to a common horizontally disposed rake actuating shaft 295. Opposed ends of the shaft 295 have plates 296 and 297 fixedly secured thereto, these plates 296 and 297 being substantially triangularly-shaped and the rear corners thereof being connected to opposed ends of a tubular frame member 300 so as to lend rigidity to the plates 296 and 297 and to serve as a counterbalance, about a shaft 301, for the rake members to be later described.

The plates 296 and 297 are suspended from the rake suspension shaft 301 on which they are fixedly mounted, the shaft 301 penetrating the plates 296 and 297 at a point spaced above the shaft 295. The shaft 301 extends outwardly substantially beyond the plates 296 and 297 at opposed ends thereof and is oscillatably mounted in lower tubular portions 302 of bearing blocks 303, each of which has an upper tubular guide portion 304 integral therewith which extends transversely of the tubular bearing portion 302. These tubular guide portions 304 of the bearing blocks 303 are mounted for horizontal sliding movement on longitudinally extending guide bars or rods 305 and 306 (Figure 13) at opposed sides of the frame 10. The guide rod 305 is suitably secured at opposed ends thereof to the proximate surfaces of the vertically disposed frame members 17 and 18 at the right-hand side of the machine. The rod 306 is suitably secured at opposed ends thereof to the proximate surfaces of the vertically disposed frame members 23 and 24 at the left-hand side of the frame 10 (Figures 3 and 4).

Referring to Figures 14 and 15, it will be observed that opposed ends of the shaft 301 each has a pin 310 projecting outwardly therefrom and the corresponding tubular portion 302 of the bearing 303, in each instance, has a portion of the wall thereof cut away to form a notch 311, the radially extending walls of which are adapted to be engaged by the corresponding pin 310 for limiting oscillatable movement of the shaft 301 as transmitted thereto in a manner to be presently described.

The front ends of the plates 296 and 297 are spanned by an angle bar 315 suitably secured thereto, as by welding, and which has the rear ends of a plurality of spaced rake arms 316 suitably secured thereto, as by welding, the number of rake arms 316 coinciding with the number of bricks in each of the rows B–1 to B–4, inclusive. Each of the rake arms 316 has a depending rake member 317 suitably secured to the free front end thereof, as by welding, and being reenforced relative to the corresponding arm 316 by an angle clip 320, the substantially horizontal and vertical legs of which are welded to the respective members 316 and 317.

It will be observed, in Figure 14, that the angle clips 320 and the rake members 317 are spaced slightly apart from each other to permit passage of the corresponding cutting wires 235 therebetween when they are installed as shown in Figure 7. Thus, the width of the rake members 317 is substantially under the horizontal thickness of each of the bricks B which they are adapted to engage in a manner to be presently described for sliding the four rows of bricks B–1 to B–4, inclusive, off of the accumulator table 210 and onto the separator table 251 to be presently described.

Now, as compressed air is directed to the left-hand end of the cylinder 281 through the pipe 280 in Figure 3, the link 290 is caused to move in a counter-clockwise direction and, in so doing, the links 293 and 294 will cause the plates 296 and 297 to move in a counter-clockwise direction for a partial revolution about the axis of the shaft 301 until the pins 310 (Figure 15) on the shaft 301 engage the front walls of the notches 311 in the bearing blocks 303. At this point, the rake members 317 will have moved from the position shown in Figure 7 to substantially the position shown in Figure 3, whereupon, with continued movement in a counter-clockwise direction by the link 290, the second transfer mechanism or rake mechanism 250 will move from left to right to thus move the bricks in rows B–1, B–2, B–3 and B–4 onto the separator table 251.

Referring to Figure 3, it will be observed that the link 290 will, upon being moved from left to right by the piston rod 286, engage the plungers of two double pole, two position, push button snap switches 325 and 326 which are suitably secured to an angle plate 327 depending from and being suitably secured to the rear edge of the plate 41, by any suitable means such as welding. The wire 272 heretofore described extends from the switch 270 to the switch 326 and the wire 273 extends from the switch 270 to the switch 325. The switch 325 also has a wire 330 extending therefrom and the switch 326 also has wires 331 and 333 extending therefrom, these wires 172, 273 and 330, 331 and 333 being a part of the wiring and piping diagram to be later described (Figure 34).

Upon the plunger of switch 326 being engaged by the link 290, this switch will, through intervening connections, cause compressed air to flow to the right-hand end of the cylinder 281 in Figures 3 and 34–A, through the pipe 282, to return the rake mechanism 250 to substantially the position shown in Figure 7 and, due to the friction between the tubular portions 304 of the bearings 303 and the corresponding guide rods 305 and 306, initial movement of the link 290 in a clockwise direction in Figures 3 and 7 will cause the link 293 to partially rotate the plates 296 and 297 about the axis of the shaft 301 until the pins 310 (Figures 14 and 15) on the shaft 301 engage the rear walls of the notches 311 in the tubular portions 302 of the corresponding bearings 303. At this point, the rake members 317 will have again been elevated to substantially the position shown in Figure 7 and, with continued clockwise movement of the link 290, the rake mechanism 250 will be returned to the position shown in Figure 7 relative to the accumulator table 210.

Now, as the lever 290 engages and depresses the plunger of the switch 325 (Figure 3), this switch will, through intervening connections, cause compressed air to flow to the center of a cylinder 240 associated with the separator table 251, to be presently described (Figures 18 and 19).

*Separator table*

The separator table 251, which is most clearly shown in Figures 16, 17, 18 and 19, comprises a plurality of slats or bars 341, the number of slats 341 corresponding to the number of bricks in each of the rows B–1 to B–4, inclusive, so that a brick from each of said rows will be positioned on the upper surface of the corresponding slat 341 as the bricks are transferred from the accumulator table 250 to the separator table 251 (Figure 16). When the slats 341 of the separator table 251 are in a relatively closed position, as shown in Figure 16, they are spaced slightly apart from each other to thus be disposed in alinement with the bricks as originally transferred to the accumulator table. Since the number of bricks in each row transferred to the accumulator table 250 is eighteen, for example, there are shown eighteen of the slats 341 in Figure 16 being disposed in side-by-side relation. These slats are divided into groups A and B wherein half of the slats or nine slats are included in each group.

Each of the slats 341 has a pair of longitudinally spaced guide blocks 342 suitably secured to the lower surface thereof, as by screws 343, these screws 343 being the flathead type of screws, the upper surface of the heads of which are flush with the upper surfaces of the corresponding slats 341. The guide blocks 342 are mounted for horizontal sliding movement on a pair of corresponding horizontally disposed rods 344 which extend transversely of the frame 10 and are suitably secured at opposed ends thereof in tubular members 346 which are, in turn, suitably secured to the upper surfaces of the corresponding longitudinally extending frame members 61 and 62 by any suitable means, such as welding.

It will be observed, in Figures 17, 18 and 19, that the guide rods 344 are bridged intermediate their ends by a vertically disposed plate 66 which is penetrated by the rods 344 and the rods 344 being suitably secured to the plate 66 as by welding. The vertically disposed plate 66 extends downwardly as heretofore described and is welded at its lower end to the transversely extending frame member 65 as heretofore described (Figures 3, 4, 6, 18 and 19).

Referring to Figures 17, 18 and 19, the upper portion of the plate 66 is also penetrated by a threaded shaft 350 which is suitably secured in the plate 66, by any suitable means such as welding. The opposed ends of the threaded shaft 350 slidably penetrate the vertical flanges of a pair of angle clips 351 which extend upwardly and the horizontal flanges of which are welded to the lower surfaces of the two adjacent slats 341 at the juncture of the groups A and B of the slats 341. The threaded shaft 350 has an adjustment nut 352 threadably mounted on each end thereof and, upon movement of the centermost slats 341 apart from each other, by means to be presently described, these nuts 352 engage the remote surfaces of the angle clips 351.

The slats in group A are interconnected at their front and rear end portions by respective pantographs 354 and 355 which are pivotally connected, as at 356 and 357, respectively, to each of the slats 341 in group A. The front and rear portions of the slats 341 in group B are also interconnected by respective pantographs 354' and 355' which are also pivotally connected to each of the slats 341 in group B, as at 356' and 357', respectively. The function of these pantographs 354, 355, 354' and 355' will be later described.

The outermost of the slats 341 in the respective groups A and B also have respective angle clips 360 and 360' welded thereto and depending therefrom to which the outer ends of respective pairs of links 361 and 361' are pivotally connected, as at 362 (Figure 18). These links 361 and 361' extend inwardly and are pivotally connected at their inner ends, as at 363 and 363', respectively, to the upper ends of respective lever arms 364 and 364'. The lever arms 364 and 364' extend downwardly in diverging relation, as shown in Figure 18, and are pivotally connected as at 365 and 365' to the upper ends of respective pairs of horizontally spaced vertically disposed plates 366 and 366', respectively. The lower ends of the plates 366 and 366' are suitably secured, as by welding, to the proximate surfaces of the upwardly extending flanges of the transverse channel bar 65 heretofore described. Each pair of plates 366 and 366' straddles the lower ends of the respective lever arms 364 and 364', as is clearly shown in Figures 3, 4 and 19.

Now, pivotally connected intermediate the ends of the respective lever arms 364 and 364', as at 370 and 370', respectively, are remote ends of a pair of axially alined piston rods 371 and 371' which extends inwardly and are mounted for horizontal sliding movement in opposed ends of the cylinder 340 heretofore described. The proximate ends of the piston rods 371 and 371' have respective pistons 372 and 372' fixed thereon which are mounted for longitudinally sliding movement in opposed halves of the cylinder 340 (Figures 18 and 34–A). The plate 66 is provided with the opening 67 so as to permit relative movement between the cylinder 340 and the plate 66.

Now, as compressed air is directed to the central portion of the cylinder 340, through a pipe 375, as a result of the lever 299 (Figure 3) engaging the plunger of the electric switch 325 in the manner heretofore described, the pistons 372 and 372' and their respective piston rods 371 and 371' will be forced apart from each other and this will cause the links 361 and 361' to also move apart from each other.

It quite often happens that, upon compressed air being directed to the medial portion of the cylinder 340, one of the pistons 372 or 372' may start to move in advance of the other of the pistons and will thus reach the end of its stroke before the other piston commences movement. Therefore, the nuts 352 (Figure 17) are provided on opposed ends of the threaded shaft 350 to engage the corresponding member 351 to cause the associated centermost slats 341 to be moved equal distances apart from the plate 66. The pantographs 354, 355, 354' and 355' will then cause the slats 341 in each of the groups A and B to be moved equi-distant from each other.

Now, in order to accurately determine the distance that the slats 341 in each of the groups A and B are moved apart from each other, as compressed air is admitted to the central portion of the cylinder 340 in Figure 18, the guide rods 344 are provided with collars 376 adjacent one end thereof and collars 376' adjacent the other ends thereof. Thus, these collars 376 and 376' are engaged by the outermost of the guide blocks 342 associated with the outermost of the slats 341 in whichever group A or B happens to be initially moved to open position to thus limit the movement of the slats 341 in this particular group and following which the other of the pistons 372 or 372' will then move outwardly to position the slats 341 in the other of the groups in an opened position with respect to each other so that all of the slats 341 will be equally spaced transversely of the frame 10. The group A of the slats is shown in opened or operative position in Figure 17.

It is evident that, upon the slats 341 being moved apart from each other, from the position shown in Figure 16 to substantially the position shown in Figure 17, the bricks in each row will move equi-distant apart from each other to form a row of end-to-end bricks resting on each of the slats 341. In this instance, there are four bricks shown in each of the rows supported on each of the slats 341 in accordance with the capacity for which the machine is particularly designed. Thus, there is formed four transversely extending rows of bricks including eighteen bricks in each row and which are spaced apart from each other and these four rows of bricks also representing eighteen rows of longitudinally extending bricks laid end-to-end and including four bricks in each of the longitudinally extending rows. After the bricks have been removed from the separator table 251, by automatic means to be presently described, compressed air is directed to opposed ends of the cylinder 340 (Figure 18) through pipes 377 and 377' to thus return the slats 341 to the closed position shown in Figure 16.

As the lever 364 is moved outwardly during movement of the slats in group A apart from each other, the lever 364 engages the plunger of a double pole, two position, push button snap switch 380 having wires 381 and 382 extending therefrom. The switch 380 may be mounted in any desired location and is shown in Figure 18 as being suitably secured to a plate 283 which extends downwardly and is suitably secured as by welding, to the upper end of one of the plates 366 heretofore described. Upon the plunger of the switch 380 being engaged by the lever arm 364, this switch is instrumental in effecting operation of a grab carriage broadly designated at 390.

Grab carriage

Broadly, the grab carriage 390 is a form of a transporting car for transporting a pair of brick grasping units broadly designated 391 and 391', to be later described, to and fro between the separator table 251 and the elevator shaft. The substantially rectangular wheeled frame of the grab carriage 390 includes side rails 395 and 396 which are joined at the front and rear ends of the carriage by respective front and rear cross rails 397 and 398 which are suitably secured together as by welding.

Each of the side rails 395 and 396 of the grab carriage 390 has a pair of spaced tubular members 400 and 401 suitably secured to the lower surface thereof, as by welding (Figures 1, 20 and 21). A pair of transverse shafts 402 and 403 are fixedly mounted in the respective tubular members 400 and 401 and have, rotatably mounted on opposed ends thereof, flanged track wheels 405 and 406, respectively. These rollers or track wheels 405 and 406 ride upon the longitudinally extending side frame members 11 and 12 of the frame 10 and support the grab carriage 390.

The grab carriage 390 has a cross-hacker thereon, broadly designated at 407, which comprises a pair of relatively closely spaced vertically disposed angle bars 410 and 411 which are welded to the upper surface of the front cross rail 397 substantially midway of its length and the upper ends of which are bridged by a block 412 which may also be welded to the angle bars 410 and 411. The cross-hacker 407 serves to cause the brick grasping units 391 and 391' to turn on their vertical axes, at certain times, to deposit certain tiers on the tier-carrying car, to be later described, cross-wise of other tiers deposited thereon. A link 413 is pivotally connected to the rear surface of the block 412, as at 414, and extends rearwardly and is pivotally connected between the upper ends of a pair of parallel lever arms 415, as at 416.

The lever arms 415 extend downwardly and are pivotally mounted on respective stub shafts 420 which are a part of a compound knuckle joint member broadly designated at 421 (Figure 22). These stub shafts 420 are welded at their proximate ends to opposed sides of a tubular member 422 which is mounted for horizontal sliding movement on a guide rod 423 fixed at opposed ends thereof in suitable blocks 424 welded to the upper surfaces of the front and rear cross rails 397 and 398 of the grab carriage 390.

Referring again to Figure 22, it will be observed that the tubular member 422 also has a downwardly extending stub shaft 426, welded to the lower surface thereof, on which the proximate ends of a pair of outwardly extending grasping unit actuating arms 427 and 427' are pivotally mounted as is clearly shown in Figure 21. The outer ends of the actuating arms 427 and 427' are fixedly mounted, as by respective keys 432, on the upper portions of vertically disposed grasping unit pivot shafts 433 and 433', respectively (Figures 23, 24 and 25). Since both pivot shafts 433 and 433' are identical, only the shaft 433 and associated parts will be described and the parts associated with the shaft 433' will bear the same reference characters with the prime notation added. These pivot shafts 433 and 433' support the respective brick grasping units 391 and 391' to be later described.

Referring to Figures 20, 24 and 25, it will be observed that the upper end of the pivot shaft 433 has a reduced threaded portion 434 integral therewith on which a thrust washer 435 is slidably mounted, this thrust washer 435 being held in position against the shoulder formed at the juncture of the reduced portion 434 and the pivot shaft 433 by a nut 436. A thrust washer 437 is also disposed between the lower surface of the actuating arm 427 and the upper surface of a vertically disposed sleeve 440 which extends downwardly and is fixedly secured in a horizontally disposed plate 441 which extends forwardly and rearwardly and has tubular portions 442 on opposed ends thereof which are mounted for horizontal sliding movement transversely of the frame 10 on the guide rods 402 and 403 heretofore described.

The lower end of the pivot shaft 433 extends beyond the lower end of the tubular member 440, in which the pivot shaft 433 has oscillatable movement, and has fixed on the lower end thereof, as by welding, a grasping unit support plate in the form of a disk 445 which has circularly spaced bores 446 therethrough for securing the corresponding grasping unit 391 thereto in a manner to be later described.

The manner in which the grab carriage 390 is moved from the position shown in Figure 3 to a position above the tier-carrying car to be later described and vice versa will be later described. Normally, the grasping units 391 and 391', to be later described, grasp the rows of bricks on the respective slats 341 of the separator table 251 and slide these rows of bricks longitudinally or rearwardly onto the corresponding tier-carrying car. However, at predetermined times, following the operation of the grasping units in grasping the corresponding rows of bricks, the two grasping units are caused to rotate a quarter revolution so the rows of bricks supported thereby will subsequently be slid off of the separator table in a direction longitudinally of the slats 341 but with the rows of four bricks, previously positioned on each of the slats 341, being disposed transversely of the slats 341 so as to form nine spaced rows of eight bricks each. This is termed a "cross-hacking" operation.

Therefore, suitable means to be later described, causes compressed air to flow through a pipe 450 to the front end of a cylinder 451 pivotally mounted, as at 452, on the plate or block 412 (Figures 3 and 21) of the grab carriage 390. This cylinder 451 also has a pipe 453 extending to the rear end thereof.

The cylinder 451 has a piston 453 mounted for longitudinal sliding movement therein which has a piston rod 454 extending therefrom and slidably penetrating the rear end of the cylinder 451. The free end of the piston rod 454 is pivotally connected, as at 455, intermediate the ends of the lever arms 415. Thus, upon compressed air being admitted to the left-hand or front end of the cylinder in Figures 3 and 21, the piston rod 454 will cause the lever arms 415 to move in a counterclockwise direction to thus move the compound knuckle member 421 rearwardly or from the position shown in Figure 3 to the position shown in Figure 21 and during which the actuating arms 427 and 427' move through an arc of 90°.

Since the outer ends of these arms 427 and 427' are keyed to the pivot shafts 433 and 433' (Figure 25), these shafts 433 and 433' and the respective plates 445 and 445' will rotate a quarter revolution so that the vanes of the brick grasping units, to be later described, will extend transversely of the frame 10.

It is evident that as the knuckle member 421 moves from a position adjacent the front cross rail 397 to a point substantially midway of the guide rod 423, the plates 441 and 441' will move outwardly apart from each other since the tubular portions 442 and 442' on opposed ends thereof are mounted for lateral sliding movement on the corresponding guide rods 402 and 403. Of course, the plates 441 and 441' will again move inwardly towards each other after the knuckle member 421 passes dead-center and as it moves to a position adjacent the rear cross rail 398 as shown in Figure 21.

This arrangement not only renders possible the use of rigid links 427 and 427' in association with the means for rotating the grasping units 391 and 391', but also provides means whereby the grasping units 391 and 391' are moved apart from each other so the adjacent corners thereof will not interfere with each other as rotation is being imparted to the brick grasping units 391 and 391'. On the other hand, after the knuckle member 421 has moved beyond said dead-center, the two brick grasping units 391 and 391' will be moved inwardly towards each other so the bricks carried by the grasping unit 391 may be disposed in closely spaced relation to the bricks carried by the brick grasping unit 391'.

Although, two brick grasping units 391 and 391' are shown in the drawings, it is to be understood that a single brick grasping unit may be employed in the event of the bricks being stacked on a substantially square tier-carrying car and, on the other hand, if so desired, the number of brick grasping units may be increased substantially from that shown in the drawings.

After the bricks have then been transferred from the separator table 251 to the tier-carrying car, to be later described, means to be later described will then cause compressed air to flow through the pipe 453 to the right-hand or rear end of the cylinder 451, in Figure 3, and will cause the brick grasping units to return to their normal position relative to the grab carriage 390.

Pivotally connected, as at 460, to the rear cross rail 398 of the grab carriage 390 (Figures 3, 4, 5 and 21) are the lower ends of a pair of parallel links 461 which straddle the lower end of a lever arm 462, to which they are pivotally connected, as at 463. This lever arm 462 extends upwardly and rearwardly at an angle and is pivotally connected, as at 464 (Figure 5), to the rear transverse frame member 84 connected to the upper ends of the rear elevator guide posts 76 and 78. The rear free end of a piston rod 465 is pivotally connected intermediate the ends of the lever arm 462 as at 466.

This connecting rod 465 is mounted for horizontal sliding movement in the rear end of a cylinder 467 which has a piston 470 mounted for horizontal sliding movement therein and to which the front end of the piston rod 465 is secured. The front end of a cylinder 470 is pivotally connected, as at 471, to a transverse cylinder supporting frame member 472 which is shown in the form of a channel bar in Figures 1, 3 and 29.

This channel bar 472 is suitably secured, as by welding, to the lower surfaces of the longitudinally extending frame members 81 and 82 which connect the upper ends of the elevator guide posts 75 and 76 and 77 and 78, respectively. An angle bar 473 is also welded at opposed ends thereof to the longitudinally extending frame members 81 and 82 and has a suitable gusset plate 474 at each end thereof extending between the angle bar 473 and the channel bar 472 to thus lend rigidity to the channel bar 472. These gusset plates 474 are welded at their front and rear ends to the respective frame members 473 and 472.

The cylinder 467 has pipes or conduits 476 and 477 communicating with the front and rear ends thereof, respectively, and, upon compressed air being directed through the pipe 476 to the front end of the cylinder 470, it is evident that the lever arm 462 will move in a counter-clockwise direction in Figure 3 to, in turn, cause the grab carriage 390 to move from left to right or rearwardly in Figure 3 for discharging the contents of the grasping units, to be later described, onto the corresponding tier-carrying car. Obviously, upon compressed air being directed through the pipe 477 to the rear end of the cylinder 467, the lever arm 462, in Figure 3, will move in a clockwise direction to move the grab carriage forwardly to occupy a position substantially as shown in Figure 3.

The front cross rail 397 of the grab carriage 390 has a switch actuating bar 480 welded thereto and extending outwardly therefrom (Figures 1 and 34–B) which is adapted to engage the plunger of a double pole, double throw, push button spring switch 481 suitably secured to a vertically disposed plate 482 extending upwardly from and being welded to the upper surface of the longitudinally extending member 11 of the frame 10. The bar 480 on the grab carriage 390 is adapted to engage the plunger of the switch 481 to depress the same upon the grab carriage 390 being moved to the position shown in Figures 1 and 3. This switch 481 has wires 483 and 484 extending therefrom for purposes to be later described.

It will be observed, in Figure 4, that the bearing block 424 fixed on the rear cross rail 398 of the grab carriage 390 has a suitable double pole, double throw, push button spring switch 487 suitably secured to one side thereof which has wires 488 and 489 extending therefrom for purposes to be later described. The plunger of the switch 487 is adapted to be engaged by the compound knuckle member 421 (Figures 21 and 22) as the lower ends of the lever arms 415 move rearwardly from the position shown in Figures 3 and 4 to substantially the position shown in Figure 21.

The switch 481 and the actuating means on the grab carriage therefor is shown only in Figures 1 and 34–B and is omitted from the other views for purposes of clarity. The switch 487 is also shown only in Figures 4 and 34–B and is also omitted from the other views in which the grab carriage appears for purposes of clarity.

*Brick or article grasping units*

Since both of the brick grasping units 391 and 391' are identical, only the brick grasping unit at the right-hand side of the machine, that is, adjacent the longitudinally extending frame member 11, will be described and like parts associated with the grasping unit 391' will bear the same reference characters as those applied to the brick grasping unit 391 with the prime notation added.

Referring to Figure 25, a plate in the form of a disk 495 is secured, as by bolts 496, to the plate 445, the bolts 496 penetrating the bores 446 in the plate 445 (Figures 21, 24 and 25). The disk 495 has a pair of plates 497 and 498 welded to the lower surface thereof and being spaced equi-distant from the axis of the disk 495. These plates 497 and 498 extend downwardly and are suitably secured as by bolts 501 to the proximate surfaces of spaced horizontally disposed angle bars 502 and 503, respectively.

Mounted for horizontal adjustment longitudinally of the angle bars 502 and 503 and extending transversely thereof are a plurality of vane supporting slats or bars 504, there being nine of these bars 504 shown in the drawings, for example, associated with each of the brick grasping units 391 and 391' the number of bars 504 in the unit 391 in Figure 25 corresponding to the number of slats 341 in each of the groups A and B in the separator table 251.

Each of these slats or bars 504 (Figures 24 and 25) has two pairs of spaced clips 505 and 506 suitably secured to the upper surface thereof, as by welding, and extending over the horizontal flanges of the corresponding angle bars 502 and 503 for supporting the corresponding slats or bars 504. These clips 505 and 506 are adapted to slide in engagement with the upper surface of the corresponding flanges of the angle bars 502 and 503 to permit the slats 504 to be adjusted apart from each other relative to the angle bars 502 and 503.

In order to insure that the slats 504 are equally spaced from each other, the slats 504 are pivotally connected at opposed end portions thereof, as at 510 and 511, to common pantographs 512 and 513, respectively. Each of the vane supporting bars 504 has welded to the lower surface thereof a pair of longitudinally extending angle bars 515 and 516 (Figure 25), the vertical flanges of which are flush with the opposed edges of the corresponding bars 504.

If so desired, the vertical flanges of the angle bars 515 and 516 may be an integral part of the corresponding bars 504. Suitably secured to the remote surfaces of the vertical flanges of the angle bars 515 and 516, as by bolts 517, are flexible vanes, plates or brick grasping members 520 and 521, respectively, which are preferably of spring steel and each of which has a plurality of spaced cutouts 519 in the lower edges thereof which are spaced substantially equivalent to the length of each brick to be handled thereby so the bricks which are disposed in end-to-end relation to each other will not be engaged at their junctures.

The brick grasping vanes or plates 520 and 521 associated with each of the bars 504 normally assume a position substantially as shown in Figures 23 and 34–C. It will be noted, in Figure 23, that the bricks are shown in broken lines in the position that they would occupy relative to the vanes 520 and 521 as the grab carriage 390 is moved into position above the separator table 251 although the separator table 251 is omitted from the showing in Figures 23 and 25 for purposes of clarity.

However, after the vanes 520 and 521 associated with each of the bars 504 have moved to the position shown in Figure 23, it is necessary that their lower ends be moved towards each other to resiliently engage and grasp opposed side surfaces of the bricks disposed on each of the slats 341 of the separator table 251 substantially as shown in Figure 25. Therefore, secured to the proximate surfaces of the vanes 520 and 521 intermediate their upper and lower ends, as by welding, is a plurality of respective hinge members 522 and 523 (Figure 25), there being four sets of these hinges 522 and 523 associated with each of the pairs of vanes 520 and 521 shown in the drawings. The proximate portions of each of the pairs of hinges 522 and 523 are suitably secured, as by welding, to opposed leaves of a common hinge member 524 which is pivotally connected, as at 525, to the lower end of a respective block 526 which extends upwardly and is suitably secured, as by welding, to the downwardly extending portions or legs of a corresponding inverted U-shaped vane flexing member 527 (Figure 23).

The legs of each of these inverted substantially U-shaped vane flexing members 527 extend upwardly and through suitable openings 530 in the corresponding vane supporting bars 504 (Figure 26). It will be noted that each of these bars 504 has four of these openings 530 therein corresponding to the number of pairs of hinges 522 and 523 associated with each pair of flexible brick grasping vanes or plates 520 and 521.

A horizontally disposed vane flexing member support bar or rod 531, which is shown as being circular in cross section, extends longitudinally of each of the bars 504, other than the centermost bar 504 in Figure 26, these bars 531 being spaced above the corresponding bars 504 (Figure 25). The centermost of the bars which shall be hereinafter designated at 504a is substantially of the same structure and configuration as the remaining bars 504 but has a pair of relatively short bars or rods 532 extending longitudinally thereof adjacent opposed ends of the same and also being spaced above the bar 504a. The manner in which the bars 531 and 532 are supported will be presently described. It will be noted that the bars or rods 531 and 532 extend above the openings 530 in the corresponding vane support bars 504 and 504a and are surmounted by the inverted U-shaped vane flexing members 527, these members 527 being secured to the corresponding bars 531 and 532 by any suitable means such as screws 534. It is evident that means may be provided for adjusting the flexing members 527 on the corresponding rods 531 and 532 relative to the vertical so as to vary the range of movement of the lower ends of the corresponding vanes 520 and 521.

For purposes of description, the vane supporting bars 504 disposed to the left of the centermost vane supporting bar 504a shall hereinafter be designated as a group C while the vane supporting members on the other side of the centermost vane supporting member 504a shall be designated as a group D (Figure 26). Spaced above and extending transversely of the vane supporting members 504 in groups C and D are respective shafts or bars 537 and 538 which are spaced below the longitudinally extending flexing member support bars 531.

The proximate ends of the bars 537 and 538 are spaced from each other to provide an opening therebetween for a cylinder 540 which rests upon the upper surface of the centermost vane supporting member 504a (Figures 25 and 34-C) and which has pipes 541 and 542 extending therefrom for purposes to be later described. The bars 537 and 538 are provided for supporting the longitudinally extending bars 531 associated with the respective groups C and D of vane supporting bars 504. Each of the bars 531 penetrates a block 544 disposed intermediate the ends thereof and these blocks 544 in group C are penetrated transversely of the rods or bars 531 by the bar 537. The blocks 544 in group D are penetrated by the bar 538. The cylinder 540 has a piston 545 mounted for vertical sliding movement therein and which has the lower end of a connecting rod 546 suitably secured thereto and slidably penetrating the head end of the cylinder 540. The upper end of the piston rod 546, in Figure 25, has a reduced threaded portion 547 integral therewith which forms a shoulder for supporting a horizontally disposed channel bar 550, the flanges of which extend upwardly and to the lower surface of which a plurality of spaced vertically disposed plates 551 and 552 are suitably secured, as by welding.

The plates 551 extend downwardly at one end portion of the channel bar 550 and are penetrated by the inner end of the shaft or bar 537 while the plates 552 at the other end of the horizontally disposed channel bar 550 extend downwardly and are penetrated by the inner portion of the bar 538.

It is thus seen that, upon compressed air being directed through the pipe 541 to the lower end of the cylinder 540 in a manner to be later described, the piston 545 and piston rod 546 will move upwardly resulting in the channel bar 550, plates 551 and 552, bars 537 and 538 and the bars 531 moving upwardly in unison. Now, as the bars 531 move upwardly, the bars 532 associated with the centermost vane supporting bar 504a must move upwardly therewith. Therefore, there is welded to the upper surface of each of the bars 532, a plate 554 which is reenforced at its end adjacent the cylinder 540 by a suitable angle bar 555 welded to the upper surface thereof. Each of the plates 554 extends outwardly equi-distant from the corresponding bar 532 and rests upon the adjacent bars 531 disposed on opposed sides of the bar 532.

It will be noted that the upper surfaces of the bars 531 slidably engage the lower surfaces of the plates 544 to thus facilitate adjustment of the vane supporting members 504 at opposed sides of and relative to the centermost vane supporting member 504a. It is thus seen that, due to the pantographs 512 interconnecting the vane supporting bars 504 and 504a, upon any one of the vane supporting bars 504 being moved relative to the angle bars 502 and 503, the centermost bar 504a will remain in a fixed position relative to the grasping unit pivot shaft 433 (Figure 25) and the vane supporting bars 504 in groups C and D will be evenly spaced from each other and from opposed sides of the centermost bar 504a.

Now, as the bars 531 and 532 are moved upwardly in the manner heretofore described, they will move from the position shown in Figure 23 to the position shown in Figure 25 thus causing the U-shaped vane flexing members 517 to move upwardly therewith to thus move the corresponding pairs of hinges 522 and 523 and the vanes 520 and 521 inwardly to where the lower ends thereof will engage the opposed surfaces of the rows of bricks on the slats 341 of the separator table 251, substantially as shown in Figure 25. Due to the vanes 520 and 521 being made of flexible material, such as spring steel, the blades 520 and 521 may continue to be biased inwardly after they have engaged the corresponding bricks to thus insure that these bricks will be tightly grasped by the vanes 520 and 521 of the corresponding brick grasping unit 391.

When the grasping units 391 and 391' have completed their grasping operations, that is, when the channel bar 550 has reached the limit of its upward movement, it is necessary that the grab carriage 390 moves rearwardly so as to be positioned above the tier-carrying car and, to this end, there is provided a double pole, two position, push button snap switch 558 suitably secured to the upper surface of the channel bar 550 and having wires 559 and 560 extending therefrom which, upon the plunger of the switch 558 engaging the lower surface of the plate 495 (Figure 25), will change a circuit and through intervening connections will cause compressed air to be directed to the front end of the cylinder 407 (Figure 21) in a manner to be later described.

A suitable double pole, two position push button snap switch 562, having wires 563 and 564 extending therefrom, is suitably secured to an angularly disposed bar 565 (Figure 5) and extends upwardly and outwardly and is suitably secured to the longitudinally extending frame member 11. The plunger of the switch 562 is adapted to be engaged by one of the bricks as a tier of bricks is released from the grasping unit 391 during a cross-hacking operation and upon compressed air being admitted to the upper end of the cylinder 540 in Figure 25 through the pipe 542 in a manner to be later described.

This switch 562 is effective, through intervening connections to be later described, for admitting compressed air to the rear end of the cylinder 451 through the pipe 453 (Figure 20) on the grab carriage 390 in the event that the lower ends of the links 415 had been disposed in a rearward position adjacent the cross rail 398 of the grab carriage 390.

The brick grasping unit 391' is not provided with the switch 558 such as is provided in association with the brick grasping unit 391 since the cylinders 540 and 540' of the respective brick grasping units 391 and 391' are interconnected and operate in unison (see Figure 34–B).

As heretofore stated, the brick grasping units 391 and 391' are, in a cross-hacking operation, only rotated about their axes in certain cycles of movement of the grab carriage 390. Therefore, in order to determine the cycles in movement of the grab carriage 390, during which a cross-hacking operation shall occur, there is provided on the rear end of the grab carriage 390 a block 570 (Figures 32 and 33) which may be welded to the rear surface of the cross rail 398. There is pivotally mounted on one side of the block 570, as at 571, a pawl 572 which is normally urged against the adjacent surface of the vertical leg of the member 570, as by a screw 574.

The pawl 572 extends a substantial distance below the lower end of the vertical leg of the block 570 and is adapted to engage any one of four teeth 575 on a second accumulator wheel 576 which is frictionally mounted, as at 577, on a vertically disposed plate 580. The vertically disposed plate 580 is suitably secured, as by welding, to the longitudinally extending frame member 11 of the frame 10. The accumulator wheel 576 is so positioned as to be rotated exactly a quarter revolution upon each rearward stroke of the carriage 390 and, as the carriage 390 begins to move forwardly, the pawl 572 will pivot on the pin 571 and will ride over the teeth 575 on the accumulator wheel 576 without imparting return movement thereto. It is evident that many other means may be provided for operating the accumulator wheel 576, the particular means being shown by way of illustration only.

The plate 580 also has a pair of switches 581 and 582 suitably secured thereto which are adapted to be engaged by respective segmental cam wheels 583 and 584 suitably secured to the accumulator wheel 576 and each of which has a pair of circularly spaced high points thereon. The switch 581 is a double pole, double throw push button spring switch and the switch 582 is a double pole, two position push button snap switch. The switches 581 and 582 have respective pairs of wires 585 and 586 and 587 and 588 extending therefrom which are parts of the electrical circuit to be later described.

In order to release bricks from the vanes 520 and 521 of the grasping unit 391 and 391', the plate 580 also has a double pole, two position push button snap switch 591 suitably secured thereto, the plunger of which is adapted to be engaged by the pawl 572 at the extreme end of the rearward stroke of the grab carriage 390. This switch 591 has wires 592 and 593 extending therefrom which, through intervening connections to be later described, will cause compressed air to flow to opposed ends of the cylinder 340 in Figures 18 and 34–A through the pipes 377 and 377' to cause the slats 341 on the separator table 251 to move towards each other. The switches 487 and 581 are operated independently to cause compressed air to flow to the upper end of the cylinder 540 (Figures 25, 34–B and 34–C), through the pipe 542 to cause the piston 545 and intervening parts connected to the vane flexing members 527 to move downwardly thus moving the corresponding vanes 520 and 521 apart from each other to deposit the bricks carried thereby onto the tier-carrying car to be presently described. The switch 581 operates in a straight hacking operation, that is as the vanes 520 and 521 move rearwardly in a straight line, and the switch 487 operates in a cross-hacking operation.

*Tier-carrying car, motive car and elevator*

The tier-carrying cars, only one of which is shown in Figure 1, are designated broadly at 600. The vertically movable frame or elevator is designated broadly at 601 and the motive car is designated broadly at 602.

The tier-carrying car is most clearly shown in Figures 3, 5, 29, and 31, and, for purposes of illustration, it is to be assumed that the side of the car 600 shown in Figure 31 is opposite from the side shown in Figure 5. The tier-carrying car 600 may be constructed in any desired manner and the present showing includes lower side rails 605 and 606, which are shown in the form of angle bars, opposed ends of which are bridged by transverse angle bars or frame members 607 and 608 which are suitably secured, as by welding, to the upper surfaces of the longitudinally extending frame members 605 and 606. Opposed ends of longitudinally spaced axles 611 and 612 also bridge the longitudinally extending frame members 605 and 606 of the tier-carrying car 600 and are suitably secured thereto as by U-bolts 613. Spaced inwardly of the longitudinally extending frame members 605 and 606 are flanged wheels 614 and 615, respectively, there being two spaced wheels 614 on the shaft 611 and there being two similar spaced wheels 615 on the shaft 612.

The transverse frame members 607 and 608 are provided with a plurality of spaced vertically disposed frame members 616 and 617, respectively, the upper ends of which are suitably secured, as by welding, to the opposed ends of the longitudinally extending slats 620. There are nine of these slats 620 shown in Figures 29 and 31 which correspond to half of the number of bricks adapted to be carried by the carrier fork members 145, associated with the carrier fork carriage 120 (Figures 8 to 12, inclusive) from the feed table 100 to be transferred to the accumulator table 120 (Figure 7). The number of slats 620 also corresponds to the number of vane supporting members 504 and 504a on each of the grasping units 391 and 391'.

It will be noted that these longitudinally extending slats 620, which are shown in the form of channel bars in Figure 31, are each substantially the width of a single brick and are spaced apart from each other according to the spacing of the slats 341 on the separator table (Figure 18) when the separator table is moved to operative position in the manner heretofore described. These slats 620 are also spaced the same distance apart from each other as the center to center distance between adjacent pairs of grab plates or vanes 520 and 521 (Figures 23, 24, and 25).

It will be observed in Figures 1, 2, 3, 5, 27, and 28 that the flanged wheels 614 and 615 on the tier-carrying car 600 are spaced so as to ride upon a pair of spaced ingress rails or tracks 625, which are supported on suitable spaced ties 626, as each tier-carrying car 620 is moved onto the elevator 601. The elevator 601 is also provided with a pair of spaced rails or tracks 627 which are disposed in alinement with the tracks or rails 625 when the elevator 601, to be later described, is disposed in a lowered position. There is also shown in Figure 27 a pair of spaced egress tracks or rails 630 which are supported on suitable spaced ties 631 and onto which the loaded car 600 is moved as a subsequent empty tier-carrying car is moved into operative position on the elevator 601 by automatic means to be later described.

The elevator or vertically movable frame 601 comprises a pair of spaced horizontally disposed platforms or plates 635 and 636 both of which are identical except being opposite hand. Each of these platforms or plates 635 and 636 has one of the tracks or rails 627 suitably secured to the upper surface thereof and being spaced away from the proximate edges of the plates 635 and 636.

Each of the plates 635 and 636 has a notch 637 in the inner edge thereof through which a corresponding latch member 640 is adapted to project when the elevator 601 is in a lowered position. This latch member extends downwardly as shown in Figure 27–A and is pivotally mounted at its lower end, as at 641, on a horizontally disposed frame member 642, which is shown in the form of an angle bar in Figures 28 and 29, and opposed ends of which are suitably secured, as by welding, to the transverse frame members 27a and 27b.

It will be observed in Figures 5 and 27–A that the face of each of the latch members 640 adjacent the ingress tracks or rails 625 is cut at an angle for purposes to be later described. This face is indicated at 643. A pair of tension springs 645 are disposed at a lower elevation than the lower surfaces of the tracks 626 and 630, so as to be disposed beneath the plates or platforms 635 and 636 of the elevator 601 when the elevator is in lowered position. Each of the tension springs 645 is connected at one end thereof intermediate the ends of the corresponding latch 641 and the other end thereof is connected to a horizontally disposed spring anchor 646 suitably secured to a corresponding frame member 647a which supports a corresponding motive car track or rail 647. There are two of these rails 647 shown in Figures 27 and 28.

It will be observed in Figures 27 and 27a that these rails 647 are disposed adjacent the proximate edges of the corresponding platform plates 635 and 636 when the elevator 601 is in a lowered position. These tracks 647 terminate in substantially the same vertical plane as the egress edges of the plates 635 and 636, at one end thereof, and the other ends of the tracks 647 are spaced substantially in advance of the ingress edges of the plates 635 and 636 of the elevator 601. The tracks 647 are provided to accommodate the motive car 602 to be presently described.

It is thus seen that the tension springs 645 normally urge the latch members against the corresponding transverse frame member 642 and, as the elevator 601 is lowered, in a manner to be later described, the surfaces 643 of the latch members will engage the front wall of the corresponding notches 637 in the respective plates or platforms 635 and 636 and then latch onto the same to thus hold the elevator 601 in a lowered position as the loaded tier-carrying car 600 is removed from the platform and replaced by an empty tier-carrying car 600 in a manner to be later described.

It will be observed in Figures 5, 27, and 29 that the portion of the leading axle 612 on each of the tier-carrying cars 600, between the wheels 615, is adapted to be engaged by suitable latch means which is shown in the form of a pair of leaf spring members 650 and 651 which are suitably secured, as by screws 652, to the upper surfaces of the respective platforms 635 and 636. These leaf spring members 650 and 651 serve to insure that the tier-carrying car 600 may be retained in proper position during vertical movement of the elevator 601.

It will be observed in Figure 6 that there is provided beneath the tracks 627 suitable reenforcing frame members 654 which are welded or otherwise suitably secured to the lower surfaces of the platforms 635 and 636. Opposed ends of the plates or platforms 635 and 636 have the lower ends of respective vertically disposed tubular guide members or pipes 655 and 656 and 657 and 658 suitably secured thereto, as by welding, and these tubular guide members 655 to 658, inclusive, are mounted for vertical sliding movement on the respective guide posts 75, 77, 76 and 78 of the elevator shaft heretofore described. The upper ends of the vertically disposed tubular members 655 and 657 are bridged by closely spaced horizontally disposed frame members or bars 661 and the upper ends of the vertically disposed tubular guide members 656 and 658 are bridged by closely spaced frame members 662 which are suitably secured thereto as by welding.

The upper ends of the vertically disposed tubular guide members 655 and 656 are also bridged by a horizontally disposed frame member 663 which extends transversely relative to the frame 10 and is also suitably secured to the tubular guide members 633 and 656 by any suitable means such as welding. A similar transverse frame member 663 spans the distance between the upper ends of the vertically disposed tubular guide members 657 and 658 and is suitably secured thereto as by welding.

Thus, the members 661, 662, 663 and 664 form a substantially rectangular framework at the upper end of the elevator 601. The horizontally disposed frame members 661 and 662 of the elevator 601 are also spanned intermediate their ends by a frame member 665 (Figure 6) which is suitably secured thereto, as by welding and by suitable angle clips 666 which are welded to the frame member 665 and the corresponding frame members 661 and 662.

Suitable cables 670 and 671 are suitably secured at their lower ends to opposed ends of the horizontally disposed frame member 665 of the elevator 601 and these cables 670 and 671 extend upwardly between the spaced frame members 661 and 662, respectively, and their upper ends are suitably secured to corresponding reels 672 and 673 which are provided for taking up on the cables 670 and 671 as the elevator 601 is moved to elevated position by means to be later described.

The reels 672 and 673 are fixedly mounted on a horizontally disposed reel shaft 674 which is mounted in suitable bearing plates or members 675 and 676 which depend from the respective horizontally disposed frame members 81 and 82 of the elevator shaft and are suitably secured thereto, as by welding. The reel shaft 674 also has a relatively large master reel 677 fixedly mounted thereon to which one end of a weight supporting cable 680 is suitably secured and which is adapted to be wound about the reel 677 as the elevator is lowered under the weight of the tiers of bricks as they are deposited upon the corresponding tier-carrying car 600 (Figure 31).

The cable 681 extends rearwardly and upwardly beneath the frame member 84 and then passes over an idler pulley 681 which is rotatably mounted on a suitable shaft 682 (Figure 5) which is fixed at opposed ends thereof in a pair of horizontally spaced rearwardly and downwardly curving arms 683 of a pulley supporting bracket 684. The pulley supporting bracket 684 is suitably secured, as by welding, to the horizotally disposed frame member 84 of the elevator shaft. A reenforcing member 685 is welded at opposed ends thereof to the rearwardly and downwardly curving arms 683 of the bracket 684.

The cable 680 extends downwardly in Figures 3, 5 and 36 and is suitably connected to an eye-bolt 686 which is a part of a cumulative elevator counter-balancing unit broadly designated at 687 and which is shown in detail in Figures 36, 37 and 38. The lower end of the eye-bolt 686 of the cumulative elevator counter-balancing unit 687 slidably penetrates a transverse bar 690 which is slidably penetrated by a pair of spaced bolts 691 which extend downwardly and are mounted for vertical sliding movement in a substantially cylindrically or inverted cup-shaped first or upper counter-balancing weight member 692. In addition to the weight member 692 there is also provided a plurality of second axially alined auxiliary weight members 693 all of which are substantially identical and, since the present machine is particularly designed for depositing eight tiers of bricks on each of the tier-carrying cars 600, as they are successively positioned on the elevator 601, there are seven of the second or auxiliary weight members 693 shown in Figure 3.

The first weight member 692 is substantially larger than the remaining weight members 693 so the weight of the first weight member 692 is almost sufficient to counter-balance the combined weight of the elevator 601, one of the tier-carrying cars 600 and a single tier of bricks. Thus, upon an empty car 600 being positioned on the elevator, in a manner to be later described, the elevator will move upwardly to where the upper surfaces of the slats 620 of the corresponding tier-carrying car 600 may be positioned at the same or slightly below the level of the separator table 251.

The length of the cable 680 is such that all of the auxiliary weight members 693 and the top weight member 692 will then be disposed in juxtaposed relation to each other with the lowermost auxiliary weight member 673 resting upon the floor upon which the machine rests. However, upon a first tier of bricks being placed on the tier-carrying car 600, the car 600 and the elevator 601 will move downwardly the equivalent of the height of a single tier of bricks so that the upper surface of a tier of bricks then supported on the tier-carrying car will be disposed at substantially the same or slightly below the level of the separator table 251.

As the second or succeeding tier of bricks is deposited on the first tier of bricks on the tier-carrying car 600, the weight member 692 will again be caused to move upwardly and will move the next succeeding weight member 693 upwardly therewith until the upward movement thereof is limited by means to be presently described and which would result in the weight member 693 disposed below moving upwardly to thus produce the cumulative effect in the cumulative elevator counter-balancing unit 687.

Referring now to Figures 36 and 37, it will be observed that the bottom of the upper weight member 692 is provided with a circular cavity 695 which is of such depth that the two succeeding or adjacent weight members 693 disposed therebelow may have vertical sliding movement therein. The central portion of the upper or first weight member 692 is provided with an annular cavity 696 in which a suitable weight adjusting means, such as buckshot, liquid lead, or aggregate, may be placed for adjusting the weight of the upper or first weight member 692 to produce the desired counter-balancing effect on the elevator, the tier-carrying car 600 and the first tier of bricks B deposited thereon.

Referring to Figures 36 and 37, it will be observed that the upper portion of the first or upper weight member 692 is provided with a pair of diametrically opposed bores 697 in which the bolts 691 have vertical sliding movement. The bores 697 are counterbored therebeneath, as at 700, to accommodate the heads of the bolts 691. Disposed in transverse relation to the diametrically opposed bores 697 is a pair of diametrically opposed counterbores 701 (Figure 37) below which are bores 702 of relatively smaller diameter than the bores 701 and in which corresponding bolts 703 have vertical sliding movement.

Referring to Figure 38, it will be observed that the uppermost of the auxiliary weights 693 is provided with a pair of diametrically opposed bores 704 which are also slidably penetrated by the bolts 703 and beneath which are suitable counterbores 705 for accommodating the nuts on the bolts 703. The uppermost auxiliary weight member 693 also has a pair of diametrically opposed counterbores 706, which are disposed in transverse relation to the bores 704, and beneath which are bores 707 in which bolts 703a are mounted for vertical sliding movement. These bolts 703a are connected to the next succeeding auxiliary weight member 693 disposed therebelow in the identical manner in which the bolts 703 from the first or upper weight member 692 are connected to the upper auxiliary weight member 693 disposed immediately therebelow.

All of the weight members 693 are connected together in series in the identical manner in which the uppermost of the auxiliary weight members 693 is connected to the upper or first weight member 692. It is thus seen that, upon each additional tier of bricks being deposited on the corresponding tier-carrying car 600 (Figure 3), the corresponding auxiliary weight member 693 will move upwardly a predetermined distance away from the weight member disposed immediately therebeneath and will then be prevented from moving further by virtue of the bolts which connect the particular weights that have been elevated to the juxtaposed weights therebelow as heretofore described.

Since the bricks which are deposited on the tier-carrying car 600 are quite fragile, as heretofore described, it is preferred that the elevator 601 and the tier-carrying car 600 moves downwardly gradually as each tier of bricks is deposited thereon. Therefore, each of the auxiliary weight members 693 is provided with a centrally disposed bore 710 in the upper surface thereof which, upon the weight members being disposed in juxtaposed relation to each other, is penetrated by a shock absorbing pin or shaft 711, the upper end being threadably embedded or otherwise secured to the weight member disposed immediately thereabove. For example, the shock absorbing or cushioning pin 711 depending from the uppermost or first weight member 692 projects into the bore 710 in the uppermost of the auxiliary weight members 693 when all of the weight members are disposed in juxtaposed relation to each other.

This condition would occur upon the elevator 601 and the tier-carrying car 600 being initially moved to raised position and before a tier of bricks is deposited on the tier-carrying car 600. For purposes of clarification, the showing in Figure 36 indicates that there is disposed on the tier-carrying car 600, three tiers of bricks since the three uppermost weight members are shown spaced from each other while the weight members therebelow are disposed in juxtaposed relation to each other. It will be noted in Figure 38 that each of the weight members 693 has an annular cavity 712 therein which serves the same purpose as the annular cavity 696 in the upper weight member 692.

The motive car 602 is most clearly shown in Figures 5, 27 and 28 and is constructed and operated in a manner to be presently described so as to move a loaded tier-carrying car 600 off of the elevator 601, when the elevator 601 is in a lowered position and for simultaneously positioning a succeeding tier-carrying car 600 on the elevator 601.

The motive car 602 is supported on a pair of flanged wheels 720 at the leading or front end thereof and is supported on a similar pair of flanged wheels 721 on the trailing end thereof, these wheels 720 and 721 being rotatably mounted on suitable axles 722 and 723. It will be noted that the rear or trailing axle 723 extends substantially from the remote surfaces of the corresponding pair of wheels 721 mounted thereon, the purpose of which will be later described.

The wheels 720 and 721 are so spaced as to ride upon the motive car tracks 647 heretofore described, these tracks being supported on the longitudinally extending frame members 647a which are, in turn, supported on the members 13 and 14 of the frame 10. The axles 722 and 723 are fixedly mounted in respective horizontally disposed blocks 725, only one of which is shown in Figure 3, and these blocks 725 are suitably secured, as by welding, to the front and rear ends of a pair of transversely spaced angle bars or frame members 727. The trailing ends of the angle bars 727 are bridged at their upper surfaces by a suitable plate 730 which is suitably secured thereto, as by welding, and to the upper surface of which a leaf spring latch arm 731 is suitably secured as by bolts 732 (Figure 28).

The front or leading portion of the leaf spring latch arm 731 has a pair of longitudinally spaced latch blocks 734 and 735 suitably secured to the upper surface thereof, as by screws 736, and it will be observed in Figure 2 that each of the blocks 725 at opposed ends of the motive car 602 has the upper end of a downwardly extending bar 737 suitably secured thereto as by welding. These bars 737 extend downwardly below the level of the tracks 647 and each is provided with an outwardly extending eye-bolt 740.

The eye-bolt 740 at the leading end of the motive car 602 has one end of a cable 741 suitably connected thereto which extends outwardly beyond the egress end of the elevator 601 and passes partially around an idler pulley 742 which is rotatably mounted on a suitable stub shaft 743 fixed in one of the ties 631. The end of the cable 741 remote from the motive car 602 is suitably connected to a relatively large reel member 744 and is adapted to be wound therearound as the car 602 moves from right to left in Figure 27. This reel member 744 is rotatably mounted on a suitable stub shaft 745 which may be fixed in the floor of the building on which the machine rests. There is a relatively smaller reel member 746 suitably secured to or integral with the reel member 744 and to which one end of a cable 747 is suitably connected.

The cable 747 extends inwardly and is suitably connected, as at 750, to one end of a piston rod 751 which extends into a cylinder 752 and has a suitable piston 753, shown schematically in Figure 27, fixed on a medial portion thereof and which is mounted for longitudinally sliding movement in the cylinder 752. This particular cylinder 752 is an air cylinder although it is to be understood that a hydraulic cylinder may be employed in lieu of each of the pneumatic cylinders described in this context, if so desired. The cylinder 752 has pipes 752a and 752b connected to opposed ends thereof.

The end of the piston rod 751 remote from the end to which the cable 750 is connected also has a cable 755 suitably connected thereto, as at 756. The cable 755 is connected at its end remote from the piston rod 751 to a relatively small reel member 757 which is suitably secured to or may be integral with a relatively larger reel member 760. The reel members 757 and 760 are rotatably mounted on a suitable stub shaft 761 which projects upwardly from the floor on which the machine rests. One end of a cable 762 is suitably secured to the reel member 760 and extends rearwardly beneath one of the tracks 625 and passes partially around an idler pulley 763 which is rotatably mounted on a suitable stub shaft 764 projecting upwardly from one of the ties 626. The cable 762 then extends in parallel relation to the tracks 625 and is suitably secured to the eye-bolt 740 disposed at the trailing end of the motive car 602.

Now, for purposes of illustration, it is to be assumed that the elevator 601 is in a raised position and there is a tier-carrying car 600 thereon and there is also a tier-carrying car 600 disposed adjacent the ingress end of the elevator 601. Also, at this time, the motive car 602 would be disposed in an inoperative position as shown in Figure 27.

Now, as the uppermost or eighth tier of bricks is deposited on the corresponding tier-carrying car on the elevator 601, the elevator 601 is moved to its lowermost position and as the elevator 601 approaches its lowermost position, in which instance the tracks 627 thereon are disposed at the same level as the tracks 625 and 630, a suitable switch means, later to be described (Figure 35), is actuated to cause compressed air to flow to the left-hand end of the cylinder 752 in Figure 27. The piston 753 and its piston rod 751 will then move from left to right from the position shown in Figure 27, whereupon the reel members will operate accordingly to thus cause the cable 741 to pull the motive car 602 from right to left in Figure 27 to and beyond the position shown in Figure 28.

As the motive car 602 moves from right to left in Figure 27, the opposed end portions of the rear axle 723 of the motive car 602, engage the surfaces 643 on the latch members 640 to move the same out of engagement with the corresponding platforms 635 and 636 as they project through the corresponding notches 637 in these platforms.

Now, as the elevator 601 moves downwardly, the transverse frame member 608 on the corresponding tier-carrying car 600 moved into position in front of the latch block 734 and, in the meantime, an empty car was manually moved into position so the block 735 engages the frame member 607 on the front of the empty car.

Thus, upon movement of the piston 753 and the piston rod 751 from left to right in Figure 27, the latch block 734 engages the outer surface of the transverse frame member 608 of the tier-carrying car 600 which is disposed on the elevator 601 while the latch block 635 engages the inner surface of the transverse frame member 607 on the empty tier-carrying car 600 disposed thereabove when the motive car 602 is in the position shown in Figure 27. Thus, the loaded tier-carrying car 600 on the elevator 601 is moved from right to left off of the elevator simultaneously with movement of the empty tier-carrying car 600 onto the elevator 601.

Also, any cars which may have previously been loaded, will be engaged by the cars which are subsequently loaded with bricks and will thus be moved along the egress tracks 630 to a suitable drying area or a kiln, as desired, for drying the bricks thereon.

As the empty tier-carrying car 600 is moved into proper position on the tracks 627 of the elevator 601, the outwardly extending portions of the rear axle 723 on the motive car 602 engage the slanting surfaces 643 on the latch members 640 thus moving these latch members from right to left in Figures 5 and 27 to release the elevator 601 therefrom and whereupon the elevator 601 will move upwardly by virtue of the cumulative elevator counterbalancing unit 687, to thus complete a cycle in the operation of the motive car 602.

*Piping and wiring diagram*

Throughout the specification various switches have been described for controlling the operation of various movable elements of this machine in proper sequence. The particular manner in which the switches are constructed and the position in which they are disposed relative to the actuating elements associated therewith are shown by way of illustration, it being understood that various other types of switches may be employed and they may also be located differently than that shown and described and may also be actuated by other means without departing from the spirit of the invention.

In Figures 34, 34–A, 34–B and 34–C, many of the elements are shown schematically and certain of the switches are exaggerated as to size relative to the parts with which they are associated so the arrangement of the various wires or conductors associated therewith may be clearly illustrated. It is evident that many of the parts described, such as relays and solenoid valves are shown schematically and, as a matter of fact, these relays and solenoid valves and certain of the switches may be located remotely from the machine if so desired.

In order to assist the reader in tracing the circuits shown in Figures 34, 34–A, 34–B, 34–C and 35, a coiled spring is shown associated with the bus bar of each of the double pole, double throw, push button spring switches. On the other hand, each of the bus bars associated with the double pole two position pushbutton snap switches has a small projection thereon at the opposite side from which the corresponding plunger is disposed.

As heretofore stated, upon a predetermined number of bricks, which in this instance is eighteen bricks, being positioned on the carrier fork mechanism 119, the leading brick engages the plunger of the spring switch 150. Before the plunger of the switch 150 is depressed, the switch serves as a conductor between the wire 151 and a wire 780 which is also connected to the wire 150.

When the plunger of the switch 150 is depressed, the circuit is completed between the wires 150 and 152. The wire 151 extends from the switch 150 to a manually operable master switch 781. This master switch 781 is provided for returning the transfer mechanism 180 to inoperative position and for moving the carrier fork carriage 120 to the position shown in Figure 8. In this instance, the master switch 781 serves as a conductor between the wire 151 and the wire 217 and also serves as a conductor between a wire 782 and a wire 783. When the switch 781 is moved to its alternate position, it serves as a conductor between a pair of wires 784 and 785. The end of the wire 782 remote from the switch 781 is connected to a positive lead wire 786 which is adapted to be connected to one side of a suitable source of electrical energy, not shown.

The end of the wire 783 remote from the switch 781 is connected intermediate the ends of a wire 787, opposed ends of which are connected to corresponding relays 790 and 791, each of which is embraced by broken lines in Figure 34. Both of the relays 790 and 791 are of identical construction and each has a solenoid plunger 792 which is surrounded by a corresponding solenoid coil 793, one end of these coils 793 being interconnected by a wire 794. Certain of the contacts in the relays 790 and 791 are interconnected by wires 795 to 798, inclusive.

When the solenoid plunger 792 of the relay 790 is in the position shown in Figure 34, it serves as a conductor between the wires 795 and 787 as well as serving as a conductor between the wire 797 and a wire 801. Upon downward movement of the plunger 792 in the relay 790, the relay serves as a conductor between the wire 796 and a wire 802 which is connected to the wire 787. The relay 790 also serves as a conductor between the wire 798 and a wire 803 which is connected intermediate the ends of the wire 801.

The end of the solenoid coil 793 in the relay 790, remote from the end to which the wire 794 is connected, has one end of the wire 212 from the switch 211 connected thereto. The end of the solenoid coil 793 in the relay 791, remote from the end to which the wire 794 is connected, has the wire 178 from the switch 175 connected thereto and the wire 176 at the other side of the switch 175 is connected to the lead wire 786.

When the relay 791 is deenergized, as shown in Figure 34, it serves as a conductor between the wire 796 and a wire 805 and also serves as a conductor between the wire 797 and the wire 787. On the other hand, when the coil 793 of the relay 791 is energized, the relay 791 serves as a conductor between the wire 795 and a wire 806, which is connected to the wire 805, and also serves as a conductor between the wire 798 and a wire 807 which is connected to the contact to which the wire 787 is connected.

One end of a wire 810 is connected to the wire 794, which extends between the solenoid coil 793, and the other end of the wire 810 is connected intermediate the ends of a wire 811 which extends to the right and then upwardly in Figure 34 and is connected to another lead wire 812, one end of which is connected to the side of the source of electrical energy, not shown, remote from the side to which the wire 786 is connected.

The wire 811 also has wires 813, 814 and 818 connected thereto and the end of the wire 811 remote from the lead wire 812 is connected to one end of a solenoid coil 815 which is a part of a double acting solenoid valve 816 having a movable core 817 therein. The movable core 817 has passageways 820, 821 and 822 therethrough.

Branch pipes 823 and 824 are connected to the valve 816 at one end thereof, their other ends being connected to a pipe or conduit 825 which extends downwardly in Figure 34 and has a branch pipe 826 extending therefrom to a suitable compressed air tank 827. The compressed air tank 827 has a suitable compressor pump 830 connected thereto. Thus, upon the core 817 of the solenoid valve 816 being in the position shown in Figure 34, compressed air will flow from the branch pipe 823 through the passageway 821 and through the pipe 172 to the left-hand end of the cylinder 165 for imparting movement to the carrier fork carriage 120 from the position shown in Figure 11 to the position shown in Figure 9. The air displaced by movement of the piston 167 from left to right in Figure 34 then returns through the pipe 173 and passageway 822 in the valve 816 to be discharged through an exhaust pipe 831.

One end of the wire 785, from master switch 781, is connected to the end of the solenoid coil 815 remote from the end to which the wire 811 is connected. It will be noted that the opposed ends of the valve core 817 have solenoid cores 832 and 833 thereon, the solenoid core 832 being surrounded by the coil 815 and the core 833 being surrounded by a solenoid coil 834, to one end of which the wire 218 from the switch 214 is connected and to the other end of which the wire 814 from the wire 811 is connected.

When the plunger of the switch 214 is not depressed, as shown in the upper right-hand portion of Figure 34, it serves as a conductor between the wires 215 and 216. The end of the wire 215, remote from the switch 214, is connected intermediate the ends of the wire 785 and the end of the wire 216, remote from the switch 215, is connected intermediate the ends of the wire 176. When the plunger of the switch 214 is depressed, it serves as a conductor between the wires 217 and 218.

It will be observed, in the lower right-hand portion of Figure 34, that the pipe 825 has an upwardly extending branch pipe 837 connected thereto which is provided with branches 237a and 237b at the upper end thereof which are, in turn, connected to a solenoid valve 840 which is identical to the valve 816 and the various parts of which will bear the same reference characters as those which apply to the solenoid valve 816 in the left-hand portion of Figure 34.

The end of the wire 813 remote from the end which is connected to the wire 811 is connected to one end of the solenoid coil 815 in the valve 840 and the other end of this coil has the end of the wire 805, remote from the relay 791, connected thereto. The ends of the wires 801 and 818, remote from the relay 790 and the wire 811, respectively, are connected to opposed ends of the solenoid coil 834 in the valve 840. It will be noted that the pipes 195 and 196 from the air cylinder 193 are connected to the side of the valve 840 remote from the side to which the branches 837a and 837b of the pipe 837 are connected.

This completes the description of the arrangement of the various electrically operated elements shown in Figure 34 and the manner of their operation will be provided later in the context.

Since the cycle of operation of the various elements shown in Figure 34 is effected independently of the elements shown in Figures 34-A, 34-B and 34-C, the elements shown in Figure 34 are described independently of the elements shown in Figures 34-A, 34-B and 34-C. As heretofore stated, the accumulator wheel 255, shown in Figure 7 and in the upper left-hand portion of Figure 34-A, is moved a quarter revolution upon each return stroke of the transfer mechanism 180 and, upon every fourth return stroke thereof, the cam member 266 engages and depresses the plunger of the switch 270 to change the contacts between which it serves as a conductor.

One end of the wires 271, 272 and 273 are connected to a common terminal or contact in the switch 270 and, in one instance, upon the plunger of the switch 270 being depressed, the switch 270 serves as a conductor between the wires 271, 272 and 273 and the wire 274. The end of the wire 271 remote from the switch 270 is connected to the lead wire 786, which may be an extension of the lead wire 786 shown in Figure 34. The wire 274 extends downwardly, in Figure 34-A, from the switch 270 and is connected to one end of a solenoid coil 793 in a relay 845 which is identical to the relays 790 and 791 and the various parts of which will bear the same reference characters as are applied to the relay 790 and 791.

A relay 846 is disposed adjacent the relay 845 in Figure 34-A and the various parts thereof will also bear the same reference characters as those applying to the parts of the relay 845. The solenoid coils 793 and the relays 845 and 846 are interconnected by wires 850, 851, 852 and 853. When the core 792 of the relay 845 is in the position shown in Figure 34-A, it serves as a conductor between the wire 851 and a wire 854 which is connected to a wire 855 and also serves as a conductor between the wire 853 and the wire 331 from the snap switch 326. When the solenoid coil 793 in the relay 845 is energized, this relay serves as a conductor between the wire 850 and the wire 855 and also serves as a conductor between the wire 852 and a wire 856 which is connected to the contact in the relay 845 to which the wire 331 is connected.

Now, when the solenoid core 792 in the relay 846 is in the position shown in Figure 34-A, it serves as a conductor between the wire 850 and a wire 857 which is connected intermediate the ends of the wire 331.

The relay 846 then also serves as a conductor between the wire 853 and a wire 860. One end of a wire 861 is connected to the wire 847, the other end thereof being connected intermediate the ends of the wire 862, one end of which is connected to the lead wire 812 which may be an extension of the lead wire 812 shown in Figure 34. The other end of the wire 862 is connected to one end of a solenoid coil 815 which is a part of a solenoid valve 862. This solenoid valve 862 is identical to the solenoid valves 816 and 840 and the various parts thereof will bear the same reference characters as like parts associated with the valves 816 and 840 and a further description thereof is deemed unnecessary.

When the coil 793 in the relay 846 is deenergized, the relay 846 serves as a conductor between the wire 851 and a wire 857a connected to the wire 857. The relay 846 then also serves as a conductor between the wire 852 and a wire 860a connected to the wire 860.

The end of the solenoid coil 815 in relay 863, remote from the end to which the wire 862 is connected, has the end of the wire 855 remote from the end which is connected to the relay 845 connected thereto. The end of the wire 860, remote from the relay 846, is connected to one end of the solenoid coil 834 in the relay 863 and the other end of this coil 834 has one end of a wire 865 connected thereto. The other end of the wire 865 is connected intermediate the ends of the wire 862.

The pipes 280 and 282 from the cylinder 281 are connected to one side of the solenoid valve 863 and branch pipes 866 and 867 are connected to the opposite side of the valve 863. These branch pipes 866 and 867 are connected to a common pipe 870 which extends downwardly, in Figure 34-A, and is connected to the pipe 825 which extends from Figure 34.

It will be observed in the upper central portion of Figure 34-A that, when the snap switch 325 is in one position, it serves as a conductor between the wires 273 and the wire 330 and, when the push button snap switch 326 is in one position, it serves as a conductor between the wires 272 and 333. The end of the wire 330 remote from the switch 325 is connected to one end of a solenoid coil 793 in a relay 872 adjacent which another relay 873 is disposed in Figure 34-A. These relays 872 and 873 are identical to the relay 790, 791, 845 and 846 heretofore described and, therefore, like parts associated with the relays 790, 791, 845, 846, 872 and 873 will bear the same reference characters.

The coils 793 in relays 872 and 873 are interconnected by a wire 875. The end of the solenoid coil 793 in the relay 873, remote from the end to which the wire 875 is connected has one end of the wire 592 connected thereto which extends from the snap switch 591 in Figure 34-B. Certain contacts in the relays 872 and 873 are connected by wires 877 to 880, inclusive. When the core 792 of the relay 872 is in the lowered position, shown in Figure 34-A, it serves as a conductor between the wire 878 and a wire 881 and also serves as a conductor between the wire 880 and a wire 882. When the coil 793 in the relay 872 is energized, the relay 872 serves as a conductor between the wire 877 and a wire 883, which is connected to the wire 881, and also serves as a conductor between the wire 879 and a wire 884, which is connected to the wire 882.

When the solenoid coil 793 in the relay 873 is energized as shown in Figure 34-A, the relay 873 serves as a conductor between the wire 877 and a wire 885 and also serves as a conductor between the wire 880 and a wire 886. When the coil 793 in the relay 873 is deenergized, the relay 873 serves as a conductor between the wire 878 and a wire 887, which is connected to the wire 885, and also serves as a conductor between the wire 879 and a wire 890, which is connected to the wire 886. The wire 882 from the relay 872 extends upwardly in Figure 34-A and is connected to the lead wire 786 and also has one end of the wire 381 from the switch 380 connected thereto.

Upon the plunger of the switch 380 being alternately depressed by the lever 364 (Figures 18 and 34-A), the switch 380 serves as a conductor between the wires 381 and 382. One end of a wire 891 is connected to the wire 875, which extends between the solenoid coil 793 in the relays 872 and 873, and the other end of the wire 891 is connected to the lead wire 812. The end of the wire 881, remote from the relay 872, is connected to one end of a solenoid coil 815 in a solenoid valve 892 which is identical to the solenoid valve 816, in Figure 34, and like parts of which will bear the same reference characters as those parts shown associated with the valve 816.

The end of the solenoid coil 815 in the valve 892, remote from the end to which the wire 881 is connected, has a wire 873 connected thereto which extends outwardly and is connected intermediate the ends of the wire 891. The end of the wire 885, remote from the relay 873, is connected to the lead wire 786 and the end of the wire 886 remote from the relay 873 is connected to one end of the solenoid coil 834 in the solenoid valve 892. The end of this coil 834, remote from the end to which the wire 886 is connected, has one end of a wire 895 connected thereto which extends upwardly and is connected at its other ends to the lead wire 812.

One end of a branch pipe 896 is connected to the pipe 825, extends upwardly therefrom, and has a pair of branch pipes 896a and 896b thereon which are connected to one side of the solenoid valve 892. The opposite side of the solenoid valve 892 has the pipes 375 and 377' connected thereto.

The end of the pipe 377, remote from the end which is connected to the cylinder 340, is connected intermediate the ends of the pipe 377'. This completes the description of the various electrical elements shown in Figure 34-A and it will be observed that the lead wires 812 and 786 as well as the wires 382 and 592 extend from the showing in Figure 34-A to the showing in Figure 34-B.

The illustration in Figure 34-B includes four relays 901 to 904, inclusive, which are identical to the relay 790 in Figure 34 and those parts of the relays 901 to 904, inclusive, which are identical to the relay 790 will bear the same reference characters.

The illustration in Figure 34-B also includes three solenoid valves 905, 906 and 907 which are identical to the solenoid valve 816 shown in Figure 34 and like parts of which will bear the same reference characters as those parts associated with the valve 816 in Figure 34. The switch 481, shown in the left-hand portion of Figure 34-B, is normally opened and, upon being closed, serves as a conductor between the wires 483 and 484. The wire 483 extends from the switch 481 and is connected at its other end to the lead wire 786.

One end of a wire 910 is connected intermediate the ends of the wire 483 and this wire 910 extends to the relay 901. Certain contacts in the relays 901 and 902 are connected by suitable wires 911 to 914, inclusive, and, upon the relay 901 being energized, the relay 901 serves as a conductor between the wires 910 and 911 as well as between the wire 913 and a wire 915. The wire 915 extends to one end of the solenoid coil 815 in the solenoid valve 905. The other end of the coil 815 in the valve 905 has a wire 916 connected thereto, the other end of which is connected intermediate the ends of a wire 917. One end of the wire 917 is connected to the lead wire 812 and the other end thereof is connected to one end of the solenoid coil 834 in the valve 905.

When the solenoid coil 793 in the relay 901 is deenergized, the relay 901 serves as a conductor between the wire 912 and a wire 920, which is connected to the wire 910, and also serves as a conductor between the wire 914 and a wire 921, which is connected to the wire 915. The coils 793 in the relays 901 and 902 are interconnected by a suitable wire 922 intermediate the ends of which one end of a wire 923 is connected. This wire 923 extends upwardly in Figure 34-B and is connected to the lead wire 812.

The end of the coil 793 in the relay 901, remote from the end to which the wire 922 is connected, has one end of the wire 563 connected thereto which extends to the illustration shown in Figure 34-C and is connected to the switch 562. The wire 587 from the snap switch 582, in the lower right-hand portion of Figure 34-B, is connected to the end to which the wire 922 is connected. When the solenoid coil 793 in the relay 902 is deenergized, as shown in Figure 34-B, the relay 902 serves as a conductor between the wire 912 and a wire 925 which extends downwardly and is connected to the end of the solenoid coil 834 in the valve 905 remote from the end to which the wire 917 is connected. The relay 902 then also serves as a conductor between the wire 913 and a wire 927 which is connected at its other end to a wire 930.

The wire 930 passes upwardly from the relay 902 and is connected to the lead wire 786. When the coil 793 in the relay 902 is energized, the relay serves as a conductor between the wires 914 and 930 and also serves as a conductor between the wires 911 and a wire 931 which is connected to the wire 925.

It will be observed in Figure 34-B that the pipes or conduits 450 and 453 from the cylinder 451, associated with the grab carriage 399, are connected to one side of the solenoid valve 905. The other side of the solenoid valve 905 has branch pipes 932a and 932b connected thereto which extend downwardly and are connected to a common pipe 932 which also extends downwardly and is connected to the pipe 825 which extends from the illustration in Figure 34-A.

The wire 484, in the lower portion of Figure 34-B, extends to the right and is connected to the coil 815 in the solenoid valve 907. A wire 933 is connected at one end thereof to the end of the coil 815 remote from the end to which the wire 484 is connected and this wire 933 extends to the right and then upwardly and is connected to the lead wire 812. The wire 933 also has wires 934 and 935 connected intermediate the ends thereof. The end of the wire 934 remote from the wire 933 is connected to one end of the coil 834 in the solenoid valve 907. The wire 586, from the switch 581 is connected to the end of the coil 834, in the solenoid valve 907, remote from the end to which the wire 934 is connected.

The wire 488 from the switch 487 is connected intermediate the ends of the wire 586. It will be observed, in the lower right-hand portion of Figure 34-B, that the ends of the pipes 541 and 542, remote from the cylinder 540, are connected to one side of the solenoid valve 907 and the other side of the solenoid valve 907 has branch pipes 825a and 825b from the pipe 825 connected thereto. The ends of the pipes 541' and 542' remote from the cylinder 540' are connected to the respective pipes 541 and 542.

One end of a branch pipe 936 is connected to the pipe 825 and this pipe 936 extends upwardly and has a pair of branch pipes 936a and 936b thereon, which are connected to one side of the solenoid valve 906. The other side of the solenoid valve 906 has the ends of the pipes 476 and 477 connected thereto. These pipes 476 and 477 extend from the cylinder 467.

The end of the wire 935 remote from the wire 933 is connected to one end of the coil 815 in the solenoid valve 906 and the other end of this coil 815 has a wire 937 connected thereto which extends upwardly, in Figure 34-B, and is connected to a contact in the relay 903. One end of the solenoid coil 793 in the relay 903 has one end of the wire 559 connected thereto, which extends to the illustration in Figure 34-C, and the other end of this coil 793 has one end of a wire 940 connected thereto, the other end of which is connected to one end of the solenoid coil 793 in the relay 904. The end of the coil 793 in the relay 904, remote from the end to which the wire 940 is connected, has the wire 382 connected thereto.

A wire 942 is connected to the wire 940 at one end thereof and is connected at its other end to the lead wire 812. Certain contacts in the relays 903 and 904 are connected to opposed ends of wires 943 to 946, inclusive. When the solenoid coil 793 in the relay 903 is deenergized, as shown in Figure 34-B, the relay 903 serves as a conductor between the wire 944 and a wire 947 and also serves as a conductor between the wires 945 and 937.

When the coil 793 in the relay 903 is energized, the relay 903 serves as a conductor between the wire 943 and a wire 950 which is connected to the wire 947. The relay 903 then also serves as a conductor between the wire 946 and a wire 951 which is connected to the wire 937. When the coil 793 in the relay 904 is energized, as shown in Figure 34-B, the relay 904 serves as a conductor between the wire 943 and a wire 952 and also serves as a conductor between the wire 946 and a wire 953 to which one end of the wire 947 from the relay 903 is connected.

This 953 is connected at its end remote from the relay 904 to the lead wire 786. The end of the wire 952 remote from the relay 904 is connected to one end of the solenoid coil 834 in the valve 906, the other end of this coil 834 being connected to one end of a wire 954. The other end of the wire 954 is connected intermediate the ends of the wire 935.

When the relay coil 793 in the relay 904 is deenergized, the relay 904 serves as a conductor between the wire 944 and a wire 955 which is connected to the wire 952. The relay 904 then also serves as a conductor between the wire 945 and the wire 956 which is connected to the wire 953. It will be noted that the wire 592 which extends from Figure 34-A, extends substantially across the upper portion of Figure 34-B and then extends downwardly and is connected to the switch 591. This completes the description of the arrangement of the various electrical elements shown in Figure 34-B.

Now, referring to Figure 34-C, it will be observed that the wires 559 and 563 extend to the respective switches 558 and 562 (see Figures 5 and 25). The wire 564 from the switch 562 is connected to the lead wire 786 which extends from the illustration in Figure 34-B and the wire 560 from the switch 558 is also connected to the lead wire 786. It will be noted that the plunger of switch 562 is engaged by a brick supported by the brick grasping unit 391' in Figure 5. However, since the plunger of switch 562 could equally as effectively be engaged by a brick supported by the grasping unit 391, this is shown in Figure 34-C so as to provide a ready comparison between the switches 558 and 562. The plunger of the switch 562 is engaged by a brick only when the grasping units 391 and 391' are rotated to where the vanes 520, 521, 520' and 521' thereon extend tranversely of the main frame 10 and, upon the bricks being released from the grasping units 391 and 391', the corresponding brick will fall below the plunger of the switch 562 since the bricks must clear the vanes 520 and 521 before the vanes return to a position longitudinally of the frame 10.

For this reason, the plunger of switch 487 (Figure 34-B) is engaged slightly in advance of the plunger of switch 562.

As heretofore stated, upon the uppermost tier of bricks being deposited on a tier-carrying car 600 disposed on the elevator 601, the elevator is then moved to its lowermost position and, by referring to Figure 35, it will be observed that the platform 635 engages and depresses the plunger of a double pole, double throw push button spring switch 960 at which time the switch 960 serves as a conductor between wires 961 and 962. The wire 962 extends to one side of a suitable source of electrical energy, not shown, and the wire 961 extends to one end of the solenoid coil 815 in a solenoid valve 965.

This valve 965 is identical to the solenoid valve 816, in Figure 34, and like parts will bear the same reference characters as those associated with the solenoid valve 816. The end of the coil 815 in the valve 965, remote from the end to which the wire 961 is connected, has a wire 963 extending therefrom which is connected to the side of the source of electrical energy, not shown, remote from the side to which the wire 962 is connected.

When the elevator 601 is released in the manner heretofore described, it moves upwardly and the switch 960 then serves as a conductor between wires 966 and 967, the wire 967 being connected to the terminal in the switch 960 to which the wire 962 is connected. The wire 966 is connected at its end remote from the switch 960 to one end of the solenoid coil 834 in the valve 965. The end of the coil 834, remote from the end to which the wire 966 is connected, has a wire 970 extending therefrom which is connected intermediate the ends of the wire 963.

Now, the pipes 752a and 752b extending from the cylinder 752 are connected to one side of the valve 955. The other side of the valve 965 has a pair of branch pipes 971a and 971b connected thereto which extend downwardly and are connected to a common pipe 971. The pipe 971 then extends downwardly and is connected to the pipe 825 which may be an extension of this pipe 825 shown in Figures 34 to 34-B, inclusive.

*Modified form of feed table and carrier mechanism*

Referring to Figures 39 and 40 (sheet 20), there is shown a modified form of the feed table which may be employed in lieu of the table 100 shown in Figures 1, 2, 5 and 8 and which is particularly designed to accommodate a fork assembly of the type shown in Figures 41, 42 and 43. The carrier fork assembly, shown in Figures 41, 42 and 43, is adapted to be employed in lieu of the fork assembly 119 shown in Figure 8.

The modified form of the feed table is designated broadly at 100a and includes four horizontally spaced frame members 980 which are shown in the form of inverted angle bars in Figure 39. These angle bars 980 are supported at only one end thereof, at which end they are welded to a common plate 981 which is, in turn, welded to a substantially rectangular framework 982, formed of angle bars, and which is supported on vertically disposed frame members or legs 983. The legs 983 extend downwardly and outwardly in diverging relation, as shown in Figure 39, and are welded to opposed ends of horizontally disposed frame members 984, these frame members and the corresponding leg 983 also being welded to horizontally disposed angle bars 985 and 986 which extend below and in spaced parallel relation to the horizontally disposed frame members 980 but terminate short of the vertical plane of the free ends of the frame members 980.

Suitable diagonal members 987 are welded at the free ends of the bottom horizontally disposed frame members 985 and 986 and extend upwardly at an angle and are welded at their upper ends to the rectangular frame 982. It will be noted that the modified form of feed table 100a differs primarily from the original form of the feed table 100 in that the frame members 980 have substantially less vertical displacement than the frame members 101 to 104, inclusive, on the feed table 100 and, also, the inner ends of the frame members 980 of the table 100a are not supported.

Referring to Figures 41 to 43, inclusive, there is shown a modified form of carrier fork assembly 119a, the carriage of which is indicated at 120a. The carrier fork assembly includes three transversely spaced horizontal fork members 1000 which are bridged adjacent their free ends by a suitable reenforcing bar 1001 and are also bridged intermediate their ends by a similar reenforcing bar 1002, these bars 1001 and 1002 being suitably secured to the lower surfaces of the horizontal fork members 1000. The horizontal fork members 1000 are also bridged at their inner ends adjacent the carriage 120a by a transverse base member or bar 1003.

These transverse base members 1001 to 1003, inclusive, constitute the most important feature of the modified form of the carrier fork assembly 119a compared to that of the original form of the carrier fork assembly 119 and insures that the free ends of the horizontal fork members 1000 may be held in proper spaced relation to each other. The vertical displacement of the horizontal fork members 1000 is substantially greater than that of the frame members 980 on the modified form of the feed table 100a, with which the modified form of fork assembly 119a is particularly adapted to be associated, and, thus, the members 1001 to 1003, inclusive, will not engage the lower surface of the frame members 980 on the feed table 100a as the horizontal fork members 1000 are moved upwardly to remove the bricks from the feed table 100a.

The horizontal for members 1000 are each provided with a plurality of longitudinally spaced bearing members 1004 in which axles 1005 are fixedly mounted, these axles 1005 having suitable rollers 1006 rotatably mounted thereon between each adjacent pair of bearing members 1004. The inner or right-hand end of the horizontal fork members 1000 in Figure 43 are suitably secured, as by welding, between corresponding pairs of vertically disposed and upwardly extending fork supporting members 1007 which are bolted together by suitable bolts 1010 having suitable spacers 1011 thereon for holding the upwardly extending fork supporting members 1007 in proper spaced relation to each other.

A block 1012 is secured, as by welding, between each pair of the vertically disposed fork supporting members 1007 and a common vertically disposed plate 1013 is suitably secured to these blocks 1012, as by screws 1014, the heads of which are disposed below flush with the outer surface of the plate 1013.

As the bricks are introduced to the modified form of feed table 100a, they are moved inwardly and engage the plate 1013 and the endmost of the bricks slides against this plate 113 as the bricks are transferred from the carrier fork assembly to the accumulator table 210 in the manner heretofore described.

The three pairs of vertically disposed spaced fork supporting members 1007 extend upwardly between a pair of spaced tubular members 1020 which are identical to the tubular members 121 and 122 of the original form of the carrier fork carriage 120 and, each pair of these vertically disposed frame members 1007 is welded to opposed sides of a corresponding horizontally disposed bar 1021, which extends outwardly in opposite directions from the corresponding pair of vertically disposed fork supporting members 1007 and is pivotally mounted on a pair of transverse shafts 1023 and 1023a. These shafts 1023 and 1023a have suitable spacers or sleeves 1024 slidably mounted thereon to insure that the bars 1021 are held in proper spaced relation to each other. Opposed ends of the shafts 1023a and 1023 are fixedly mounted in the upper ends of corresponding pairs of horizontally spaced links 1022 and 1025.

The links 1022 and 1025 extend downwardly and are pivotally mounted on corresponding transverse shafts 1026 and 1027 which are fixedly mounted at opposed ends thereof in corresponding pairs of bearing blocks 1030 and 1031. The bearing blocks 1030 are suitably secured, as by welding, to the upper surfaces of the outer ends of the tubular guide members 1020. The bearing blocks 1031 are suitably secured, as by welding, in spaced relation to the inner ends of the tubular guide members 1020. The tubular guide members 1020 also support opposed ends of spaced angle bars 1035 and 1036, the angle bar 1935 being positioned immediately adjacent the bearing blocks 1031 and the angle bar 1036 being spaced from the bearing blocks 1031 and on the opposite side relative to the angle bar 1035.

The angle bar 1036 has a suitable angularly disposed stop member 1037 welded thereto and projecting upwardly and outwardly therefrom. The function of the angle bars 1035 and 1036 and the stop member 1037 is identical to that described for the angle bars 131 and 132 and the stop member 133 (Figures 9, 10, 11 and 12) heretofore described. The horizontally disposed member 1021 of the modified form of the carrier 120a are spanned intermediate their ends by a shaft 1040 on which the lower ends of the lever arms 155 may be pivotally mounted so as to impart movement to the carriage 120a in the identical manner in which the carriage 120 is moved in Figure 9.

The tubular members 1020 are adapted to be mounted on the shafts or bars 123 and 124 heretofore described (Figure 8) and their outer ends are also bridged by a rod 1041 which serves in the same capacity as the rod 134 shown in Figures 8 to 12, inclusive. A switch 150a is suitably secured to the outermost of the vertically disposed fork supporting member 1007 and this switch 150a serves in the same capacity as the switch 150 in Figures 9 and 34.

*Method of operation*

As the bricks are introduced to the feed table 100 or 100a, as the case may be, the carrier fork carriage 120 and 120a, as the case may be, is positioned as shown in Figure 11 and, upon a predetermined number of bricks being slid onto the feed table which is shown as being eighteen bricks in Figure 34, the leading or first brick engages and depresses the plunger of the switch 150 and, if the transfer mechanism 180 is in an inoperative or forward position, the switch 214 will also be in a position to serve as a conductor between the wires 217 and 218.

In order to insure that the fork assembly 119, including the carriage 120, will not have moved to the position shown in Figure 11 from that shown in Figure 9 before the transfer mechanism 180 has moved to a forward or inoperative position, although the switch 150 serves as a conductor between the wires 151 and 780 when it is not engaged by a brick B, the circuit to the solenoid coil 815 in the valve 816 (Figure 34) is not completed until the plunger of the switch 214 is depressed by the bar 182 on the transfer mechanism 180.

Thus, upon the transfer mechanism 180 being positioned in its proper inoperative position, and, in the event the plunger of the switch 150 is not depressed, the current will flow from the lead wire 786 through the wires 176, 216, 153 and 780, through the switch 150, through the wire 151, through the switch 781, through the wire 217, through the switch 214, and through the wire 218 to the coil 834 in the solenoid valve 816. Current then flows through this coil 834, through the wires 814 and 811 to the lead wire 812 to complete the circuit to the coil 834 in the valve 816 and to move the core 817 of the valve 816 from left to right in Figure 34.

Thus, compressed air will flow from the tank 827 through the pipes 826, 825 and 824, through the passageway 822 in the core 817 of the valve 816, through the pipe 173 to the right-hand end of the cylinder 165 in Figures 9 and 34. The compressed air will then cause the piston 167 to move from right to left or from the position shown in Figure 9 through the position shown in Figure 10 to the position shown in Figure 11, at which point the L-shaped fork members 145 and the corresponding rollers 146 thereon will be positioned immediately below the horizontal plane of the upper surfaces of the frame members 101 to 104, inclusive, of the feed table 100 substantially as shown in Figure 8.

Thus, upon the plunger of the switch 150 being depressed by the leading brick B, as indicated in Figure 34, the piston 167 is caused to move in the opposite direction as current flows from the lead wire 786 through the wires 176, 216 and 153 through the switch 150, through wires 152 and 785 to the solenoid coil 815 in the valve 816. The current then flows through this coil 815, through the wire 811 to the lead wire 812 to complete the circuit to the coil 815 in the valve 816 and to move the core 817 in the valve 816 from right to left to the position shown in Figure 34.

Compressed air will then pass from the pipe 825 through the branch 823, through the passageway 822 in the valve 816 and through the pipe 172 to the left-hand end of the cylinder 165 in Figures 9 and 34. This will cause the piston 167 to move from left to right and, in so doing, the fork carriage 120 will move from the position shown in Figure 11, through the position shown in Figure 12, to that shown in Figure 9. The compressed air discharged from the cylinder 165 will pass through the pipe 173, through the passageway 822 in the valve 816 to be discharged through the pipe 831.

Now, it is evident, by referring to Figure 34, that the plunger of the switch 175 will be depressed by the angle bar 131 of the fork carriage 120 as the carriage 120 moves to the end of its stroke as shown in Figure 9 and, in one instance, the current will flow from the lead wire 786 through the wire 176, through switch 175, through wire 178 to one end of the solenoid coil 793 in the relay 791. Current will continue through the relay coil 793 in the relay 791, through the wires 794, 810 and 811 to the lead wire 812 to complete the circuit to the coil 793 in the relay 791. The plunger 792 in the relay 791 will then move upwardly to cause the current to flow from the lead wire 786, through the wire 782, through switch 781, through wires 783 and 787, through the relay 790 and wire 795 to the relay 791 since the solenoid coil 793 in the relay 790 would then be energized in a manner to be presently described.

Current would then flow from the wire 795, through the relay 791 and wires 806 and 805 to the solenoid coil 815 in the left-hand end of the valve 840. Current would continue through this coil 815, through the wire 813 and the wire 811 to the lead wire 812 to thus complete the circuit to the coil 815 in the valve 840.

Now, the coil 793 in the relay 790 is energized at this time as current flows through the wires 176 and 177, through the switch 211, which will then be in closed position, and through the wire 212 to the coil 793 in the relay 790. Current continues through this coil 793, through the wires 794, 810 and 811 to the lead wire 812 to complete the circuit to the coil 793 in the relay 790.

Now, upon the coil 815 in the valve 840 being energized in the manner to be described, the core 817 thereof assumes the position shown in Figure 34 and compressed air flows from the pipe 825 through branch pipes 837 and 837a, through the passageway 821 in the valve 840, through the pipe 195 to the right-hand end of the cylinder 193 thus causing the transfer mechanism 180 to move from the left to right, in Figures 7 and 34, to transfer the bricks on the rollers 146, on the respective fork members 145, onto the accumulator table 210 as shown in Figure 7.

Now, in order to insure that the carriage 120 will remain in the withdrawn or operative position shown in Figure 9 during the period that the transfer mechanism 180 is extending across the L-shaped fork members 145, the switch 214 will move as the bar 182 moves out of engagement therewith so as to serve as a conductor between the wires 215 and 216 with the result that current will flow from the wire 786 through wires 176 and 216, through the switch 214, through the wires 215 and 785 to the coil 815 in the valve 816. Current continues through the coil 815 in the valve 816, through the wire 811 to complete the circuit to this coil 815 to thus cause the valve core 817 to remain in the position to which it was previously caused to move and to also cause the compressed air to still be admitted to the left-hand end of the cylinder 165 in Figure 34.

Also, when the transfer mechanism 180 reaches the end of its active stroke, during which it transfers the bricks from the carrier forks onto the accumulator table 210, the member 213 on the transfer mechanism 180 engages and depresses the plunger on the push button snap switch 211 to thus break the circuit to the solenoid coil 793 in the relay 790. This will, of course, permit the plunger 792 in the relay 790 to move downwardly in Figure 34. Thus, the flow of compressed air to the cylinder 193 is reversed as the compressed air flows from the pipe 837 through branch pipe 837b, through the passageway 822 in the valve 840, through the pipe 196 to the left-hand end of the cylinder 193. The compressed air is then discharged from the cylinder 193 through the pipe 195, through the passageway 820 in the valve 840, to be discharged through the discharge pipe 831 in the valve 840.

The core 817 in the valve 840 is caused to assume this last-named position because of current flowing from the lead wire 786 through the wire 782, through the master switch 781, through the wires 783, 786 and 807, through the relay 791, through the wire 798, through the relay 790, through the wires 803 and 801 to one end of the solenoid coil 834 in the valve 840. The current then flows through this coil 834, through the wires 818, 811 and 812 to complete the circuit to the coil 834 in the valve 840 and to cause the core 817 in this valve 840 to move from left to right in Figure 34.

This will position the passageways 820 and 821 in the valve coil 817 of the valve 840 so as to reverse the direction of movement of the piston 194 in the cylinder 193 and to return the transfer mechanism 180 to inoperative position to complete the cycle of operation of the carrier fork carriage 120 and the transfer mechanism 180.

Upon alternate cycles in movement of the carrier fork mechanism 119 and the transfer mechanism 180, the circuits to the valves 816 and 840 will be completed in a slightly different manner than that previously described. As the bar 182 on the transfer mechanism 180 moves to inoperative position or from right to left in Figure 34 following the first movement of the same in the opposite direction, the bar 182 will engage the plunger of the switch 214 to cause current to flow from the lead wires 786 through the wires 176, 153 and 780, through the switch 150, since the switch 150 will then serve as a conductor between the wires 780 and 151, through the wire 151, through the master switch 781, through the wire 217, through the switch 214, through the wire 218 to one end of the coil 834 in the valve 816.

The current then flows through this coil 834 and through the wires 814 and 811 to the lead wire 812 to complete the circuit to this coil 834 and to thus reverse the direction of movement of the piston 167 and the cylinder 165 to move the carrier fork mechanism 119 outwardly to the feed table 100. It is evident that the circuit to the coil 815 in the valve 816 would be opened upon the plunger of the switch 214 being depressed by the bar 182 on the transfer mechanism 180.

During alternate operations of the carrier fork mechanism 119 and the transfer mechanism 180, the switches 175 and 211 will have been moved during the previous operation of these mechanisms so the switch 175 continues to serve as a conductor between the wires 176 and 178 while the switch 211 fails to serve as a conductor between the wires 177 and 212.

Upon the leading brick engaging and depressing the plunger of the push button switch 150, the circuit is completed to the coil 815 in the valve 816 in the manner heretofore described to cause the carriage 120 to move from left to right and, in so doing, to engage and depress the plunger of the switch 175 and to open the circuit between the wires 176 and 178. This will deenergize the coil 793 in relay 791 and, since the coil 793 in the relay 790 was previously deenergized in the manner heretofore described, the coil 815 in the left-hand end of the valve 840 will again be energized as current flows from the lead wire 786, through the wire 782, through the master switch 781, through the wire 787, through the wire 802, through the relay 790, through wire 796, through the relay 791 and through the wire 805 to one end of the coil 815 in the valve 840. Current continues through this coil 815 and through the wires 813 and 811 to the lead wire 812 to complete the circuit to this coil 815. The piston 194 will then move from right to left, whereupon, the member 213 on the transfer mechanism 180 will engage the plunger of the switch 211 to again cause the switch 211 to serve as a conductor between the wires 177 and 212. This will permit current to flow from the lead wire 786, through the wires 176 and 177, through the switch 211 and through the wire 212 to the coil 793 in the relay 790.

Current continues through this coil 793, through the wires 794, 810 and 811 to the lead wire 812 to thus cause the plunger 792 of the relay 790 to again move upwardly while the coil 793 in the relay 791 remains deenergized. This will open the circuit to the coil 815 in the valve 840 and will energize the coil 834 in the valve 840 since current will then flow to the wire 811 from the lead wire 786, through the intervening connections heretofore described, through the relay 791, through the wire 797, through the relay 790 and through the wire 801 to one end of the coil 834 in the valve 840.

Current then flows through this coil 834 and through the wires 818 and 811 to the lead wire 812 to energize the coil 834 in the valve 840 and to cause the transfer mechanism 180 to again return to inoperative position and to, in turn, cause the carrier fork mechanism 119 to again move into position for receiving bricks from the feed table 100 in the manner heretofore described, following which the first circuit is again initiated for a succeeding operation of the carrier fork mechanism 119 and the transfer mechanism 180.

Now, as heretofore stated, upon each return stroke of the transfer mechanism 180, that is, from right to left in Figures 7, 34 and 34-A, the finger 261 on the transfer mechanism 180 engages one of the projections 260 on the accumulator wheel 255 to thus impart a quarter revolution to the wheel 255 and, upon every fourth return stroke of the transfer mechanism 180, the cam 266 will engage and depress the plunger of the push button snap switch 270 in the upper left-hand portion of Figure 34-A. Also, as the rows of bricks are moved onto the accumulator table 210 as shown in Figure 7, the bricks in each row are separated by the separator wires 235 in the manner heretofore described.

Thus, upon the switch 270 being depressed in alternate cycles thereof, the switch 270 assumes a closed position and the rake members 317 in the central portion of Figure 7 are caused to move downwardly to engage the outer surfaces of the bricks in the last row introduced to the accumulator table 210 and to then sweep the rows of bricks B–1, B–2, B–3 and B–4 off of the accumulator table 210 and onto the separator table 251. The switch 270 causes this operation of the rake mechanism 250 since current flows from the lead wire 786 through the wire 271, through the switch 270, through the wire 274 to the solenoid coil 793 in the relay 845 in Figure 34–A. Current continues through this coil 793, through the wires 847, 861 and 862 to the lead wire 812 to thus energize the coil 793 and to cause the solenoid plunger 792 in the relay 845 to move upwardly.

Also, at this time, the switch 326 in the upper central portion of Figure 34–A is in the closed position shown and the solenoid coil 793 in the relay 846 is also energized since current flows from the lead wire 786 through the wires 271 and 272, through the switch 326, through the wire 333 to the solenoid coil 793 in the relay 846. Current continues through this coil 793, through the wires 847, 861 and 862 to the lead wire 812 to complete the circuit to the coil 793 in the relay 846. This causes the coil 815 in the solenoid valve 863 to be energized since current will then flow from the lead wire 786 through the wires 271, 272, 331 and 857, through the relay 846, through the wire 850, through the relay 825, through the wire 855 to the coil 815 in the solenoid valve 863.

Current continues through the coil 815, through the wire 862 to the lead wire 812 to complete the circuit to the coil 815 in the solenoid valve 863. This will energize the coil 815 causing the core 817 to move from right to left in Figure 34–A and permitting compressed air to flow from the pipe 825, through the pipes 870 and 866, through the passageway 821 in the valve 863, through the pipe 280 to the left-hand end of the cylinder 281 in Figure 34–A.

The compressed air in the cylinder 281 is then discharged as the piston 285 moves from left to right in Figures 3 and 34–A, through the pipe 282, through the passageway 822 in the valve 863, to be discharged through the discharge pipe 831. Now, due to the pivotal connection between the arms 293 and the plates 296 and 297 relative to the shaft 301, as shown in Figures 7 and 13, the rake members 317 will first move downwardly from the position shown in Figure 7 to substantially the position shown in Figure 3 and, with continued movement of the piston from left to right in Figures 3 and 34–A, the rake mechanism 250 will rake the bricks off of the accumulator table 210 and onto the separator table 251.

As the links 290 associated with the rake mechanism 250 reach the end of their working stroke, it will be observed in Figures 3 and 34–A that these links 290 engage and depress the plungers of the switches 325 and 326 and, at substantially this same time, the transfer mechanism 180 will have completed a return stroke to inoperative position to thereby impart another step in rotation to the accumulator wheel 255 and to move the cam 266 associated therewith out of engagement with the plunger on the switch 270, however, the switch 270 will remain closed. The switch 326 will then be opened to deenergize the solenoid coil 793 in the relay 846 to open the circuit to the coil 815 in the valve 863 and to energize the coil 834 in the valve 863.

Now, since the coil 793 in the relay 846 is deenergized, the coil 834 in the valve 863 will be energized since current will flow from the lead wire 786, through the wires 271, 272, 331 and 856, through the relay 845, through the wire 852, through the relay 846, through the wires 860a and 860 to one end of the coil 834 in the valve 863. Current then flows through the coil 834, through the wires 865 and 862 to lead wire 812 to complete the circuit to this coil 834. The core 817 in the valve 863 will then assume the position shown and this will cause compressed air to flow from the pipe 870 through the branch pipe 867, through the passageway 821 in the valve 863, through the pipe 282 to the righthand end of the cylinder 281 and to thus cause the piston 285 to move from right to left in Figures 3 and 34–A and to thereby cause the rake members 317 to move upwardly and to then move the rake mechanism 250 along the guide bars 305 and 306 to cause the rake mechanism 250 to occupy the position substantially as shown in Figure 7.

However, since the push button snap switch 325 is also closed as the rake mechanism 250 reaches the end of its active stroke, the solenoid coil 793 in the relay 872, shown in the lower right-hand portion of Figure 34–A, will be energized since current will flow from the lead wire 786, through the wires 271 and 273, through the switch 325, through the wire 330 to one end of the coil 793 in the relay 872. Current then continues to flow through this relay 793, through the wires 875 and 891 to the lead wire 812 to thus energize the coil 793 in the relay 872.

This will, of course, cause the solenoid plunger 792 in the relay 872 to move upwardly to thus complete a circuit to the coil 815 in the solenoid valve 892 shown in the upper right-hand portion of Figure 34–A. The circuit is completed to this coil 815 in the valve 892 because the last succeeding rearward stroke of the grab carriage 390 caused the switch 591 (Figure 34–B) to assume a closed position as the plunger thereof was engaged by the pawl 572 on the grab carriage 390 (Figures 32, 33 and 34–B).

This caused the coil 793 in the relay 873 to be energized since current then flows from the lead wire 812 in Figure 34–A through the wires 891 and 875, through the coil 793 in the relay 873, through the wire 592 (Figure 34–B), through the switch 591, and through the wires 593 and 585 to the lead wire 786 to complete the circuit to the coil 793 in the relay 873 in Figure 34–A. Thus, in this instance, both of the plungers 792 in the relays 872 and 873 are in an elevated position and current flows from the lead wire 812 through the wires 891 and 893, through the coil 815 in the valve 892, through the wires 881 and 883, through the relay 872, through the wire 877, through the relay 873 and through the wire 885 to the lead wire 786 to complete the circuit to the coil 815 in the valve 892.

This will cause the core 817 of the valve 892 to move from right to left and will thus permit compressed air to flow from the pipe 825, through the pipes 896 and 896a, through the passageway 821 in the valve 892, through the pipe 375 to the center of the cylinder 340. This will cause the pistons 372 and 372' to move apart from each other to, in turn, cause the slats 341 on the separator table 251 (Figures 16, 18 and 190) to move apart from each other to thus space the bricks in each of the rows B–1 to B–4, inclusive, from each other.

Compressed air is discharged from opposed ends of the cylinder 340 through the pipes 377 and 377', through the passageway 822 in the solenoid valve 892 to be discharged through the pipe 831. Now, as the lever 364 reaches the end of its outward stroke, it engages and depresses the plunger on the push button snap switch 380 to, in this instance, energize the solenoid coil 793 in the relay 904 in the upper central portion of Figure 34–B. To this end, current flows from the lead wire 786, through the wires 882 and 381, through the switch 380, through the wire 382, through the coil 793 in the relay 904 in Figure 34–B, through the wires 940 and 942 to the lead wire 812. The piston 545 in the cylinder 540 associated with the switch grasping unit 391 is then in lowered position in Figures 25, 34–B and 34–C.

However, upon the last previous upward stroke of the piston 545 in the cylinder 540, the plunger of the switch 558 was engaged and depressed by the plate 495 and, in this instance, this caused the switch 558 to assume a closed position since this switch is a push button snap switch and will retain this closed position until the plunger thereof is again engaged and depressed by the plate 495. Thus, current flows from the wire 786 (Figure 34-C) through the wire 560, through the switch 558, through the wire 559 to the solenoid coil 793 in the relay 903 in the upper central portion of Figure 34-B.

Current continues through this 793 and through the wires 940 and 942 to the lead wire 812 to thus energize this coil 793 and to cause the plunger 792 in this relay 903 to assume an elevated position. It is thus seen, in this instance, that both of the plungers 792 in the respective relays 903 and 904 are disposed in an elevated position upon the plunger of the switch 380 (Figure 34-A) being depressed by the lever arm 364 associated with the separator table 251.

Thus, the coil 834 in the right-hand end of the valve 906 (Figure 34-B) is energized since current flows from the lead wire 786 through the wires 953, 947 and 950, through the relay 903, through the wire 943, through the relay 904, through the wire 952 to one end of the coil 834 in the valve 906. Current continues through this coil 834, through the wires 954, 935 and 933 to the lead wire 812 to complete the circuit to this coil 834. The core 817 in the valve 906 then assumes the position shown in Figure 34-B to permit compressed air to be directed to the right-hand end of the cylinder 467 in Figure 34-B through the intervening pipes and the valve 906. This causes the piston 470 to move from right to left, moving the grab carriage in a like direction to where it will come to rest disposed immediately above the separator table 251. The air is discharged from the cylinder 467 through the pipe 476, through the passageway 820 in the valve 906 and through the corresponding pipe 831.

As the grab carriage 390 reaches the end of its active stroke, that is, the end of its stroke in which it is disposed above the separator table 251, the bar 480 thereon engages and depresses the plunger of the switch 481 to thus close this switch 481. This will permit current to flow from the lead wire 786, through the wire 483, through the switch 481, through the wire 484 to one end of the solenoid coil 815 in the solenoid valve 907 in the lower right-hand portion of Figure 34-B. Current continues through this coil 815, through the wire 933 to the lead wire 812 to thus energize the coil 815 in the valve 907 and to cause the core 817 thereof to move from right to left in Figure 34-B.

This will permit compressed air to flow from the pipe 825 through the branch pipe 825a, through the passageway 821 in the valve 907, through the pipe 541 to the lower end of the cylinder 540 and to thus cause the piston 545 to move upwardly in Figures 25 and 34-B. As heretofore described, this will cause each of the flexible pairs of vanes 520 and 521 to move toward each other and to resiliently grasp opposed sides of each row of four bricks.

Now, as the piston 545 moves upwardly, the plunger of the switch 558 is again depressed and, in this instance, the switch 558 will then assume an opened position and will open the circuit to the coil 793 in the relay 903 to thereby permit the core 792 in this relay 903 to assume a lowered position in Figure 34-B. It is thus seen that the coil 793 in the relay 903 is then deenergized while the coil 793 in the relay 904 is still energized and current flows from the lead wire 786 in Figure 34-B through the wire 953, through the relay 904, through the wire 946, through the relay 903, through the wires 951 and 937 to one end of the coil 815 in the valve 906. Current continues through this coil 815 and through the wires 935 and 933 to the lead wire 812 to thus energize the coil 815 and to cause the core of the valve 906 to move from right to left in Figure 34-B. It is evident that this will cause compressed air to flow into the opposite or left-hand end of the cylinder 467 and will, in turn, cause the grab carriage 390 to move from left to right in Figures 3 and 34-B.

The grab carriage 390 will then assume a position above the tier-carrying car 600 which is then disposed on the elevator 601. As the grab carriage 390 moves to this last-named position, the bricks are carried with the same and are thus slid off of the corresponding slats 341 of the separator table 251 and are then deposited upon the car 600 in rows of four bricks each and each of the rows being spaced from the next adjacent row, this first tier of bricks thus formed extending transversely of the slats 620 on the tier-carrying car 600 (Figure 31).

As the grab carriage 390 moves in a return stroke from left to right in Figure 34-B, the bar 480 moves out of engagement with the plunger on the switch 481 and the pawl 592 on the rear end of the grab carriage 390 engages a corresponding projection 575 on the accumulator wheel 576 to impart a step in rotation thereto which, in this instance, is equal to a quarter revolution. The function of this accumulator wheel 576 will be presently described.

The pawl 572 then engages the plunger of the snap switch 591 in the lower right-hand portion of Figure 34-B and it will then cause this switch 591 to assume an opened position.

Upon the switch 591 being moved to opened position, it is evident that the coil 793 in the relay 873 in the lower right-hand portion of Figure 34-A is deenergized while the coil 793 in the relay 872 will remain energized at this time although the lever arm 290 associated with the rake mechanism 250 will have returned to inoperative position since, as heretofore stated, both of the switches 325 and 326 are push button snap switches. This will cause the return stroke of the lever arms 364 and 364', in Figure 34-A to move the slots 341 on the separator table 251 to closed position since the coil 834 in the right-hand end of the valve 892 will then be energized as current flows from the lead wire 876 through the wires 882 and 884, through the relay 872, through the wire 879, through the relay 873, through the wires 890 and 886 to one end of the coil 834 and through the wire 895 to the lead wire 812. The core 817 in the valve 892 then assumes the position shown in Figure 34-A and compressed air will flow to the opposed ends of the cylinder 340 causing the pistons 372 and 372' to assume the position shown in Figure 34-A. Although, the lever arm 364 moves out of engagement with the plunger of the switch 380, this switch 380 will still assume the closed position to which it was previously moved since this is a push button snap type of switch.

It will be noted that, as a rearward or return stroke is imparted to the grab carriage 390 in the manner heretofore described, the switch 481 is then opened to deenergize the coil 815 in the left-hand end of the valve 907 (Figure 34-B).

Now, it has already been stated how a return stroke of the grab carriage 390 causes the pawl 572 thereon to impart a step in rotation to the accumulator wheel 576. In this instance, upon the grab carriage moving in its return stroke, the leading high point at one end of the cam 583 will engage and depress the plunger of the switch 581 in the lower right-hand portion of Figure 34- B and then this particular high point of the cam wheel 583 will move out of engagement with the plunger of the switch 581 during this same movement thereof through an arc of 90 degrees. Thus, the solenoid coil 834 in the valve 907 will momentarily be energized to cause the core 817 thereof to assume the position shown in Figure 34-B. This coil 834 in the valve 907 is energized by virtue of the current flowing from the lead wire 786 through the wire 585, through the switch 581 and through the wire 586 to the coil 834.

Current then flows through this coil 834, through the wires 934 and 933 to the lead wire 812 to complete the circuit to the coil 834 in the valve 907. With the core 817 of the valve 907 in the latter position, it is evident that the pipe 825 will cause compressed air to be directed to the upper end of the cylinder 540 in Figures 25, 34-B and 34-C, and will thus cause the cylinder 545 to move downwardly to thereby release the bricks from each of the pairs of grasping vanes 520 and 521 and 520' and 521' associated with the respective brick grasping units 391 and 391'.

The first tier of bricks will then be supported on the corresponding tier-carrying car 600 on the elevator 601 and the elevator will be caused to move downwardly in the manner heretofore described until the upper surfaces of the bricks in this first tier will be disposed in substantially the same horizontal plane as the upper surface of the separator table 251 or lower. This completes one form of cycle in the operation of the various elements of the present invention and since the cam wheel 583 is provided with two of these high points, the subsequent quarter revolution imparted to the accumulator wheel 576 in Figures 32, 33 and 34–B will cause the second tier of bricks to be deposited on the first tier of bricks with each row of four bricks in the second tier being disposed in parallel relation to each row of four bricks in the first tier.

Now, by referring to Figures 32, 33 and 34–B, it is seen that the cam 583 will fail to engage the plunger of the switch 581 during the next two succeeding return strokes of the grab carriage 390. However, the two spaced high points on the cam 584 will engage and depress the plunger 582 with said next two succeeding steps in rotation being imparted on the accumulator wheel 576. This will cause the cross-hacker, comprising the cylinder 451 (Figures 21 and 34–B), the links or levers 415, the knuckle member 421 and the arms 427 and 427' extending from the knuckle member 421, to operate in the manner to be presently described.

Thus, in this particular instance, upon every third and fourth stroke, the plunger of the switch 582 in the lower right-hand portion of Figure 34–B will be engaged and depressed by successive high points on the cam 584 (Figures 32 and 34–B). As each of the high points on the cam 584 successively engages the plunger of the switch 582, with successive return strokes of the grab carriage 390, the corresponding high points of the cam 584 only engage this plunger of the switch 582 momentarily and then move beyond the same.

Thus, upon every third and fourth return stroke of the grab carriage 390, the switch 582 in the lower right-hand portion of Figure 34–B is actuated and, upon alternate actuations thereof, will thus energize the coil 793 in the relay 902 in the upper left-hand portion of Figure 34–B since current will flow from the lead wire 786 through the wires 585, 499 and 588, through the switch 582 and through the wire 587 to one end of the coil 793 in the relay 902. Current continues through this coil 793 through the wires 922 and 923 to the lead wire 812 to complete the circuit to this coil 793 in the relay 902.

Assuming the switch 562 to have been previously positioned to complete a circuit to the coil 793 in relay 901 this causes the coil 834 in the right-hand portion of the valve 905, in Figure 34–B, to be energized to move the core 817 to the position shown in Figure 34–B. The circuit is completed to this coil 834 in the valve 905 since it will flow from the lead wire 786 in the upper left-hand portion of Figure 34–B through the wires 483 and 910, through the relay 901, through the wire 911, through the relay 902, through wires 931 and 925 to the coil 834 in the valve 905. Current continues through this coil 834, through the wire 917 to the lead wire 812 to complete the circuit to this coil 834 in the valve 905.

It is thus seen that compressed air is then permitted to flow from the pipe 825 through the pipes 932 and 932b through the passageway 821 in the valve 905, through the pipe 450 to the left-hand end of the cylinder 451 in Figures 3 and 34–B. This will cause the knuckle member 421 to move from the position shown in Figures 3, 20 and 34–B to the position shown in Figure 21 and will thus rotate each of the brick grasping units 391 and 391' a quarter revolution and which will cause vanes 520 and 521 on the brick grasping unit 391 to be disposed in parallel alinement with the grasping vanes 520' and 521' on the grasping unit 391'.

Thus, the bricks will extend in transverse relation to the slats 341 on the separator table 251 but, at this time, the bricks will be positioned above the tier-carrying car 600 on the elevator 601 and it is thus seen that the third and fourth tiers of bricks will extend in transverse relation to the first and second tiers of bricks deposited on the tier-carrying car 600.

Now, as the knuckle member 421 moves rearwardly or from the position shown in Figure 20 to the position shown in Figure 21, it engages and depresses the plunger of the switch 487 (Figure 34–B) and this will cause current to flow from the lead wire 786 through the wires 585 and 499, through the switch 487, through the wires 488 and 586 to the coil 834 in the solenoid valve 907. This will cause core 817 of the valve 907 to assume the position shown in Figure 34–B and will thereby cause the compressed air to enter the top of the cylinder 545 through the pipe 542 to thus release the tier of bricks carried by the brick grasping units 391 and 391' to be deposited on the previously laid tiers on the tier-carrying car 600 disposed on the elevator 601.

Immediate after the knuckle member 421 engages and depresses the plunger of the switch 487 (Figure 34–B), one of the bricks carried by the brick grasping units 391 and 391' engages and depresses the plunger on the switch 562 as shown in Figure 34–C. Since this switch 562 was previously in a closed position, this will open the switch 562 and will thus deenergize the coil 793 in the relay 901. Current will then be directed through the coil 815 in the valve 905 instead of the coil 834 in this valve 905 and it will, of course, cause compressed air to enter the right-hand end of the cylinder 451 in Figure 34–B to return the knuckle member 421 to the position shown. This will also rotate the brick grasping units 391 and 391' about their respective axes so they are again properly alined for moving into position between another tier of bricks positioned on the separator table 251.

It has already been described how the elevator 601 is lowered the equivalent of the height of each tier of bricks deposited thereon so that the next succeeding tier of bricks may be deposited onto the previously positioned tier of bricks without the necessity of elevating the tiers of bricks as they are removed from the separator table 251. It is evident that the tiers of bricks, the rows of which extend parallel to the side rails of the tier-carrying car 600, move downwardly below the vanes 520 and 521 to permit them to rotate above the bricks. This completes the description of the manner of operation of the cross-hacker.

Since the cumulative elevator counter-balancing unit 687 is designed to accommodate the positioning of eight tiers of bricks on the particular tier-carrying car 600 which may be disposed on the elevator 601, it is thus seen that eight tiers of bricks may be successively positioned on each tier-carrying car 600 and wherein the first two tiers of bricks would extend in eighteen rows of four bricks to each row which extend transversely of the slats 620 on the tier-carrying car 600 (Figures 3 and 31) and the next two succeeding tiers of bricks would extend in parallel relation immediately above the slats 620 of the tier-carrying car 600 but in transverse relation to the previously two positioned rows of tiers of bricks. The fifth and sixth tiers of bricks would be positioned in parallel relation to the first and second tiers of bricks and the seventh and eighth tiers of bricks would be positioned in parallel relation and alinement above the third and fourth tiers of bricks, all of the rows of bricks being spaced apart from each other so as to expose all of the sides of the bricks other than opposed ends of those bricks which are still disposed in juxtaposed relation to each other so as to dry the bricks uniformly throughout.

As heretofore stated, upon the eighth tier of bricks being deposited on the car 600 on the elevator 601, the elevator moves to its lowermost position and engages and depresses the plunger of the switch 960 (Figure 35). This would cause current to flow from the lead wire 962 in Figure 35, through the switch 960, through the wire 961, through the solenoid coil 815 in the left-hand end of the solenoid valve 965 in Figure 35, through the lead wire 963 to complete the circuit to the coil 815 in the right-hand end of the solenoid valve 965. Compressed air would then flow from the pipe 825 through the pipe 971, through the branch pipe 971a, through the valve 965, through the pipe 752a in the left-hand end of the cylinder 752 in Figures 27 and 35. Thus, the piston 753 and its piston rod 751 would move from left to right and the particular car 600 which may be disposed above the motive car 602 at this time will be moved off of the elevator onto the egress tracks 630. The car disposed in advance of the particular car which had just been loaded with bricks is moved along by this car as it is moved off of the elevator 601.

As the motive car 602 (Figure 27) reaches the end of its stroke from right to left in Figure 27, the outwardly extending portions of the axle 723 thereon engage and move the latch members 640 from right to left in Figures 27 and 27–A and thus release the platforms 635 and 636 from these latches 640. The elevator 601 is then caused to move upwardly by virtue of the cumulator counter-balancing mechanism 687 and as the platforms 635 and 636 move upwardly, the walls of the notches 637 therein straddle the outwardly extending portions of the axle 723 of the motive car 602.

Now, as the elevator 601 moves upwardly, it is evident that the plunger of the switch 960 is no longer depressed and, therefore, current will flow through the lead wire 962, through the wire 967, through the switch 960, through the wire 966, through the coil 834 in the valve 965, through the wire 970 and the lead wire 963 to complete the circuit to the coil 834. Thus, compressed air would flow from the pipe 825 through the pipe 971 and branch pipe 971b, through the valve 965 and through the pipe 752b to the right-hand end of the cylinder 752 in Figures 27 and 35 to cause the piston 753 and the piston rod 751 to move in the opposite direction to return the motive car 602 to the position shown in Figure 27 to thus complete a cycle in the operation of the machine.

It is evident that the switches which control the operation of the relays 845, 846, 872, 873 and 901 to 904, inclusive, will cause the respective relays to alternate in their operation with alternate operations of the machine per se in a manner similar to that described for the relays 790 and 791 in Figure 34. This is the primary purpose of providing the push button snap type of switches for controlling operation of the various relays. It will be noted that the push button spring type of switches are not connected to any of the relays but are connected directly to the valves they are adapted to control.

Although, the cams 583 and 584 in Figures 32, 33 and 34–B are so formed as to cause alternate pairs of tiers of bricks to be positioned transversely of the pairs of tiers of bricks therebetween, it is understood that the accumulator wheel 576 may be provided with a greater or lesser number of teeth 575 thereon and the cams 583 and 584 may be provided with a greater or lesser number of high points thereon to thereby vary the number of tiers of bricks which are disposed in parallel relation to each other between the number of tiers of bricks that are disposed in transverse relation to the tiers of bricks therebetween.

This is also true of the accumulator wheel 255 in that the accumulator wheel 255 may be adapted to cause a greater or lesser number of rows of bricks to be transferred from the carrier fork assembly 119 to the accumulator table 210, heretofore described. Also, it is obvious that the capacity of the accumulator table 210, the separator table 251 and each of the tier-carrying cars 600 may be varied without departing from the spirit of the invention.

As a matter of fact, the number of tiers of bricks which the machine is adapted to accommodate in placing these tiers on the cars may also be varied by merely varying the number of weight members 693 (Figures 3 and 5) and by varying the distance between the elevator and the height through which it may be moved as well as the height of the various other mechanisms such as the accumulator table and the separator table 251. In other words, the number of bricks in each row and the number of bricks which are heretofore described is merely used by way of example and is not to be construed as a limitation in this invention.

The separator table 251 as heretofore described has included a plurality of slats on each of which a row of bricks or similar articles is adapted to be disposed and then the slats are moved equi-distant apart from each other to space each row of bricks apart from the next adjacent row. Now, it is to be understood that more than one row of bricks or similar articles may be positioned on each of the slats 341, the width of these slats being varied accordingly, in order that, when the slats are moved apart from each other, they will move two or more rows of bricks apart from the next adjacent two or more rows of bricks while the bricks on each slat will remain in juxtaposed relation to each other. Of course, it would then be necessary to vary the distance between the adjacent pairs of flexible vanes 520 and 521 (Figure 25) on the grasping unit 391 in order that more than one row of bricks would be straddled by each pair of flexible vanes 520 and 521 as the corresponding grasping unit 391 is positioned thereabove. Since the latter are obvious expedients, an illustration and detailed description thereof is deemed unnecessary.

It is thus seen that I have provided a brick handling machine wherein the moving elements thereof are cooperatively arranged so as to react in series and including means for placing spaced rows of bricks in transverse tiers on tier-carrying cars which are automatically introduced to the machine and which cars are automatically discharged from the machine following the placing of the desired number of tiers thereon automatically.

In the drawings and specification there has been set forth a preferred embodiment of the invention, and although specific terms are employed, they are used in a generic and descriptive sense only and not for purposes of limitation, the scope of the invention being defined in the claims.

We claim:

1. In an apparatus for handling cubically-shaped articles, such as bricks and the like, and for depositing the articles upon a movable car; the combination of a table onto which the articles are adapted to be placed in side-by-side relation to form a row of articles, a transfer mechanism spaced adjacent the table and to one side of the longitudinal axis of the table, means operable automatically upon a predetermined number of articles being placed on said table for elevating said articles and positioning them in alinement with said transfer mechanism, an accumulator table spaced from said transfer mechanism, means operable automatically for actuating the transfer mechanism upon the articles being positioned in alinement therewith for transferring the row of articles onto the accumulator table, a separator table positioned adjacent said accumulator table, means operable automatically upon a predetermined number of rows of articles being transferred to the accumulator table by said transfer mechanism for transferring the rows of articles from the accumulator table to the separator table, means operable automatically upon said articles being positioned on the separator table for separating the side-by-side articles apart from each other, and means operable automatically upon said articles being separated for transferring said articles from said separator table to the movable car to form a tier of articles on said car.

2. Apparatus for handling articles, such as bricks, tile and the like, and for depositing said articles upon a tier-carrying car; said apparatus comprising a first table onto which the articles are adapted to be placed in juxtaposed side-by-side relation, an accumulator table disposed adjacent the first table, means operable automatically upon a predetermined number of said articles being placed on said first table for transferring the row of articles thus formed onto the accumulator table, a separator table disposed adjacent the accumulator table, means operable automatically upon at least one row of articles being positioned on the accumulator table for transferring said articles to said separator table, means operable automatically upon said row of articles being transferred to the accumulator table for separating the articles in each row apart from each other, vertically movable means to support said tier-carrying car at a predetermined level adjacent the separator table, means operable automatically upon said articles in each row being separated apart from each other for transferring said articles onto the tier-carrying car to form tiers thereon, and means operable automatically upon each tier of articles being deposited on the vertically movable means for lowering the tier-carrying car a predetermined distance in accordance with the height of each tier of articles deposited on said car.

3. Apparatus for handling articles, such as bricks, tile and the like, and for depositing said articles upon a tier-carrying car; said apparatus comprising a first table onto which the articles are adapted to be placed in juxtaposed side-by-side relation, an accumulator table disposed adjacent the first table, means operable automatically upon a predetermined number of said articles being placed on said first table for transferring the row of articles thus formed onto the accumulator table, a separator table disposed adjacent the accumulator table, means operable automatically upon at least one row of articles being positioned on the accumulator table for transferring said articles to said separator table, means operable automatically upon said row of articles being transferred to the separator table for separating the articles in each row apart from each other, vertically movable means to support said tier-carrying car at a predetermined level adjacent the separator table, means operable automatically upon said articles in each row being separated apart from each other for transferring said articles onto the tier-carrying car to form tiers thereon, means operable automatically upon each tier of articles being deposited on the tier-carrying car for lowering the vertically movable means a predetermined distance in accordance with the height of each tier of articles deposited on said car, and means operable automatically upon certain tiers of articles being deposited on said tier-carrying car to rotate certain spaced tiers of the articles in advance of their being deposited upon the tier-carrying car to thereby cause the certain spaced tiers to extend transversely of the other tiers deposited on said tier-carrying car.

4. Apparatus for handling and stacking a plurality of articles, such as bricks, tile and the like, comprising first supporting means for said articles, means for feeding a plurality of articles to said first supporting means in juxtaposed side-by-side relation to form a row of said articles, separator means for said articles, means operable automatically upon a predetermined number of said articles being fed to said first supporting means for transferring said articles to the separator means, means operable automatically upon said row of articles being transferred to the separator means for actuating the separator means, said separator means having means for spacing the bricks in each row apart from each other, tier-carrying means disposed adjacent the separator means, means operable automatically upon said articles being spaced apart from each other by the separator means for transferring the row of articles therefrom onto said tier-carrying means to form tiers of articles on the tier-carrying means, and means operable automatically upon each tier of articles being transferred to the tier-carrying means for changing the position of the tier-carrying means for reception of subsequent tiers of articles to be transferred to the upper surfaces of the articles previously transferred to the tier-carrying means.

5. Apparatus for handling cubically-shaped articles, such as bricks, tile and the like, comprising a first supporting means for the articles, means for feeding the articles to the first supporting means in juxtaposed side-by-side relation to form a row of articles thereon, a carrier mechanism and a transfer mechanism and a second supporting means and a separator means and an elevator means arranged in series subsequent to the first supporting means, means operable automatically upon a predetermined number of articles being fed to the first supporting means for imparting movement to the carrier mechanism, means on said carrier mechanism for lifting the row of articles off of the first supporting means and moving the same into alinement with the transfer mechanism, means operable automatically upon said articles being alined with the transfer mechanism for actuating the transfer mechanism to transfer the articles onto the second supporting means for the articles, means operable automatically for transferring the rows of articles from the second supporting means to the separator means upon a predetermined number of rows of articles being transferred to the second supporting means, means operable automatically for effecting operation of said separator means upon said rows of articles being transferred thereto from the second supporting means to cause the separator means to move the articles in each row apart from each other and means operable automatically upon said articles being moved apart from each other for transferring said articles from said separator means to the elevator means.

6. Apparatus for handling cubically-shaped articles, such as bricks, tile and the like, comprising a first supporting means for the articles, means for feeding the articles to the first supporting means in juxtaposed side-by-side relation to form a row of articles thereon, a carrier mechanism and a transfer mechanism and a second supporting means and a separator means and an elevator means arranged in series subsequent to the first supporting means, means operable automatically upon a predetermined number of articles being fed to the first supporting means for imparting movement to the carrier mechanism, means on said carrier mechanism for lifting the row of articles off of the first supporting means and moving the same into alinement with the transfer mechanism, means operable automatically upon said articles being alined with the transfer mechanism for actuating the transfer mechanism to transfer the articles onto the second supporting means for the articles, means operable automatically for transferring the rows of articles from the second supporting means to the separator means upon a predetermined number of rows of articles being transferred to the second supporting means, means operable automatically for effecting operation of said separator means upon said rows of articles being transferred thereto from the second supporting means to cause the separator means to move the articles in each row apart from each other, means operable automatically upon said articles being moved apart from each other for transferring said articles from said separator means to the elevator means, and means operable automatically upon each tier of articles being transferred to said elevator means for lowering said elevator a predetermined distance so the subsequent tier of articles transferred to the elevator means are moved into position atop the previously transferred tier of articles on the elevator.

7. Apparatus for handling articles, such as bricks, tile and the like, comprising a table having a plurality of longitudinally extending slots therein, means for continuously feeding the articles in the form of a row of articles onto the table, a carrier fork mechanism having arms thereon normally positioned in said slots in the table, a transfer mechanism disposed adjacent the carrier fork mechanism, means operable automatically upon a predetermined number of articles being fed to said table for actuating said carrier fork mechanism, means on the carrier fork mechanism for elevating said arms thereon to lift the row of articles off of the table and for moving said carrier fork mechanism into alinement with the transfer mechanism, an accumulator table disposed at one side of the carrier fork mechanism when the carrier fork mechanism is actuated, means operable automatically subsequent to said carrier fork mechanism being actuated to cause said transfer mechanism to move transversely of the arms on said carrier fork mechanism for transferring the row of articles therefrom onto the accumulator table, means operable automatically upon said transfer operation being completed for returning the transfer mechanism to its original position and means operable automatically upon said transfer mechanism being returned to its original position for returning the carrier fork mechanism to its original position with the arms thereon disposed in the slots in said table for repeating their operation.

8. Apparatus for handling articles, such as bricks, tile and the like, and for depositing said articles on a supporting means; said apparatus comprising a table having a plurality of longitudinally extending slots therein, means for continuously feeding the articles in the form of a row of articles onto the table, a carrier fork mechanism having arms thereon normally positioned in said slots in the table, a transfer mechanism disposed adjacent the carrier fork mechanism, means operable automatically upon a predetermined number of articles being fed to said table for actuating said carrier fork mechanism, means on the carrier fork mechanism for elevating said arms thereon to lift the row of articles off of the table and for moving said carrier fork mechanism into alinement with the transfer mechanism, an accumulator table disposed at one side of the carrier fork mechanism when the carrier fork mechanism is actuated, means operable automatically subsequent to said carrier fork mechanism being actuated to cause said transfer mechanism to move transversely of the arms on said carrier fork mechanism for transferring the row of articles therefrom onto the accumulator table, means operable automatically upon said transfer operation being completed for returning the transfer mechanism to its original position, means operable automatically upon said transfer mechanism being returned to its original position for returning the carrier fork mechanism to its original position with the arms thereon disposed in the slots in said table for repeating their operation, a separator mechanism disposed adjacent the accumulator table, means operable automatically upon a predetermined number of rows of articles being transferred to the accumulator table for simultaneously transferring all of the rows of articles from the accumulator table to the separator mechanism, means operable automatically upon said rows of articles being transferred to the separator mechanism for moving said articles in each row apart from each other, said supporting means being adapted to be disposed adjacent said separator mechanism and means operable automatically upon said articles in each row being spaced from each other for transferring said articles onto the supporting means.

9. In a structure according to claim 8, means resiliently supporting said last-named supporting means whereby said rows of spaced articles upon being transferred to said supporting means will cause said supporting means to move downwardly under the weight of the articles which then form a tier of articles on the supporting means, and means limiting downward movement of the supporting means upon each tier of articles being deposited thereon to cause the upper surface of each successive tier of articles to be positioned at the level originally occupied by the upper surface of said supporting means.

10. Apparatus for handling articles, such as bricks, tile and the like, and for positioning said articles on a horizontally movable supporting means; said apparatus comprising a table having a plurality of longitudinally extending slots therein, means for continuously feeding the articles in the form of a row of articles onto the table, a carrier fork mechanism having arms thereon normally positioned in said slots in the table, a transfer mechanism disposed adjacent the carrier fork mechanism, means operable automatically upon a predetermined number of articles being fed to said table for actuating said carrier fork mechanism, means on the carrier fork mechanism for elevating said arms thereon to lift the row of articles off of the table and for moving said carrier fork mechanism into alinement with the transfer mechanism, an accumulator table disposed at one side of the carrier fork mechanism when the carrier fork mechanism is actuated, means operable automatically subsequent to said carrier fork mechanism being actuated to cause said transfer mechanism to move transversely of the arms on said carrier fork mechanism for transferring the row of articles therefrom onto the accumulator table, means operable automatically upon said transfer operation being completed for returning the transfer mechanism to its original position, means operable automatically upon said transfer mechanism being returned to its original position for returning the carrier fork mechanism to its original position with the arms thereon disposed in the slots in said table for repeating their operation, a separator mechanism disposed adjacent the accumulator table, means operable automatically upon a predetermined number of rows of articles being transferred to the accumulator table for simultaneously transferring all of the rows of articles from the accumulator table to the separator mechanism, means operable automatically upon said rows of articles being transferred to the separator mechanism for moving said articles in each row apart from each other, whereby said horizontally movable supporting means may be positioned adjacent said separator mechanism, and means operable automatically upon said articles in each row being spaced from each other for transferring said articles onto the horizontally movable supporting means.

11. In a structure according to claim 10, vertically movable means resiliently supporting said last-named horizontally movable supporting means whereby said rows of spaced articles upon being transferred to said horizontally movable supporting means will cause said horizontally movable supporting means to move downwardly under the weight of the articles which then form a tier on that horizontally movable supporting means, and means limiting downward movement of the vertically movable means upon each tier of articles being deposited thereon to cause the upper surface of each successive tier of articles to be positioned at the level previously occupied by the upper surface of the said horizontally movable supporting means.

12. In a structure according to claim 11, a series of said horizontally movable supporting means adapted to be disposed in end-to-end relation and means operable automatically upon a predetermined number of tiers of articles being deposited upon said horizontally movable supporting means for moving said horizontally movable supporting means having the tiers of articles thereon off of said vertically movable means and replacing said horizontally movable supporting means with another horizontally movable supporting means.

13. In a structure according to claim 12, said vertically movable means comprising a resiliently supported elevator disposed adjacent said separator table and on which said horizontally movable means may be successively positioned one at a time, latch means engageable by said elevator upon a predetermined number of tiers of said articles being deposited on the corresponding horizontally movable means on the elevator for holding said elevator in a predetermined lowered position, and means operable automatically upon said elevator being lowered to said lowered position for moving said horizontally movable means off of the elevator and replacing the latter horizontally movable means with a succeeding horizontally movable means and for simultaneously releasing the elevator from said latch means to thereby permit the elevator with said succeeding horizontally movable means thereon to move upwardly to where the upper surface of said succeeding horizontally movable means will be disposed at substantially the same level as that of the separator mechanism.

14. In an apparatus for handling articles such as bricks, tile and the like, and for positioning articles upon a platform and said apparatus having means for continuously feeding the articles in juxtaposed side-by-side relation into the apparatus to form a row of articles in the apparatus; the combination of supporting means for supporting the articles as they are fed to the apparatus, a separator mechanism, means operable automatically upon a predetermined number of articles being positioned on the supporting means for transferring said row of articles to the separator mechanism, means on the separator mechanism for spacing said articles from each other, said platform being adapted to be positioned adjacent the separator mechanism, means operable automatically upon operation of the separator mechanism in spacing said articles for transferring said articles onto the platform, said means for transferring the rows of articles from the separator mechanism to the platform comprising a grab carriage adapted to be moved to and fro between the separator mechanism and said platform, a plurality of grasping vanes depending from the grab carriage, there being a pair of these grasping vanes for each row of articles formed as the articles in each row are spaced from each other, each of said grasping vanes being so positioned as to move into and occupy a position astride the corresponding row of articles disposed on the separator mechanism upon said grab carriage being moved from a position above said platform to a position above the separator mechanism, means operable automatically for moving said grab carriage from a position above the platform to a position above the separator mechanism upon said separator mechanism being operative for spacing the articles in each row from each other, means operable automatically upon the corresponding pairs of vanes being positioned astride the longitudinally extending rows of articles for moving the grasping vanes of each pair towards each other for grasping opposed sides of the corresponding articles, and means operable automatically upon said grasping vanes being moved into operating position and grasping opposed sides of said articles for moving the grab carriage from its position above the separator mechanism to a position above said platform.

15. In a structure according to claim 14, means operable automatically upon said grab carriage being moved to a position above said platform for moving the corresponding pairs of vanes apart from each other to thereby release the articles therefrom and to deposit said articles upon said platform.

16. In a structure according to claim 15, means operable automatically as predetermined spaced tiers are transferred from the separator mechanism to said platform for rotating said grasping vanes substantially a quarter revolution about a vertical axis to cause the articles, upon being released from the grasping vanes onto said platform, to occupy a position transversely of the tiers of articles previously deposited on said platform.

17. Apparatus for handling cubically-shaped articles, such as bricks, tile and the like, comprising a first supporting means for the articles, means for feeding the articles to the first supporting means in juxtaposed side-by-side relation to form a row of articles thereon, a carrier mechanism and a transfer mechanism and a second supporting means and a separator means and an elevator means arranged in series subsequent to the first supporting means, means operable automatically upon a predetermined number of articles being fed to the first supporting means for imparting movement to the carrier mechanism, means on said carrier mechanism for lifting the row of articles off of the first supporting means and moving the same into alinement with the transfer mechanism, means operable automatically upon said articles being alined with the transfer mechanism for actuating the transfer mechanism to transfer the articles onto the second supporting means for the articles, means operable automatically for transferring the rows of articles from the second supporting means to the separator means upon a predetermined number of rows of articles being transferred to the second supporting means, means operable automatically for effecting operation of said separator means upon said rows of articles being transferred thereto from the second supporting means to cause the separator means to move the articles in each row apart from each other, means operable automatically upon said article being moved apart from each other for transferring said articles from said separator means to the elevator means, and cutting means adjacent the second supporting means astride which the juxtaposed articles in each row move as they are transferred from the carrier mechanism to the second supporting means to prevent the juxtaposed articles from adhering to each other.

18. Apparatus for handling articles, such as bricks and the like, comprising a first supporting means for the articles, means for continuously feeding a row of said articles to the first supporting means, a second supporting means, a first transfer means responsive to a predetermined number of articles being directed to said first supporting means for transferring said articles to the second supporting means, a separator means disposed adjacent the second supporting means, said second supporting means and said separator means being disposed in substantially the same horizontal plane, a second transfer means responsive to said first transfer means upon transferring a predetermined number of rows of articles from the first supporting means to the second supporting means for simultaneously moving the rows of articles on the second supporting means onto the separator means, said separator means having a plurality of closely spaced relatively movable members thereon, each of said relatively movable members supporting one of the articles from each row as the articles are moved onto the separator means, means responsive to the second transfer means upon moving the rows of articles from the second supporting means to the separator means for moving said closely spaced members a predetermined distance apart from each other thereby spacing the articles in each row apart from each other, and means responsive to movement of the members on the separator means apart from each other for moving the spaced articles off of the separator means while maintaining said articles in parallel spaced relationship.

19. In a structure according to claim 18, said second transfer means for moving the rows of articles from the second supporting means to the separator means comprising a frame for said apparatus, a rake mechanism having vertically movable downwardly extending rake members thereon, means on the frame supporting the rake mechanism for horizontal movement thereon, means responsive to predetermined cycles in movement by the first transfer means for moving said rake members downwardly adjacent the last row of articles transferred to the second article supporting means and for then moving the rake mechanism so as to move the rows of articles from the second article supporting means to the separator means, and means responsive to said rake mechanism being moved to a position above the separator means for elevating the rake members on the rake mechanism and then returning the rake mechanism to its original position.

20. Apparatus for handling articles, such as bricks and the like, comprising an elongated first supporting means for the articles, means for continuously feeding a row of said articles to the first supporting means, said first supporting means having a plurality of longitudinally extending slots therein which are adapted to be bridged by said articles as they are fed to the first supporting means, a second supporting means, a first transfer means responsive to a predetermined number of articles being directed to said first supporting means for transferring said articles to the second supporting means, said first transfer means comprising a carrier fork mechanism having horizontally disposed arms thereon, said arms normally being disposed in said slots in the first article supporting means and below the level of the upper surface of the first article supporting means, means responsive to a predetermined number of said articles being directed to the first article supporting means for successively elevating and then horizontally moving said arms on the carrier fork mechanism to thus elevate said articles from the first supporting means and to withdraw said articles from the first supporting means, a transfer bar disposed to one side of the path of travel of the arms on the carrier fork mechanism when said arms are in a withdrawn position, said transfer bar being disposed in a slightly higher horizontal plane than that of the upper surfaces of said arms on the carrier fork mechanism, means responsive to movement of said arms on the carrier fork mechanism to withdrawn position for moving said transfer bar across the upper surfaces of said arms on the carrier fork mechanism and said second supporting means being disposed in substantially the same horizontal plane as that of the upper surfaces of said arms on the carrier fork mechanism whereby said articles will be transferred from the arms to the second supporting means.

21. Apparatus for handling cubically-shaped articles, such as bricks and the like, and for depositing said articles on a movable car; said apparatus comprising a table onto which the articles are adapted to be placed in side-by-side relation to form a row of articles, a transfer mechanism spaced from one end, and to one side of, the longitudinal axis of the table, means operable automatically upon a predetermined number of articles being placed on said table for elevating said articles and positioning them in alinement with said transfer mechanism, an accumulator table spaced from said transfer mechanism, means operable automatically for actuating the transfer mechanism upon the articles being positioned in alinement therewith for transferring the row of articles onto the accumulator table, a separator table positioned adjacent said accumulator table, means operable automatically upon a predetermined number of rows of articles being transferred to the accumulator table by said transfer mechanism for transferring the rows of articles from the accumulator table to the separator table, means operable automatically upon said articles being positioned on the separator table for separating the side-by-side articles apart from each other, means for maintaining said movable car adjacent said separator table, means operable automatically upon said articles being separated for transferring said article from said separator table onto the movable car to form a tier of articles on said car, and means responsive to a predetermined number of tiers being deposited on said car for automatically replacing the loaded car with an empty car.

22. Apparatus for forming tiers of articles, such as bricks, tile and the like, on each of a plurality of tier-carrying cars; said apparatus comprising a first table onto which the articles are adapted to be placed in juxtaposed side-by-side relation, an accumulator table disposed adjacent the first table, means operable automatically upon a predetermined number of said articles being placed on said first table for transferring the rows of articles thus formed onto the accumulator table, a separator table disposed adjacent the accumulator table, means operable automatically upon at least one row of articles being positioned on the accumulator table for transferring said articles to said separator table, means operable automatically upon said row of articles being transferred to the accumulator table for separating the articles in each row apart from each other, means for positioning each successive tier-carrying car adjacent the separator table, means operable automatically upon said articles in each row being separated apart from each other for transferring said articles onto the corresponding tier-carrying car to form tiers thereon, means operable automatically upon each tier of articles being deposited on the tier-carrying car for lowering said positioning means a predetermined distance in accordance with the height of each tier of articles deposited on the corresponding car, and means responsive to a predetermined number of tiers being deposited on each successive tier-carrying car for automatically replacing a loaded tier-carrying car with an empty car.

23. Apparatus for forming tiers of articles, such as bricks, tile and the like, on each of a plurality of successive tier-carrying cars; said apparatus comprising a first table onto which the articles are adapted to be placed in juxtaposed side-by-side relation, an accumulator table disposed adjacent the first table, means operable automatically upon a predetermined number of said articles being placed on said first table for transferring the row of articles thus formed onto the accumulator table, a separator table disposed adjacent the accumulator table, means operable automatically upon at least one row of articles being positioned on the accumulator table for transferring said articles to said separator table, means operable automatically upon said row of articles being transferred to the separator table for separating the articles in each row apart from each other, means for positioning each successive tier-carrying car at a predetermined level adjacent the separator table, means operable automatically upon said articles in each row being separated apart from each other for transferring said articles onto the corresponding tier-carrying car to form tiers thereon, means operable automatically upon each tier of articles being deposited on the positioning means for lowering the tier-carrying car a predetermined distance in accordance with the height of each tier of articles deposited on the corresponding car, means operable automatically upon certain tiers of articles being deposited on said tier-carrying car for causing the means which transfers the articles from the separator table to the tier-carrying car to rotate certain spaced tiers of the articles in advance of their being deposited upon the tier-carrying car to thereby cause the certain spaced tiers to extend transversely of the other tiers deposited on said tier-carrying car, and means responsive to a predetermined number of tiers being deposited on each successive tier-carrying car for automatically replacing a loaded tier-carrying car with an empty car.

24. Apparatus for handling a plurality of articles such as bricks, tile and the like comprising a separator mechanism, means for positioning a plurality of articles on the separator mechanism in juxtaposed relation to each other wherein the articles are arranged in rows and in each row of which the articles are disposed in side-by-side relation and said rows being disposed in juxtaposed relation to each other, means operable automatically upon said articles being positioned on the separator mechanism for operating the separator mechanism to cause the articles in each row to be spaced apart from each other, means operable automatically upon said articles being spaced from each other for moving said articles off of the separator mechanism while maintaining said articles in parallel spaced relationship, said separator mechanism comprising a plurality of elongated members disposed in side-by-side relation to each other, said elongated members being spaced the equivalent of the width of each of the articles in each of said rows, means supporting said elongated members for movement transversely of their axes, and means operable automatically upon said rows of articles being positioned on said elongated members for moving said elongated members apart from each other for separating the articles in each row accordingly.

25. Apparatus for handling articles, such as bricks, tile and the like, comprising a table having a plurality of longitudinally extending slots therein, means for continuously feeding the articles in the form of a row of articles onto the table, a carrier fork mechanism having arms thereon normally positioned in said slots on the table, a transfer mechanism disposed adjacent the carrier fork mechanism, means operable automatically upon a predetermined number of articles being fed to said table for actuating said carrier fork mechanism, means on the carrier fork mechanism for elevating said arms thereon to lift the row of articles off of the table and for moving said carrier fork mechanism into alinement with the transfer mechanism, an accumulator table disposed on one side of the carrier fork mechanism when the carrier fork mechanism is actuated, means operable automatically subsequent to said carrier fork mechanism being actuated to cause said transfer mechanism to move transversely of the arms on said carrier fork mechanism for transferring the row of articles therefrom onto the accumulator table, means operable automatically upon said transfer operation being completed for returning the transfer mechanism to its original position, means operable automatically upon said transfer mechanism being returned to its original position for returning the carrier fork mechanism to its original position with the arms thereon disposed in the slots in said table for repeating their operation, and means preventing said carrier fork mechanism from moving to where its arms are disposed in the slots in said table during the time that the transfer mechanism is transferring the articles from the carrier fork mechanism to the accumulator table.

26. Apparatus for stacking articles, such as bricks, tile and the like, on successive tier-carrying cars comprising means for continuously feeding the articles to the apparatus in the form of a row of articles, means interposed between the means for continuously feeding the articles and the tier-carrying cars for accumulating a predetermined number of rows of said articles in juxtaposed relation to each other, means for intermittently moving the cars to successively position the cars, one at a time, at a predetermined point, means controlling the number of articles in each row admitted to the accumulator means, means for moving the articles in each row apart from each other subsequent to the articles being accumulated, means for transferring the spaced articles onto the car positioned at said predetermined point to form tiers of articles on said last-named car and means responsive to a predetermined number of tiers being deposited on said last-named car for controlling the means for intermittently moving the tier-carrying cars to thereby replace the loaded car with an empty car.

27. Apparatus for handling articles, such as bricks, tile and the like comprising a first supporting means having a plurality of longitudinally extending slots therein, means for continuously feeding the articles in the form of a row of articles in juxtaposed relation to each other onto the first supporting means, a carrier fork mechanism having arms thereon normally positioned in said slots in the first supporting means, a transfer mechanism spaced from the first supporting means and to one side of the path of travel of the carrier fork mechanism, means on the carrier fork mechanism responsive to a predetermined number of articles being received thereby for elevating said arms on the carrier fork mechanism to thereby lift said row of articles off of the first supporting means and for moving said carrier fork mechanism into alinement with the transfer mechanism, means on the transfer mechanism responsive to movement of the carrier fork mechanism to a position in alinement with the transfer mechanism for moving said row of articles off of the arms on the carrier fork mechanism, a second supporting means disposed on the opposed side of the carrier fork mechanism from which the transfer mechanism is disposed and onto which said articles are moved by the transfer mechanism, means operable automatically upon said articles being transferred from the carrier fork mechanism to said second supporting means for returning the transfer mechanism to its original position and means responsive to said transfer mechanism returning to its original position for causing the carrier fork mechanism to assume its original position with the arms thereon disposed in the slots in said first supporting means.

28. Apparatus for handling articles, such as bricks, tile and the like comprising a first supporting means having a plurality of longitudinally extending slots therein, means for continuously feeding the articles in the form of a row of articles in juxtaposed relation to each other onto the first supporting means, a carrier fork mechanism having arms thereon normally positioned in said slots in the first supporting means, a transfer mechanism spaced from the first supporting means and to one side of the path of travel of the carrier fork mechanism, means on the carrier fork mechanism engageable by at least one of said articles received by said first supporting means for elevating said arms on the carrier fork mechanism to thereby lift said row of articles off of the first supporting means and for moving said carrier fork mechanism into alinement with the transfer mechanism, means on the transfer mechanism responsive to movement of the carrier fork mechanism to a position in alinement with the transfer mechanism for moving said row of articles off of the arms on the carrier fork mechanism, a second supporting means disposed on the opposed side of the carrier fork mechanism from which the transfer mechanism is disposed and onto which said articles are moved by the transfer mechanism, means operable automatically upon said articles being transferred from the carrier fork mechanism to said second supporting means for returning the transfer mechanism to its original position and means responsive to said transfer mechanism returning to its original position for causing the carrier fork mechanism to assume its original position with the arms thereon disposed in the slots in said first supporting means.

29. Apparatus for handling articles, such as bricks, tile and the like, comprising a first supporting means having a plurality of longitudinally extending slots therein, means for continuously feeding the articles in the form of a row of articles in juxtaposed relation to each other onto the first supporting means, a carrier fork mechanism having arms thereon normally positioned in said slots in the first supporting means, a transfer mechanism spaced from the first supporting means and to one side of the path of travel of the carrier fork mechanism, means on the carrier fork mechanism responsive to a predetermined number of articles received by said first supporting means for elevating said arms on the carrier fork mechanism to thereby lift said row of articles off of the table and for moving said carrier fork mechanism into alinement with the transfer mechanism, means on the transfer mechanism responsive to movement of the carrier fork mechanism for moving said row of articles off of the arms on the carrier fork mechanism, a second supporting means disposed on the opposed side of the carrier fork mechanism from which the transfer mechanism is disposed and onto which said articles are moved by the transfer mechanism, means operable automatically upon said articles being transferred from the carrier fork mechanism to said second supporting means for returning the transfer mechanism to its original position, means responsive to said transfer mechanism returning to its original position for causing the carrier fork mechanism to assume its original position with the arms thereon disposed in the slots in the said first supporting means, a separator table disposed immediately adjacent the second supporting means and having a plurality of relatively movable horizontally disposed slats thereon disposed at substantially the same level as that of the second supporting means, means responsive to a predetermined number of operative strokes of the transfer mechanism for moving the rows of articles thus accumulated on the second supporting means onto the slats on said separator table, means responsive to the means for moving the rows of articles onto the separator table reaching the end of its stroke for returning said means for moving the articles from the second supporting means to the separator table to its original position and means responsive to the means for moving the articles onto the separator table reaching the end of its active stroke for moving said slats equi-distant apart from each other to thereby separate the articles in each row, a third supporting means disposed closely adjacent and at substantially the same level as the separator table and means responsive to said slats moving a predetermined distance apart from each other for moving said articles from the separator table onto the third supporting means.

30. Apparatus for handling articles, such as bricks, tile and the like, comprising a first supporting means having a plurality of longitudinally extending slots therein, means for continuously feeding the articles in the form of a row of articles in juxtaposed relation to each other onto the first supporting means, a carrier fork mechanism having arms thereon normally positioned in said slots in the first supporting means, a transfer mechanism spaced from the first supporting means and to one side of the path of travel of the carrier fork mechanism, means on the carrier fork mechanism responsive to a predetermined number of articles received by said first supporting means for elevating said arms on the carrier fork mechanism to thereby lift said row of articles off of the table and for moving said carrier fork mechanism into alinement with the transfer mechanism, means on the transfer mechanism responsive to movement of the carrier fork mechanism for moving said row of articles off of the arms on the carrier fork mechanism, a second supporting means disposed on the opposed side of the carrier fork mechanism from which the transfer mechanism is disposed and onto which said articles are moved by the transfer mechanism, means operable automatically upon said articles being transferred from the carrier fork mechanism to said second supporting means for returning the transfer mechanism to its original position and means responsive to said transfer mechanism returning to its original position for causing the carrier fork mechanism to assume its original position with the arms thereon disposed in the slots in the said first supporting means, a separator table disposed immediately adjacent the second supporting means and having a plurality of relatively movable and closely spaced horizontally disposed slats thereon disposed at substantially the same level as that of the second supporting means, means responsive to a predetermined number of operative strokes of the transfer mechanism for moving the rows of articles thus accumulated on the second supporting means onto the slats of said separator table, means responsive to the means for moving the rows of articles onto the separator table reaching the end of its stroke for returning said means for moving the articles from the second supporting means to the separator table to its original position, means responsive to the means for moving the articles onto the separator table reaching the end of its active stroke for moving said slats equi-distant apart from each other to thereby separate the articles in each row, a third supporting means disposed closely adjacent and at substantially the same level as the separator table, means responsive to said slats moving a predetermined distance apart from each other for moving said articles from the separator table onto the third supporting means, means responsive to said means for moving the rows of spaced articles from the separator table to the third supporting means reaching the end of its active stroke for returning said slats on the separator table to their original closely spaced position for the reception of a subsequent plurality of rows of articles from the second supporting means.

31. In a structure according to claim 30, said means for moving the articles from the separator table to the third supporting means including horizontally movable means for grasping the articles on each of said slats, means operable automatically upon said horizontally movable means grasping said articles for moving the horizontally movable means to a position above said third supporting means and means responsive to the horizontally movable means moving to a position above said third supporting means for releasing said articles from the grasping means.

32. In a structure according to claim 31, means operable automatically as certain tiers of articles are being moved onto the third supporting means for rotating the horizontally movable grasping means about a vertical axis to thus position certain tiers of articles so the rows thereof extend transversely of other rows positioned on the said third supporting means.

33. Apparatus for handling cubically-shaped articles, such as bricks and the like, and depositing the articles upon a movable car comprising a table onto which the articles are adapted to be placed in side-by-side relation to form a row of articles, a transfer mechanism spaced adjacent the table and to one side of the longitudinal axis of the table, means operable automatically upon a predetermined number of articles being placed on said table for elevating said articles and positioning them in alinement with said transfer mechanism, an accumulator table spaced from said transfer mechanism, means operable automatically for actuating the transfer mechanism upon the articles being positioned in alinement therewith for transferring the row of articles onto the accumulator table, a separator table positioned adjacent said accumulator table, means operable automatically upon a predetermined number of rows of articles being transferred to the accumulator table by said transfer mechanism for transferring the rows of articles from the accumulator table to the separator table, means operable automatically upon said articles being positioned on the separator table for separating the side-by-side articles apart from each other, means to position said movable car adjacent said separator table, means operable automatically upon said articles being separated for transferring said articles from said separator table to the movable car to form a tier of articles on said car, said means for transferring said articles from the separator table to the movable car comprising a movable carriage normally disposed above the movable car and having at least one grasping unit pivotally mounted thereon on a vertical axis and depending therefrom, said grasping unit having a plurality of flexible vanes depending therefrom, said vanes being spaced from each other, means operable automatically upon said articles being separated for moving the carriage from its position above the car to a position above the separator table and wherein certain of the vanes are disposed astride the rows of articles which are formed as the means on the separator table separates the side-by-side articles, means operable automatically upon said carriage being moved to a position above the separator table for flexing each pair of vanes disposed astride a corresponding row of articles inwardly towards each other in order to cause the vanes to resiliently clamp the corresponding rows of articles therebetween, means operable automatically upon said vanes clamping said articles for moving said carriage from its position above the separator table to a position above the movable car and means operable automatically upon said carriage returning to its position above the movable car for moving the corresponding pairs of vanes apart from each other to release the corresponding rows of articles supported thereby and for depositing said articles upon the movable car to form a tier of articles thereon.

34. In a structure according to claim 33, means operable automatically as certain tiers of articles are clamped by the vanes on the grasping unit to cause the grasping unit to rotate about its axis substantially a quarter revolution to thus rotate the corresponding rows of articles therewith so the rows thereof extend transversely of other rows positioned on the movable car as the vanes are subsequently moved apart from each other to release the rows of articles supported thereby.

35. Apparatus for handling cubically-shaped articles, such as bricks and the like and stacking the articles on a platform; said apparatus comprising a table onto which the articles are continuously moved in side-by-side relation to form a row of articles, a transfer mechanism spaced from one end of the table and to one side of the longitudinal axis of the table, means operable automatically upon a predetermined number of articles being placed on said table for elevating said articles and positioning them in alinement with said transfer mechanism, an accumulator table spaced from said transfer mechanism, means operable automatically for actuating the transfer mechanism upon the articles being positioned in alinement therewith for transferring the row of articles onto the accumulator table, and whereby successive articles are positioned on the accumulator table in side-by-side relation and also in end-to-end relation, a separator table positioned adjacent said accumulator table and disposed adjacent said platform, means operable automatically upon a predetermined number of rows of articles being transferred to the accumulator table by the transfer mechanism for transferring the rows of articles from the accumulator table to the separator table, means operable automatically upon said articles being positioned on the separator table for moving at least some of the rows of end-to-end articles previously formed on the accumulator table apart from each other, and means operable automatically upon said last-named rows of articles being separated for transferring the articles as separated from said separator table to the platform to form a tier of articles thereon.

36. Apparatus for handling articles, such as bricks, tile and the like, comprising a table having a plurality of closely spaced side-by-side frame members thereon and onto which articles are fed continuously to form a row of articles on the table and wherein the articles span the frame members transversely thereof, means supporting the frame members at opposed ends thereof, a transfer mechanism disposed subsequent to and in off-set relation to the table, a carrier fork mechanism having horizontal arms thereon of substantially less vertical displacement than the vertical displacement of each of the frame members on the table, said arms being normally positioned between the frame members of the table and their upper edges being normally disposed at a lower elevation than the upper edges of the frame members, means operable automatically upon a predetermined number of articles being fed to said table for actuating said carrier fork mechanism in order to cause the upper surfaces of the arms thereon to be disposed at a higher elevation than the upper surfaces of the frame members to thus lift the row of articles off of the table, said last-named means also being operable for moving the arms on said carrier fork mechanism into substantial alinement with the transfer mechanism, an accumulator table disposed on one side of the carrier fork mechanism when the carrier fork mechanism is actuated, means responsive to said carrier fork mechanism being positioned in substantial alinement with the transfer mechanism for actuating said transfer mechanism to cause the same to move transversely of the arms on said carrier fork mechanism for transferring the row of articles thereon onto the accumulator table, means operable automatically upon said transfer operation being completed for returning the transfer mechanism to its original position and means responsive to said transfer mechanism returning to its original position for returning the carrier fork mechanism to its original position with the arms thereon disposed between the frame members of the table preparatory to a repeat operation.

37. Apparatus for handling articles, such as bricks, tile and the like, comprising a table having a plurality of closely spaced side-by-side frame members thereon and onto which articles are fed continuously to form a row of articles on the table and wherein the articles span the frame members transversely thereof, carrier fork mechanism having horizontal arms thereon of substantially greater vertical displacement than the vertical displacement of the frame members of the table, said frame members being supported at one end only and at the end thereof remote from the end adjacent which the carrier fork mechanism is disposed, said arms of the carrier fork mechanism being bridged at their free ends by a reenforcing member secured to the lower surfaces thereof, said arms being normally positioned between the frame members on the table and their upper edges being normally disposed at a lower elevation than the upper edges of the frame members, a transfer mechanism disposed adjacent the carrier fork mechanism, means operable automatically upon a predetermined number of articles being fed to said table for actuating said carrier fork mechanism in order to cause the upper surfaces of the arms thereon to be disposed at a higher elevation than the upper surfaces of the frame members to thus lift the row of articles off of the table, said last-named means also being operable for moving the arms on said carrier fork mechanism into alinement with the transfer mechanism, an accumulator table disposed on one side of the carrier fork mechanism when the carrier fork mechanism is actuated, means responsive to said carrier fork mechanism being poistioned in alinement with the transfer mechanism for actuating said transfer mechanism to cause the same to move transversely of the arms on said carrier fork mechanism for transferring the row of articles thereon onto the accumulator table, means operable automatically upon the latter transfer operation being completed for returning the transfer mechanism to its original position and means responsive to said transfer mechanism returning to its original position for returning the carrier fork mechanism to its original position with the arms thereon disposed between the frame members of the table preparatory to a repeat operation, whereby, upon said arms being elevated to where the upper surfaces thereof are disposed at a higher elevation than the upper surfaces of the frame members, the lower surfaces of said arms will still be disposed at a lower elevation than the lower surfaces of the frame members of the table to thus permit the arms to move longitudinally of the table as the carrier fork mechanism is moved into alinement with the transfer mechanism.

38. Apparatus for handling and stacking a plurality of articles, such as bricks, tile and the like, on a tier-carrying car; said apparatus comprising first supporting means for said articles, means for feeding a plurality of articles to said first supporting means in juxtaposed side-by-side relation to form a row of said articles, separator means for said articles, a vertically movable elevator disposed adjacent said separator means and being adapted to support said tier-carrying car, means operable automatically upon a predetermined number of said articles being fed to said first supporting means for transferring said articles to the separator means, means operable automatically upon said row of articles being transferred to the separator means for actuating the separator means, said separator means having means for spacing the bricks in each row apart from each other, means operable automatically upon said articles being spaced apart from each other by the separator means for transferring the row of articles therefrom onto said tier-carrying car to form tiers of articles on the tier-carrying car, means operable automatically upon each tier of articles being transferred to the tier-carrying car for changing the position of the elevator supporting the tier-carrying car whereby subsequent tiers of articles may be transferred to the upper surfaces of the articles previously transferred onto the tier-carrying car, said last-named means comprising a cumulative counter-balancing unit connected to the elevator and serving to cause said elevator to normally assume a predetermined raised position with the corresponding car thereon and wherein the upper surface of the corresponding car may be disposed at a slightly lower elevation than that of the separator means, means on the cumulative counterbalancing unit for permitting the elevator to move downwardly a predetermined distance upon each tier of articles being deposited upon the corresponding tier-carrying car and to cause the upper surface of each successive tier of articles deposited thereon to assume the position originally occupied by the upper surface of the tier-carrying car, means operable automatically upon a predetermined number of tiers of articles being deposited upon the tier-carrying car for latching the elevator in a predetermined lowered position, means operable automatically upon said elevator being moved to said lowered position for feeding a succeeding tier-carrying car to the elevator and for moving the first-named tier-carrying car off of the elecator, and means operable automatically upon said succeeding tier-carrying car moving onto the elevator for releasing said elevator from the latching means to permit the elevator and its corresponding car to occupy said raised position.

39. In a machine for forming tiers of bricks on a platform; the combination of a first table adapted to support a row of bricks, an accumulator table, a first transfer mechanism, means for successively lifting bricks off of said first table and alining them with said first transfer mechanism, means responsive to said lifting means for actuating said first transfer mechanism to transfer each successive row of bricks from the lifting means onto said accumulator table, a separator table, means responsive to a predetermined number of rows of bricks being deposited on the accumulator table for transferring the rows of bricks therefrom onto the separator table, means for separating the bricks apart from each other as they are positioned upon the separator table, and means responsive to said bricks being separated for transferring them onto said platform to form a tier of bricks.

40. In an apparatus for stacking articles, such as bricks and the like, and having a frame; the combination of an accumulator table, means for accumulating a plurality of juxtaposed rows, each of a given number of articles, on said accumulator table, a separator table disposed adjacent, and on substantially the same level as, said accumulator table, a rake mechanism having vertically movable downwardly extending rake members thereon, means on said frame supporting said rake mechanism for substantially horizontal movement on the frame, means responsive to the accumulation of a predetermined number of rows of articles on said accumulator table for moving said rake members downwardly adjacent the last row of articles accumulated on the accumulator table and for then moving the rake mechanism so as to move the rows of articles from the accumulator tabel onto the separator table, and means for then returning the rake mechanism to its original position.

41. In an apparatus for handling articles, such as bricks and the like, a reciprocable carrier mechanism adapted to successively receive rows of juxtaposed articles and to carry each successive row into said apparatus, a transfer mechanism, an accumulator table adjacent which said carrier mechanism moves with each active stroke thereof, means for pushing each successive row of articles off of the carrier mechanism and onto said accumulator table, and cutting means astride which the juxtaposed articles in each successive row move as they are pushed from the carrier mechanism onto said accumulator table to prevent the articles in each row from adhering to each other.

42. Apparatus for handling articles, such as bricks, tile and the like, comprising a table adapted to receive a row of articles thereon; said table having a plurality of longitudinally extending slots therein, a carrier fork mechanism having arms thereon normally positioned in said slots in the table, a transfer mechanism disposed adjacent the carrier fork mechanism, means under control of the articles received by said table for actuating said carrier fork mechanism, means on the carrier fork mechanism for elevating said arms thereon to lift the row of articles off of the table and for moving said carrier fork mechanism into alinement with the transfer mechanism, an accumulator table disposed at one side of the carrier fork mechanism when the carrier fork mechanism is actuated, means operable automatically subsequent to said carrier fork mechanism being actuated to cause said transfer mechanism to move transversely of the arms on said carrier fork mechanism for transferring the row of articles therefrom onto the accumulator table, means operable automatically upon said transfer operation being completed for returning the transfer mechanism to its original position, and means operable automatically upon said transfer mechanism being returned to its original position for returning the carrier fork mechanism to its original position with the arms thereon disposed in the slots in said table for repeating their operation.

43. Apparatus for handling a plurality of articles, such as bricks and the like, and for positioning articles upon a platform; said apparatus comprising a separator mechanism, means for positioning a plurality of articles on the separator mechanism in juxtaposed relation to each other wherein the articles are arranged in rows and in each row of which the articles are disposed in side-by-side relation and said rows being disposed in juxtaposed relation to each other, means operable automatically upon said articles being positioned on the separator mechanism for operating the latter to cause the articles to be spaced apart from each other, said platform being adapted to be positioned adjacent the separator mechanism, means for transferring the rows of articles from the separator mechanism onto the platform comprising a grab carriage adapted to move to and fro between the separator mechanism and said platform, a plurality of grasping vanes depending from said carriage, there being a pair of these vanes for each row of articles formed as the articles in each row are spaced from each other, each pair of said grasping vanes being so positioned as to move into and occupy a position astride the corresponding row of articles disposed on the separator mechanism upon said grab carriage being moved from a position above said platform to a position above the separator mechanism, means operable automatically for moving said grab carriage from a position above the platform to a position above the separator mechanism upon said separator mechanism being operative for spacing the articles in each row from each other, means operable automatically upon the corresponding pairs of vanes being positioned astride the longitudinally extending rows of articles for moving the grasping vanes of each pair towards each other for grasping opposed sides of the corresponding articles, and means operable automatically upon said grasping vanes being moved into operating position and grasping opposed sides of said articles for moving the grab carriage from its position above the separator mechanism to a position above said platform.

44. In a structure according to claim 43, means operable automatically upon said grab carriage being moved to a position above said platform for moving the corresponding pairs of vanes apart from each other to thereby release the articles therefrom and to deposit said articles upon said platform.

45. In a structure according to claim 44, means operable automatically as predetermined spaced tiers are transferred from the separator mechanism to said platform for rotating said grasping vanes substantially a quarter revolution about a vertical axis to cause the articles, upon being released from the grasping vanes onto said platform, to occupy a position transversely of the tiers of articles previously deposited on said platform.

References Cited in the file of this patent
UNITED STATES PATENTS

| | | |
|---|---|---|
| 1,020,572 | Penfield | Mar. 19, 1912 |
| 1,121,658 | Penfield | Dec. 22, 1914 |
| 1,129,214 | McIlvried | Feb. 23, 1915 |
| 1,551,890 | Luce | Sept. 1, 1925 |
| 1,556,695 | Kronborg | Oct. 13, 1925 |
| 1,558,983 | Horstkotte | Oct. 27, 1925 |
| 1,639,576 | Semashko | Aug. 16, 1927 |
| 1,711,820 | Wilcke | May 7, 1929 |
| 1,760,993 | Penfield | June 3, 1930 |
| 1,761,632 | Koehler | June 3, 1930 |
| 1,860,143 | Fuller et al. | May 24, 1932 |
| 2,234,990 | Todhunter | Mar. 18, 1941 |
| 2,396,090 | Curtis | Mar. 5, 1946 |
| 2,441,323 | Klammt et al. | May 11, 1948 |
| 2,565,927 | Morgan | Aug. 28, 1951 |